US012156127B2

(12) United States Patent
Omer et al.

(10) Patent No.: US 12,156,127 B2
(45) Date of Patent: Nov. 26, 2024

(54) SYSTEMS AND METHODS FOR TIME DOMAIN CHANNEL REPRESENTATION INFORMATION FOR Wi-Fi SENSING

(71) Applicant: Cognitive Systems Corp., Waterloo (CA)

(72) Inventors: Mohammad Omer, Waterloo (CA); Chris Beg, Waterloo (CA)

(73) Assignee: COGNITIVE SYSTEMS CORP., Waterloo (CA)

( * ) Notice: Subject to any disclaimer, the term of this patent is extended or adjusted under 35 U.S.C. 154(b) by 0 days.

(21) Appl. No.: 18/496,097

(22) Filed: Oct. 27, 2023

(65) Prior Publication Data

US 2024/0073797 A1 Feb. 29, 2024

Related U.S. Application Data

(63) Continuation of application No. 18/170,399, filed on Feb. 16, 2023, now Pat. No. 11,871,337, which is a
(Continued)

(51) Int. Cl.
*H04W 48/16* (2009.01)
*G01S 5/02* (2010.01)
(Continued)

(52) U.S. Cl.
CPC ............ *H04W 48/16* (2013.01); *G01S 5/0284* (2013.01); *H04W 4/33* (2018.02); *H04W 4/38* (2018.02)

(58) Field of Classification Search
CPC ......... H04W 48/01; H04W 4/38; H04W 4/03; G01S 5/0284
See application file for complete search history.

(56) References Cited

U.S. PATENT DOCUMENTS 7,342,493 B2 3/2008 Johnson
10,264,405 B1 4/2019 Manku et al.
(Continued)

FOREIGN PATENT DOCUMENTS

CN 102415002 A 4/2012
CN 111951434 A 11/2020
EP 3492944 A1 6/2019

OTHER PUBLICATIONS

Yongsen Ma, Gang Zhou, and Shuangquan Wang. 2019. WiFi Sensing with Channel State Information: A Survey. ACM Com put. Surv. 52, 3, Article 46 (Jun. 2019), 36 pages. https://doi.org/10.1145/3310194 (Year: 2019).

*Primary Examiner* — Kashif Siddiqui
(74) *Attorney, Agent, or Firm* — MEDLER FERRO WOODHOUSE & MILLS PLLC

(57) ABSTRACT

Systems and methods for time domain channel representation information for Wi-Fi sensing. Wi-Fi sensing systems include sensing devices and remote devices configured to communicate through radio-frequency signals. Initially, a sensing device receives a channel representation information configuration representative of channel state information in time domain. The sensing device then receives a sensing transmission and generates a sensing measurement based on the sensing transmission. Thereafter, the sensing device generates a time domain representation of the sensing measurement and selects one or more time domain pulses indicative of the time domain representation based on the channel representation information configuration. The sensing device communicates the one or more time domain pulses to a sensing algorithm manager for use in determining motion or movement.

20 Claims, 36 Drawing Sheets

Related U.S. Application Data continuation of application No. 17/742,047, filed on May 11, 2022, now Pat. No. 11,589,297.

(60) Provisional application No. 63/216,871, filed on Jun. 30, 2021, provisional application No. 63/187,673, filed on May 12, 2021.

(51) Int. Cl.
*H04W 4/33* (2018.01)
*H04W 4/38* (2018.01)

(56) References Cited

U.S. PATENT DOCUMENTS

| | | |
|---|---|---|
| 11,589,297 B2 * | 2/2023 | Omer .................... G01S 13/765 |
| 11,871,337 B2 * | 1/2024 | Omer .................... H04W 24/08 |
| 2019/0334590 A1 * | 10/2019 | Son ...................... H04B 7/0452 |
| 2020/0213160 A1 | 7/2020 | Doostnejad et al. |
| 2020/0271749 A1 * | 8/2020 | Wu ........................ G01S 5/0278 |
| 2020/0359248 A1 | 11/2020 | Sadeghi et al. |
| 2020/0374729 A1 * | 11/2020 | Alanen ................. H04L 5/0048 |
| 2020/0400778 A1 * | 12/2020 | da Silva ................ H04W 8/005 |
| 2021/0273735 A1 | 9/2021 | Da Silva et al. |
| 2022/0070710 A1 | 3/2022 | Lim et al. |
| 2022/0150962 A1 * | 5/2022 | Chen .................... H04B 7/0626 |
| 2022/0224484 A1 * | 7/2022 | Yi ......................... H04L 5/0051 |
| 2022/0279365 A1 * | 9/2022 | Du ......................... G01S 13/24 |
| 2023/0048695 A1 * | 2/2023 | Kim ..................... H04L 1/1896 |
| 2023/0308996 A1 | 9/2023 | Omer et al. |

* cited by examiner

2700

| Message Type | Transmission Configuration (optional) | Timing Configuration (optional) | Steering Matrix Configuration (optional) | TD-CRI Configuration (optional) |
|---|---|---|---|---|
| Octets: 1 | Variable | Variable | Variable | Variable |

SYSTEMS AND METHODS FOR TIME DOMAIN CHANNEL REPRESENTATION INFORMATION FOR Wi-Fi SENSING

CROSS-REFERENCE TO RELATED APPLICATIONS

This application is a continuation of U.S. application Ser. No. 18/170,399, filed Feb. 16, 2023, which is a continuation of U.S. application Ser. No. 17/742,047, filed on May 11, 2022, now U.S. Pat. No. 11,589,297, which claims benefit of U.S. Provisional Application No. 63/216,871, filed on Jun. 30, 2021; and U.S. Provisional Application No. 63/187,673, filed on May 12, 2021, each of which is incorporated herein by reference in its entirety.

TECHNICAL FIELD

The present disclosure generally relates to systems and methods for Wi-Fi sensing. In particular, the present disclosure relates to configuring Wi-Fi systems and methods for generating time domain channel representation information for Wi-Fi sensing.

BACKGROUND OF THE DISCLOSURE

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

A Wi-Fi sensing system is one recent addition to motion detection systems. The Wi-Fi sensing system may include a sensing device and a remote device. In an example, the sensing device may initiate a Wireless Local Area Network (WLAN) sensing session and the remote device may participate in the WLAN sensing session initiated by the sensing device. The WLAN sensing session may refer to a period during which objects in a physical space may be probed, detected and/or characterized. In the Wi-Fi sensing system, information that is representative of channel (i.e., channel representation information) may need to be transmitted from one device to another device (for example, from the sensing device to the remote device) over the air. The channel representation information may be used by a sensing algorithm to determine motion and/or movement of objects. In an example, the remote device (which sends a sensing transmission) may include the sensing algorithm. As the sensing device calculates channel representation information, the sensing device may be required to send the channel representation information to the sensing algorithm included in the remote device for further processing. This necessitates the sending of the channel representation information from the sensing device to the remote device over the air.

The representation of the channel between devices is currently captured in Channel State Information (CSI). CSI is typically a set of complex values in frequency domain representing amplitude attenuation and phase rotation of each tone of a multi-tone OFDM signal. In an example, for 20 MHz channel bandwidth, 52 CSI complex pairs are used to represent the channel. In another example, for 40 MHz channel bandwidth, 104 CSI complex pairs are used to represent the channel. As the bandwidth increases, the number of CSI complex pairs used to represent the channel also increases. Accordingly, transmission of channel information from one device to another device may require passing of a significant amount of information and as a result, channel capacity that may otherwise be used for data transfer is consumed. Also, channel utilization caused by transmission of the CSI over the air is magnified for wider channel bandwidth as a greater number of complex values needs to be sent.

BRIEF SUMMARY OF THE DISCLOSURE

The present disclosure generally relates to systems and methods for Wi-Fi sensing. In particular, the present disclosure relates to configuring Wi-Fi systems and methods for generating channel representation information for Wi-Fi sensing in the time domain.

Systems and methods are provided for Wi-Fi sensing. In an example embodiment, a method configured for Wi-Fi sensing is described. The method is carried out by a sensing receiver including a transmitting antenna, a receiving antenna, and a processor configured to execute instructions. The method includes receiving, by the processor, a channel representation information configuration identifying a representation of channel state information in the time domain, receiving, via the receiving antenna, a sensing transmission, generating, by the processor, a sensing measurements based on the sensing transmission, generating, by the processor, a time domain representation of the sensing measurement, selecting, by the at least one processor, one or more time domain pulses indicative of the time domain representation based on the channel representation information configuration, and communicating, by the processor, the one or more time domain pulses to a sensing algorithm manager for use in determining motion or movement.

In some implementations, the channel representation information configuration includes one or more of a number of time domain pulses (N), a maximum time delay boundary, and an amplitude mask.

In some implementations, the maximum time delay boundary represents a maximum time delay of selectable time domain pulses of the time domain representation of the sensing measurement.

In some implementations, the amplitude mask includes one of a minimum amplitude mask and a maximum amplitude mask.

In some implementations, selecting the one or more time domain pulses is based on the amplitude mask. The amplitude mask is to the time domain representation of the sensing measurement. In some implementations, the selecting comprises including time domain pulses that are within the amplitude mask and excluding time domain pulses that are outside the amplitude mask.

In some implementations, the method further includes generating, by the processor, a representation of a location of the one or more time domain pulses in a reconstructed filtered (time-domain channel representation information) TD-CRI.

In some implementations, the method further includes communicating, by the processor, the representation of the location of the one or more time domain pulses in the reconstructed filtered TD-CRI to the sensing algorithm manager.

In some implementations, the one or more of the number of time domain pulses (N), the maximum time delay boundary, and the amplitude mask are received in a sensing measurement setup request.

In some implementations, the method further includes determining the number of time domain pulses (N) according to a ranging process performed by the processor.

In some implementations, the method further includes determining the number of time domain pulses (N) according to a simulation process.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 27 illustrates a management frame carrying a sensing transmission, according to some embodiments;

DETAILED DESCRIPTION

Figure 1:
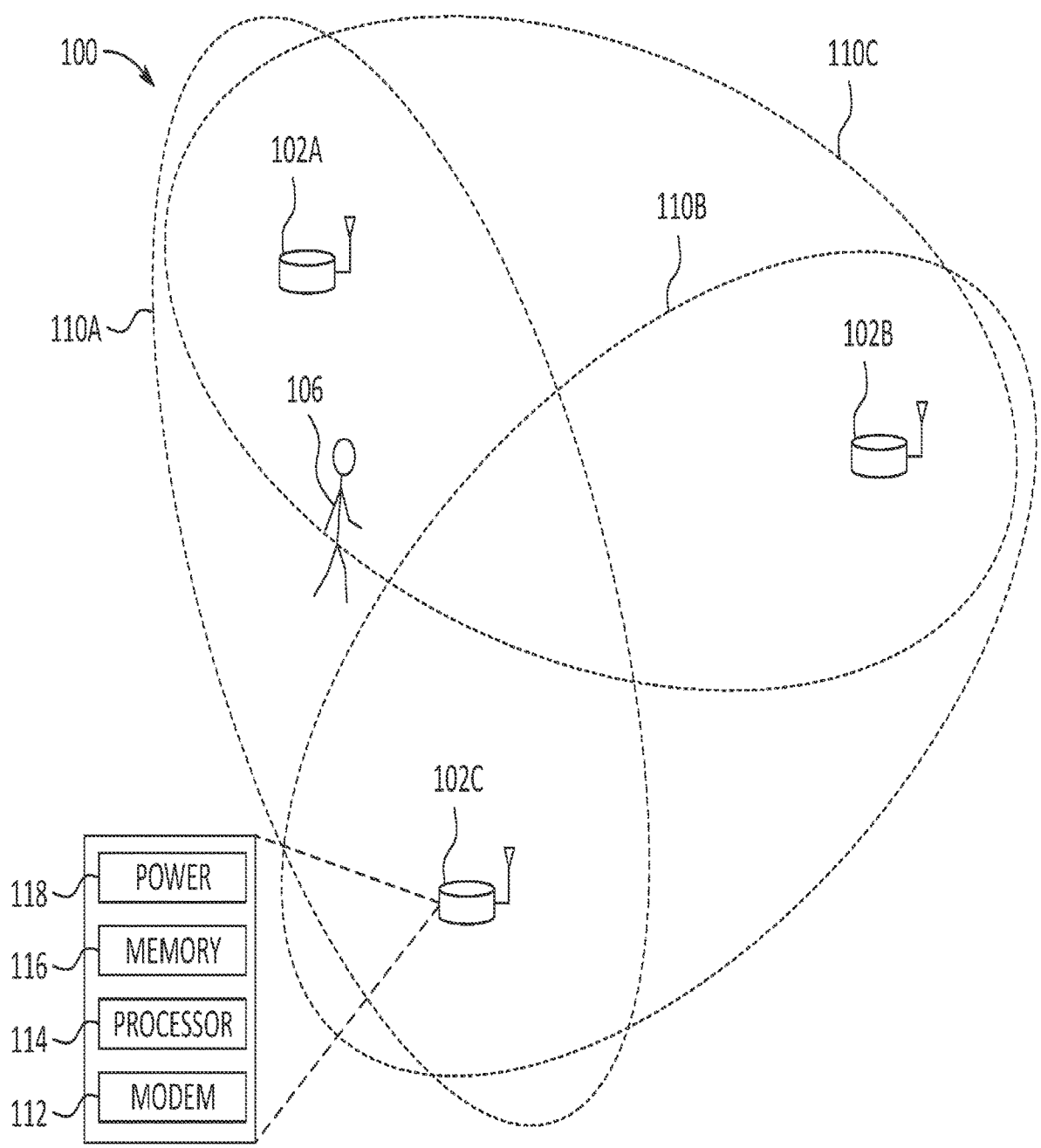
FIG. 1 is a diagram showing an example wireless communication system.

A Wi-Fi sensing system (also referred to as wireless sensing system) may measure an environment by transmitting signal(s) to remote device(s) and analyzing response(s) received from the remote device(s). The Wi-Fi sensing system may perform repeated measurements to analyze the environment and the changes thereof. The Wi-Fi sensing system may operate in conjunction with existing communication components, and benefits from having a Medium Access Control (MAC) layer entity, which may be used for the coordination of air-time resource usage among multiple devices based upon defined protocol.

One of the relevant standardization goals of the Wi-Fi sensing systems is to reduce additional overheads on existing Wi-Fi network, such that overlaying Wi-Fi sensing capability on the 802.11 network does not compromise the communication function of the network. Currently there are no known MAC protocols specifically defined for sensing in the Wi-Fi sensing systems. One aspect of sensing in the Wi-Fi sensing systems is a solicitation of a sensing transmission from a remote device. Improvements to MAC layer to enable solicitation of a sensing transmission from the remote device with characteristics that are optimized to allow the Wi-Fi sensing agent to detect presence, location and motion may significantly impact existing system performance. In particular, the request or solicitation of the remote device transmission optimized for sensing (or a sensing transmission) may impact an uplink scheduler of the remote device. There are existing mechanisms to request or solicit the remote device to transmit the sensing transmission. However, such mechanisms were designed for different purposes. As a result, these mechanisms are not efficient, offer no flexibility in control, and are not universally consistent among different vendor implementations. Furthermore, a channel sounding protocol may be considered for supporting Wi-Fi sensing. However, the channel sounding protocol is not currently flexible and thus, such functionality in support of Wi-Fi sensing is not possible.

Protocols for Wi-Fi systems are designed with decisions made on a basis of a data transfer mechanism as against sensing requirements. As a result, Wi-Fi sensing aspects are frequently not developed within common Wi-Fi systems.

In some aspects of what is described herein, a wireless sensing system may be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, the wireless sensing system may be configured to control measurement rates, wireless connections, and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate like a bistatic radar system, where a Wi-Fi access-point (AP) assumes the receiver role, and each Wi-Fi device (station, node or peer) connected to the AP assume the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). The wireless sensing algorithm may include intelligence needed to extract desired features out of the channel response measurements and may be different based on the desired sensing application.

In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a remote device communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space. According to some aspects, the channel information may be offloaded to an external device. The external device may process the channel information to detect whether an object is present or not. In an example, the channel information may be transmitted from one device to another device over the air. Further, channel utilization caused by transmission of the channel information over the air may vary based on width of channel bandwidth.

In some cases, a wireless sensing system can perform band steering or client steering of nodes throughout a wireless network, for example, in a Wi-Fi multi-AP or Extended Service Set (ESS) topology, multiple coordinating wireless access-points (APs) each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4 GHz and 5 GHz), the wireless sensing system may keep a device connected to the same physical AP, but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage or to better localize motion within an area.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

As disclosed in embodiments herein, a wireless local area network (WLAN) sensing procedure allows a station (STA) to perform WLAN sensing. WLAN sensing may include a WLAN sensing session. In examples, WLAN sensing procedure, WLAN sensing, and WLAN sensing session may be referred to as wireless sensing procedure, wireless sensing, and wireless sensing session, Wi-Fi sensing procedure, Wi-Fi sensing, and Wi-Fi sensing session, or sensing procedure, sensing, and sensing session.

WLAN sensing is a service that enables a STA to obtain sensing measurements of the channel(s) between two or more STAs and/or the channel between a receive antenna and a transmit antenna of a STA or an access point (AP). A WLAN sensing procedure may be composed of one or more of the following: sensing session setup, sensing measurement setup, sensing measurement instances, sensing measurement setup termination, and sensing session termination.

In examples disclosed herein, sensing session setup and sensing measurement setup may be referred to as sensing configuration and may be achieved by a sensing configuration message and may be confirmed by a sensing configuration response message. A sensing measurement instance may be an individual sensing measurement and may be derived from a sensing transmission. In examples, the sensing configuration message may be referred to as a sensing measurement setup request, and the sensing configuration response message may be referred to as a sensing measurement setup response.

A WLAN sensing procedure may include multiple sensing measurement instances. In examples, the multiple sensing measurement instances may be referred to a measurement campaign.

A sensing initiator may refer to a STA or an AP that initiates a WLAN sensing procedure. A sensing responder may refer to a STA or an AP that participates in a WLAN sensing procedure initiated by a sensing initiator. A sensing transmitter may refer to a STA or an AP that transmits physical-layer protocol data units (PPDU) used for sensing measurements in a WLAN sensing procedure. A sensing receiver may refer to a STA or an AP that receives PPDUs sent by a sensing transmitter and performs sensing measurements in a WLAN sensing procedure.

In examples, PPDU(s) used for a sensing measurement may be referred to as a sensing transmission.

A STA acting as a sensing initiator may participate in a sensing measurement instance as a sensing transmitter, a sensing receiver, both a sensing transmitter and sensing receiver, or neither a sensing transmitter nor a sensing receiver. A STA acting as a sensing responder may participate in a sensing measurement instance as a sensing transmitter, a sensing receiver, and both a sensing transmitter and a sensing receiver.

In an example, a sensing initiator may be considered to control the WLAN sensing procedure or the measurement campaign. The role of the sensing initiator may be taken on by a sensing device, a remote device, or a separate device which includes a sensing algorithm (for example, a sensing algorithm manager).

In examples, a sensing transmitter may be referred to as a remote device and a sensing receiver may be referred to as a sensing device. In other examples, a sensing initiator may be a function of a sensing device or of a remote device, and a sensing responder may be a function of a sensing device or of a remote device.

IEEE P802.11-REVmd/D5.0 considers a STA to be a physical (PHY) and media access controller (MAC) entity capable of supporting features defined by the specification. A device containing a STA may be referred to as a Wi-Fi device. A Wi-Fi device which manages a basic service set (BSS) (as defined by IEEE P802.11-REVmd/D5.0) may be referred to as an AP STA. A Wi-Fi device which is a client node in a BSS may be referred to as a non-AP STA. In some examples, an AP STA may be referred to as an AP and a non-AP STA may be referred to as a STA.

In various embodiments of the disclosure, non-limiting definitions of one or more terms that will be used in the document are provided below.

A term "measurement campaign" may refer to a bi-directional series of one or more sensing transmissions between a sensing device (commonly known as wireless access-point, Wi-Fi access point, access point, sensing initiator, or sensing receiver) and a remote device (commonly known as Wi-Fi device, sensing responder, or sensing transmitter) that allows a series of one or more sensing measurements to be computed.

A term "Channel State Information (CSI)" may represent how wireless signals propagate from a transmitter to a receiver along multiple paths. CSI is typically a matrix of complex values representing amplitude attenuation and phase shift of signals, which provides an estimation of a communications channel.

A term "sensing trigger message" may refer to a message sent from the sensing device to the remote device to trigger one or more sensing transmissions that may be used for performing sensing measurements. In an example, the sensing trigger message may include requested transmission configuration, requested timing configuration, and/or steering matrix configuration. In examples, the term sensing trigger message may be referred to as sensing sounding trigger message or sensing sounding trigger frame.

A term "sensing transmission" may refer to any transmission made from the remote device to the sensing device which may be used to make a sensing measurement. In an example, sensing transmission may also be referred to as wireless sensing signal or wireless signal. In an example, the sensing transmission may be either a sensing response message or a sensing response NDP including one or more training fields used to make a sensing measurement.

A term "sensing transmission announcement" may refer to a message which is sent from the remote device to the sensing device that announces that a sensing transmission NDP will follow within a Short Interframe Space (SIFS). The sensing transmission NDP may be transmitted using transmission parameters defined with the sensing transmission announcement. In some examples, the sensing transmission announcement may be sent following a sensing trigger message and may be referred to as a sensing response announcement. In examples, the term sensing transmission announcement may be referred to as sensing NDP announcement or sensing NDP announcement frame.

A term "sensing transmission NDP" may refer to an NDP transmission which is sent by the remote device and used for a sensing measurement at the sensing device. In an example, the transmission follows a sensing transmission announcement and may be transmitted using transmission parameters that are defined in the sensing response announcement. In some examples, the sensing transmission NDP may be sent following a sensing response announcement and may be referred to as a sensing response NDP.

A term "sensing measurement" may refer to a measurement of a state of a channel i.e., CSI measurement between the remote device and the sensing device derived from a sensing transmission. In an example, sensing measurement may also be referred to as channel response measurement.

A term "Channel Representation Information (CRI)" may refer to a collection of sensing measurements with together represent the state of the channel between two devices. Examples of CRI are CSI and full TD-CRI.

A term "sensing measurement poll" may refer to a message which is sent from the remote device to the sensing device to solicit the transmission of channel representation information which has been determined by the sensing device. In examples, the term sensing measurement poll may be referred to as sensing trigger report or sensing trigger report frame.

A term "transmission parameters" may refer to a set of IEEE 802.11 PHY transmitter configuration parameters which are defined as part of transmission vector (TXVECTOR) corresponding to a specific PHY and which are configurable for each PHY-layer Protocol Data Unit (PPDU) transmission.

A term "PHY-layer Protocol Data Unit (PPDU)" may refer to a data unit that includes preamble and data fields. The preamble field may include the transmission vector format information and the data field may include payload and higher layer headers.

A term "full time-domain channel representation information (full TD-CRI)" may refer to a series of complex pairs of time domain pulses which are created by performing an Inverse Fast Fourier Transform (IFFT) on CSI values, for example CSI calculated by a baseband receiver.

A term "filtered time-domain channel representation information (filtered TD-CRI)" may refer to a reduced series of complex pairs of time domain pulses created by applying an algorithm to a full TD-CRI. The algorithm may select some time domain pulses and reject others. The filtered TD-CRI contains information that relates a selected time domain pulse to the corresponding time domain pulse in the full TD-CRI.

A term "reconstructed filtered time-domain channel representation information (reconstructed filtered TD-CRI)" may refer to a version of a full TD-CRI created from a filtered TD-CRI.

A term "Channel Response Information (CRI) transmission message" may refer to a message sent by the sensing device that has performed a sensing measurement on a sensing transmission, in which the sensing device sends CRI to a sensing initiator. In examples, a CRI transmission message may be an example of a sensing measurement report or of a sensing measurement report frame.

A term "reconstructed CSI (R-CSI)" may refer to representation of original CSI values as measured by the baseband receiver, where R-CSI is calculated by taking original CSI values (frequency domain), performing an IFFT to translate those values into the time domain, selecting a number of time domain pulses, zeroing or nulling time domain tones that do not include a selected time domain pulse, and performing an FFT. The resulting frequency domain complex values are the R-CSI.

A term "time domain pulse" may refer to a complex number that represents amplitude and phase of discretized energy in the time domain. When CSI values are obtained for each tone from the baseband receiver, time domain pulses are obtained by performing an IFFT on the CSI values.

A term "N" refers to a configured number of time domain pulses used to generate the R-CSI.

A term "tone" may refer to an individual subcarrier in an OFDM signal. A tone may be represented in time domain or frequency domain. In the time domain, a tone may also be referred to as a symbol. In the frequency domain, a tone may also be referred to as a subcarrier.

A term "Wireless Local Area Network (WLAN) sensing session" may refer to a period during which objects in a physical space may be probed, detected and/or characterized. In an example, during a WLAN sensing session, several devices participate in, and thereby contribute to the generation of sensing measurements.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes embodiments of systems and methods for Wi-Fi sensing. In particular, section B describes Wi-Fi systems and methods for generating channel representation information for Wi-Fi sensing in the time domain.

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Example wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., Bluetooth®, Near Field Communication (NFC), ZigBee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include standard wireless network components. For example, wireless communication devices 102A, 102B, 102C may be commercially available Wi-Fi access points or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional, or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate radio frequency (RF) signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and radio frequency circuitry. The radio frequency circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to radio frequency (RF) signals, and wirelessly transmits the radio frequency signals (e.g., through an antenna). In some instances, the radio subsystem in modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes as described in any of FIG. 31, FIG. 32A and FIG. 32B.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an AC adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to any of FIG. 31, FIG. 32A and FIG. 32B, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
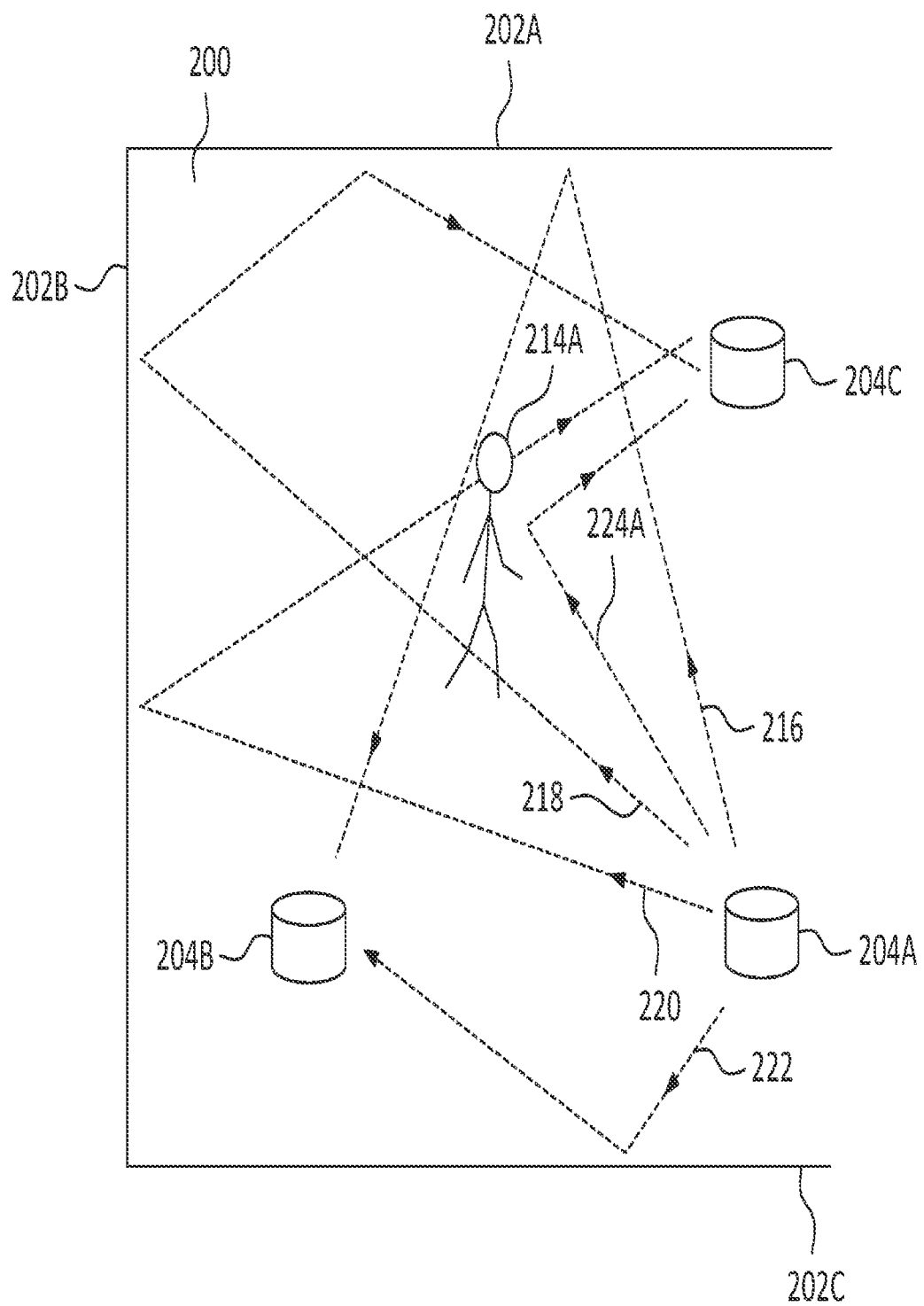
FIG. 2A and FIG. 2B are diagrams showing example wireless signals communicated between wireless communication devices.
Figure 2B:
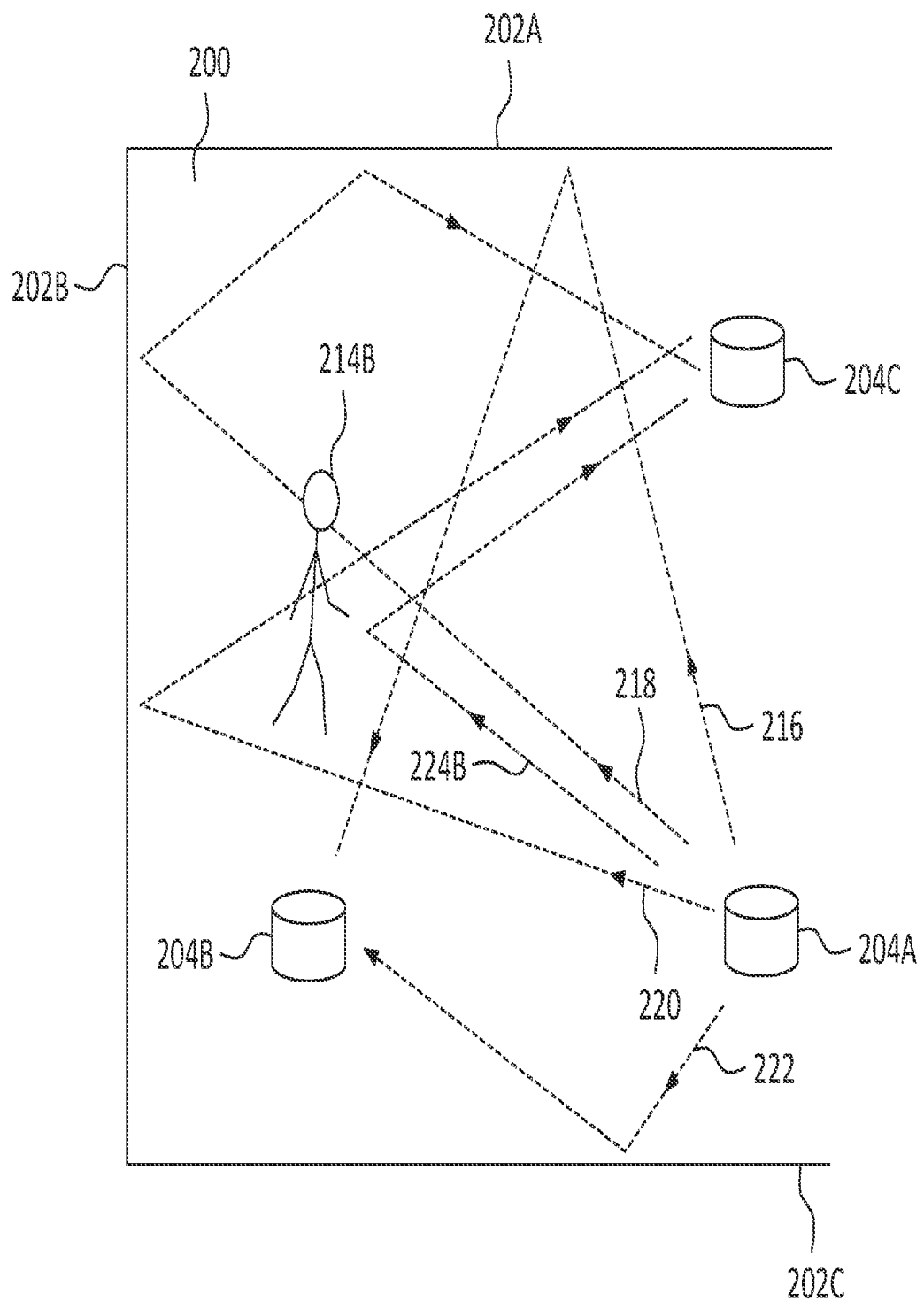

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. In an example, space 200 may be a sensing space. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled, or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \quad (1)$$

Where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

Where $\alpha_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \Sigma_k c_n \alpha_{n,k} e^{j\phi_{n,k}} \qquad (5)$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch} = \Sigma_k \Sigma_{n=-\infty}^{\infty} \alpha_{n,k} \qquad (6)$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as follows in Equation (7):

$$R_{cvd} = R_{ef} \otimes h_{ch} = \Sigma_{k=-m}^{m} R_{ef}(n-k) h_{ch}(k) \qquad (7)$$

with the optimization criterion $$\min_{h_{ch}} \Sigma (\hat{R}_{cvd} - R_{cvd})^2$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3A:
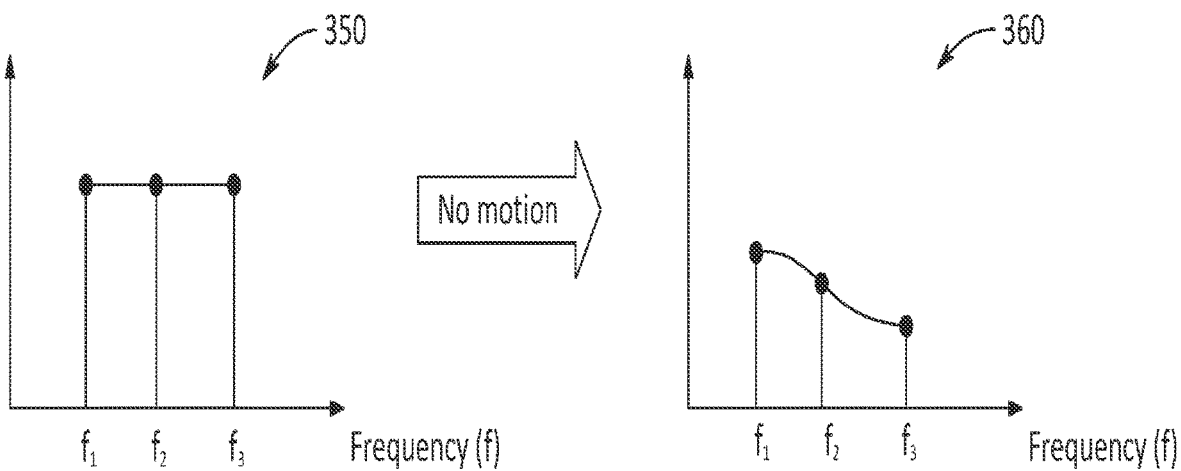
FIG. 3A and FIG. 3B are plots showing examples of channel responses computed from the wireless signals communicated between wireless communication devices in FIG. 2A and FIG. 2B.
Figure 3B:
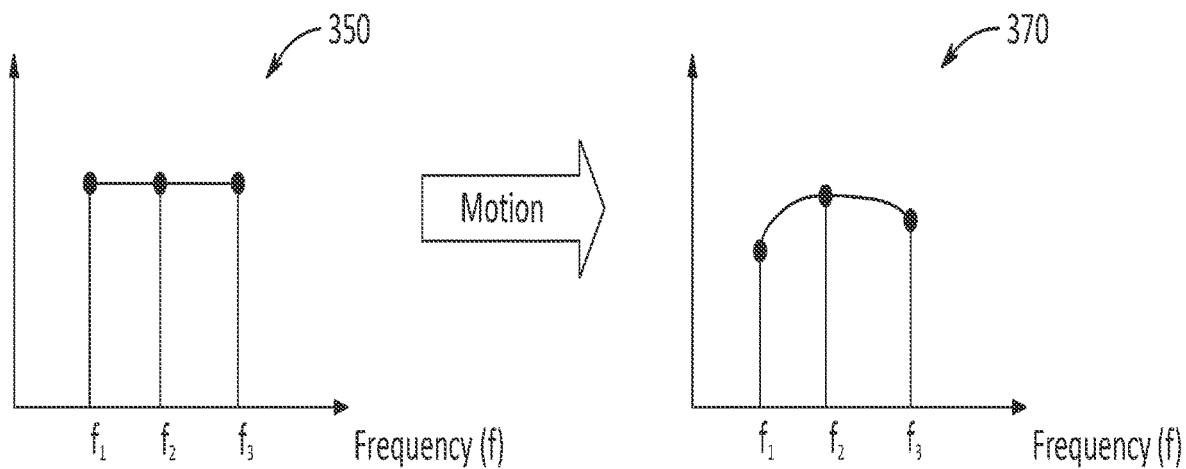

FIG. 3A and FIG. 3B are plots showing examples of channel response 360 and channel response 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component $f_1$, $f_2$, and $f_3$ is the same), as shown in frequency domain representation 350. Because of the interaction of the signal with space 200 (and the objects therein), the signals received at wireless communication device 204B that are based on the signal sent from wireless communication device 204A are different from the transmitted signal. In this example, where the transmitted signal has a flat frequency profile, the received signal represents the channel response of space 200. As shown in FIG. 3A and FIG. 3B, channel response 360 and channel response 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
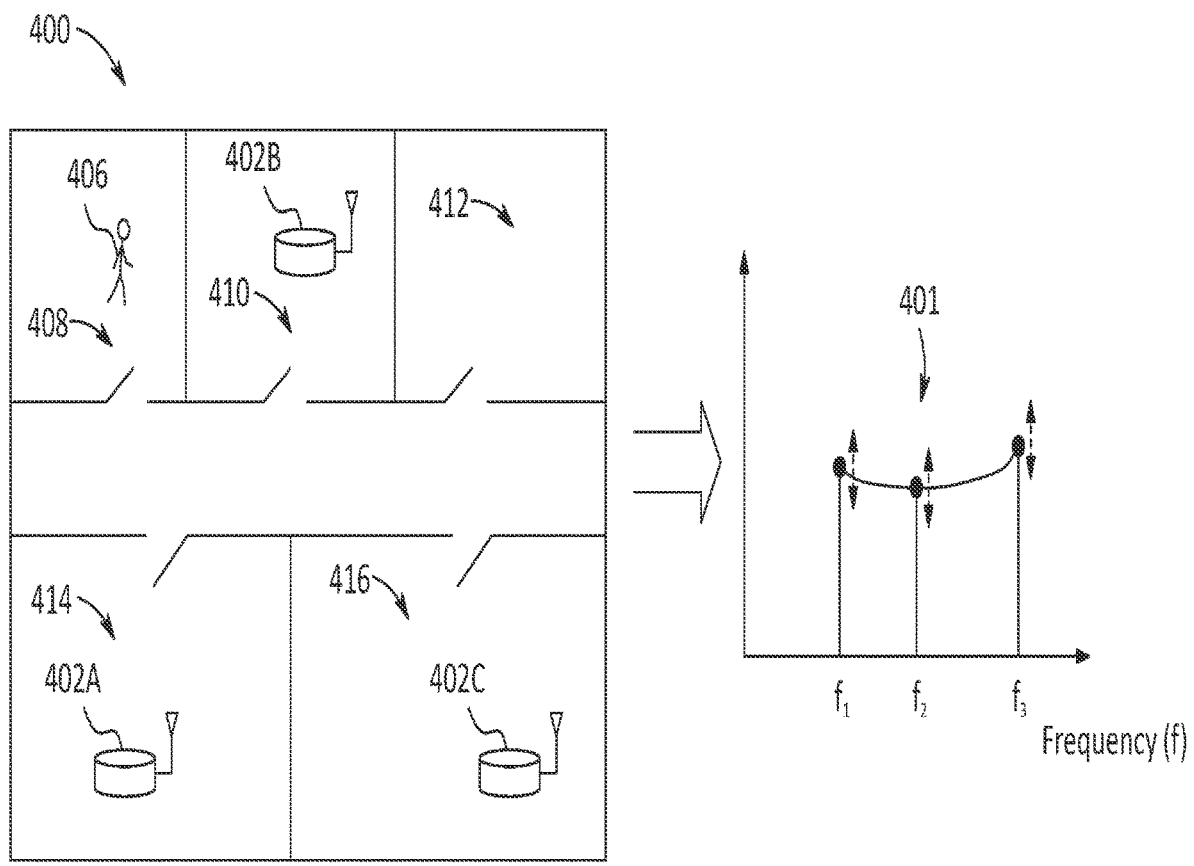
FIG. 4A and FIG. 4B are diagrams showing example channel responses associated with motion of an object in distinct regions of a space.
Figure 4B:
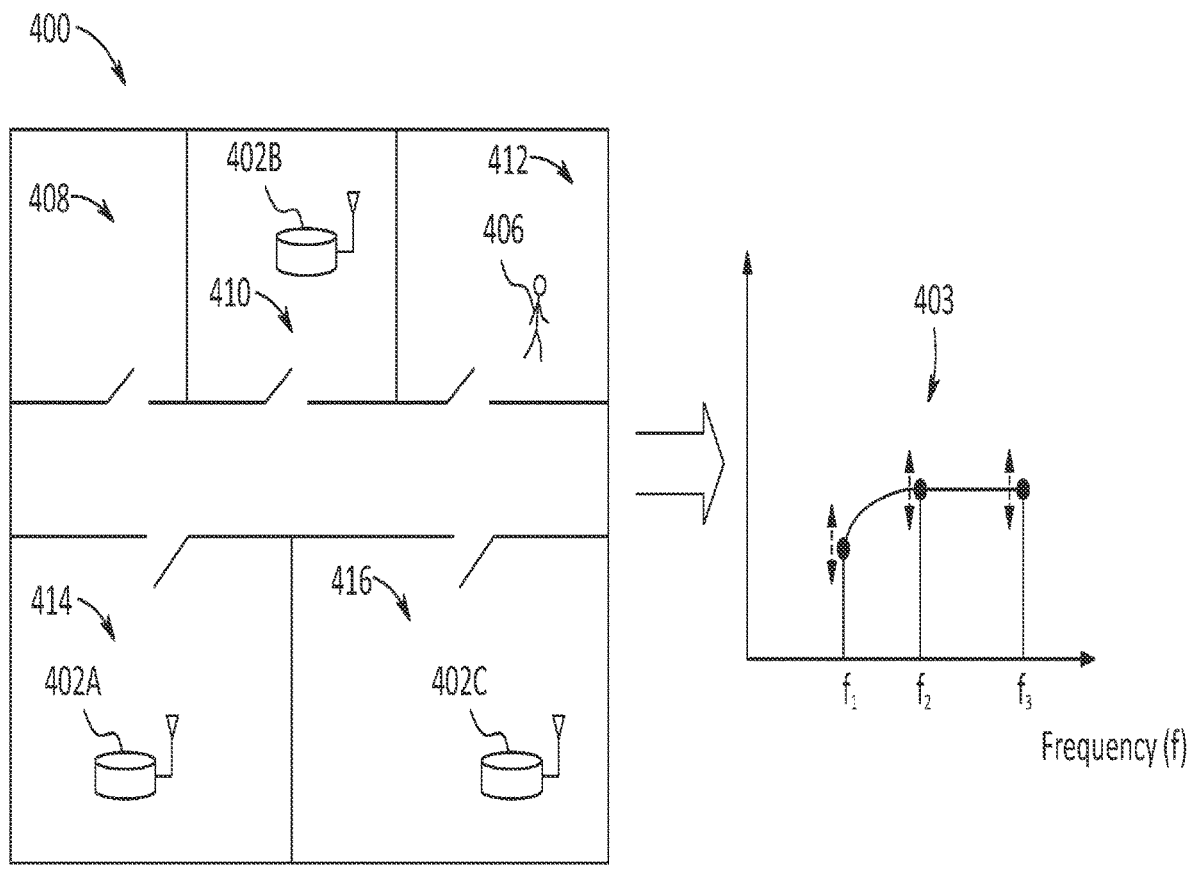

FIG. 4A and FIG. 4B are diagrams showing example channel response 401 and channel response 403 associated with motion of object 406 in distinct regions, first region 408 and third region 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 406, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of $f_1$, $f_2$, and $f_3$ is the same or nearly the same. For example, the motion probe signals may have a frequency response similar to frequency domain representation 350 shown in FIG. 3A and FIG. 3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel response 401 and channel response 403 are associated with signals received by the same wireless communication device 402 in space 400.

Figure 4C:
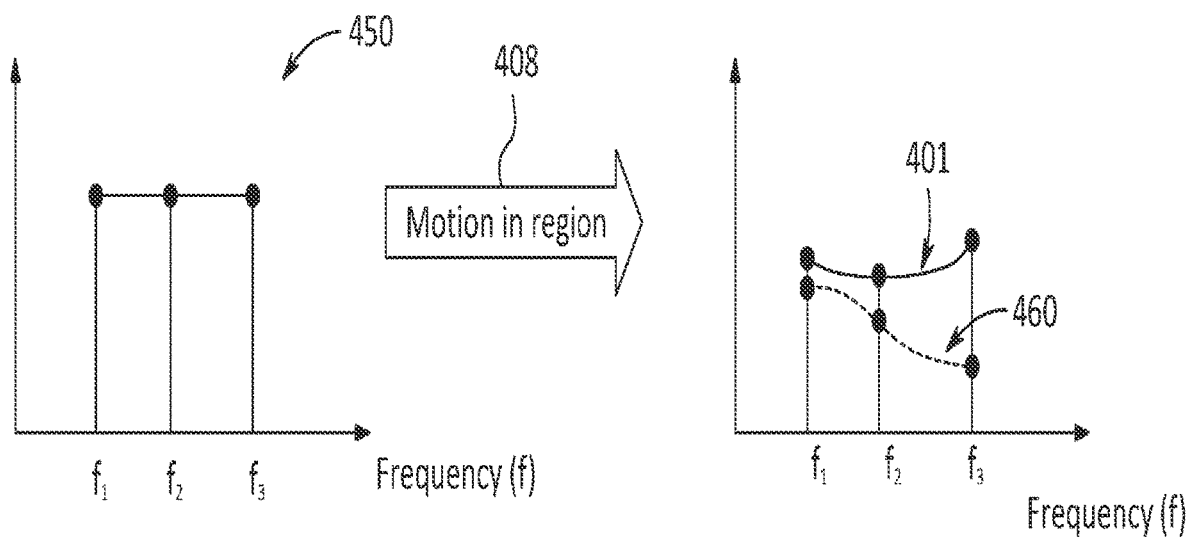
FIG. 4C and FIG. 4D are plots showing the example channel responses of FIG. 4A and FIG. 4B overlaid on an example channel response associated with no motion occurring in the space.
Figure 4D:
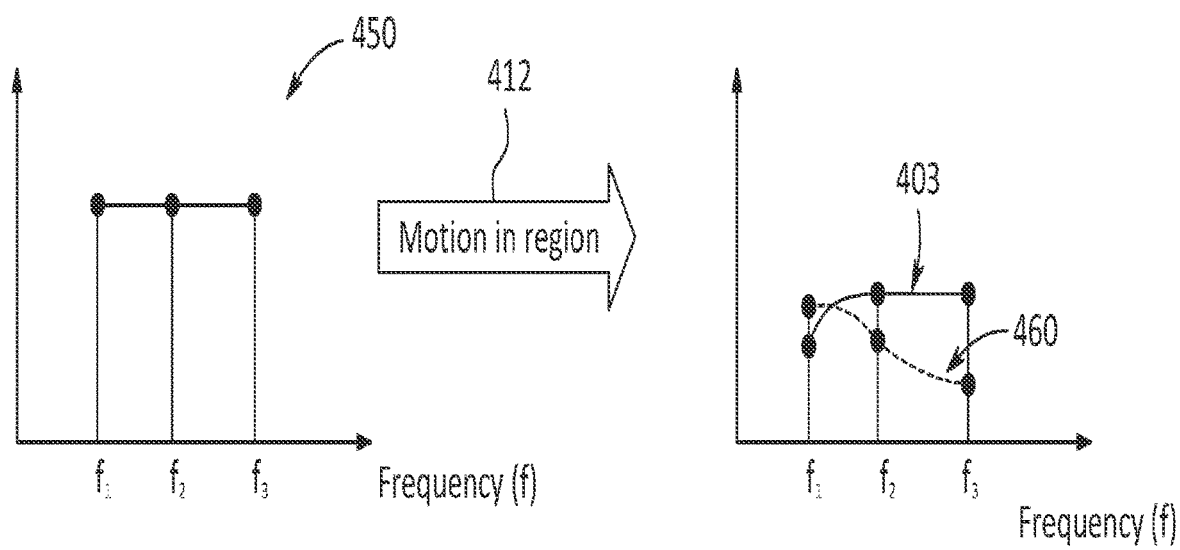

FIG. 4C and FIG. 4D are plots showing channel responses 401, 403 of FIGS. 4A-4B overlaid on channel response 460 associated with no motion occurring in space 400. In the example shown, wireless communication device 402 transmits a motion probe signal that has a flat frequency profile as shown in frequency domain representation 450. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained AI model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each frequency component $f_1$, $f_2$, and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component $f_2$ is less than the outer frequency components $f_1$ and $f_3$), while channel response 403 has a convex-asymptotic frequency profile (the magnitude of the middle frequency component $f_2$ is greater than the outer frequency components $f_1$ and $f_3$). The profiles of channel responses 401, 403 may differ in some instances (e.g., based on different room layouts or placement of the wireless communication devices 402).

Analyzing channel responses may be considered similar to analyzing a digital filter. A channel response may be formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points, or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an artificial intelligence (AI) model may be used to process data. AI models may be of a variety of types, for example linear regression models, logistic regression models, linear discriminant analysis models, decision tree models, naïve Bayes models, K-nearest neighbor models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Systems and Methods For Time Domain Channel Representation Information For Wi-Fi Sensing The present disclosure generally relates to systems and methods for Wi-Fi sensing. In particular, the present disclosure relates to configuring Wi-Fi systems and methods for generating time domain channel representation information for Wi-Fi sensing.

Figure 5:
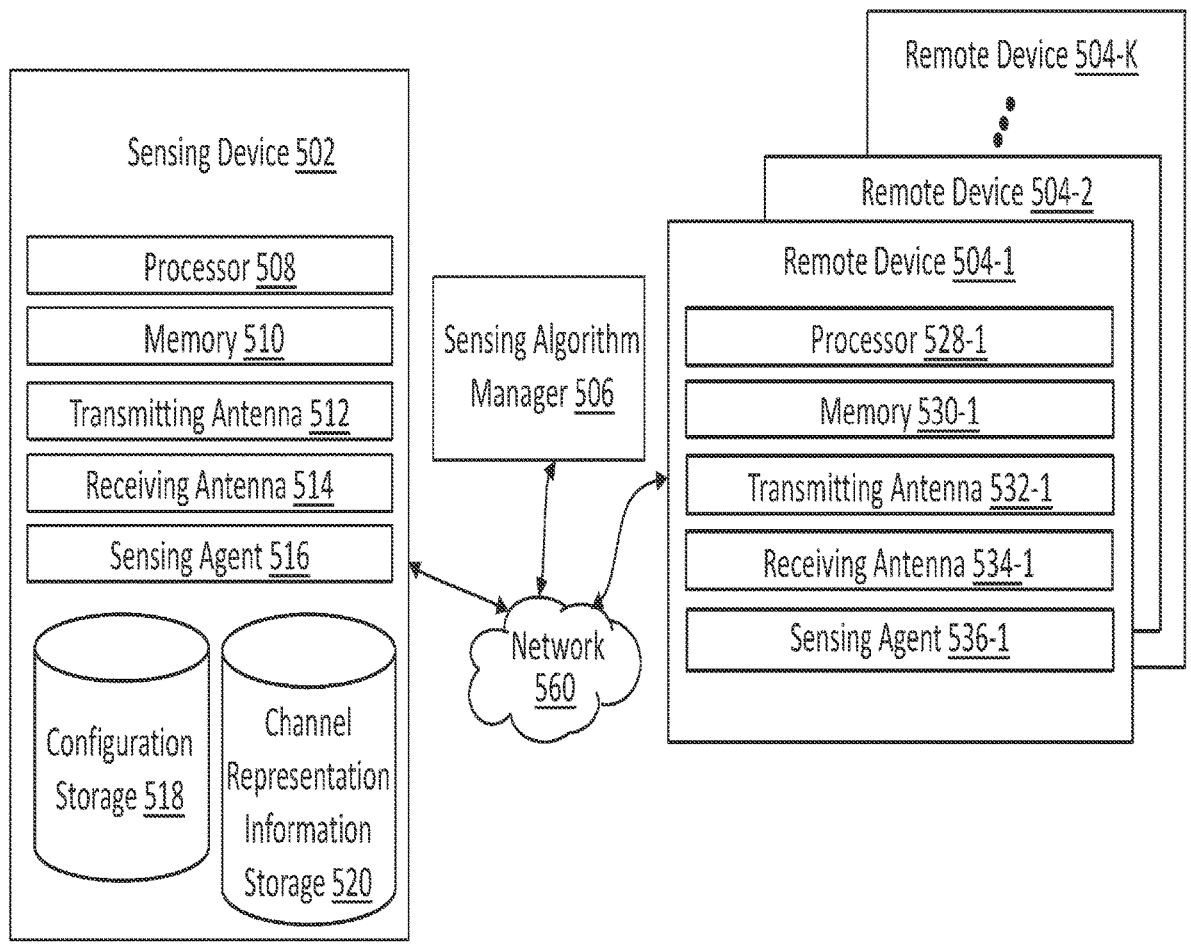
FIG. 5 depicts an implementation of some of an architecture of a system for Wi-Fi sensing, according to some embodiments.

FIG. 5 depicts an implementation of some of an architecture of an implementation of system 500 for Wi-Fi sensing, according to some embodiments.

System 500 (alternatively referred to as Wi-Fi sensing system 500 and wireless sensing system 500) may include sensing device 502, plurality of remote devices 504-(1–K), sensing algorithm manager 506, and network 560 enabling communication between the system components for information exchange. System 500 may be an example or instance of wireless communication system 100 and network 560 may be an example or instance of wireless network or cellular network, details of which are provided with reference to FIG. 1 and its accompanying description. Although, it is described that system 500 includes single sensing device 502, in some implementations, system 500 may include multiple sensing devices (for example as n sensing devices).

According to some embodiments, sensing device 502 may be configured to receive a sensing transmission and perform one or more sensing measurements useful for Wi-Fi sensing. These measurements may be known as sensing measurements. The sensing measurements may be processed to achieve a sensing goal of system 500. In an embodiment, sensing device 502 may be an Access Point (AP). In some embodiments, sensing device 502 may be a station (STA), for example, in a mesh network scenario. According to an implementation, sensing device 502 may be implemented by a device, such as wireless communication device 102 shown in FIG. 1. In some implementations, sensing device 502 may be implemented by a device, such as wireless communication device 204 shown in FIG. 2A and FIG. 2B. Sensing device 502 may be implemented by a device, such as wireless communication device 402 shown in FIG. 4A and FIG. 4B. In an implementation, sensing device 502 may coordinate and control communication among plurality of remote devices 504-(1–K). According to an implementation, sensing device 502 may be enabled to control a measurement campaign to ensure that required sensing transmissions are made at a required time and to ensure an accurate determination of sensing measurement. In some embodiments, sensing device 502 may process sensing measurements to achieve the sensing goal of system 500. In some embodiments, sensing device 502 may be configured to transmit the sensing measurements to sensing algorithm manager 506 and sensing algorithm manager 506 may be configured to process the sensing measurements to achieve the sensing goal of system 500.

According to an implementation, sensing device 502 may initiate a WLAN sensing session and plurality of remote devices 504-(1–K) may participate in the WLAN sensing session initiated by sensing device 502. In some implementations, plurality of remote devices 504-(1–K) may transmit PPDUs which are used for sensing measurements in the WLAN sensing session. In an implementation, sensing device 502 may receive the PPDUs in the WLAN sensing session and process the PPDUs into the sensing measurements.

Referring again to FIG. 5, in some embodiments, remote device 504-1 may be configured to send a sensing transmission to sensing device 502 based on which, one or more sensing measurements may be performed for Wi-Fi sensing. In an embodiment, remote device 504-1 may be an STA. In some embodiments, remote device 504-1 may be an AP for Wi-Fi sensing, for example, in scenarios where sensing device 502 acts as STA. According to an implementation, remote device 504-1 may be implemented by a device, such as wireless communication device 102 shown in FIG. 1. In some implementations, remote device 504-1 may be implemented by a device, such as wireless communication device 204 shown in FIG. 2A and FIG. 2B. Further, remote device 504-1 may be implemented by a device, such as wireless communication device 402 shown in FIG. 4A and FIG. 4B. In some implementations, communication between sensing device 502 and remote device 504-1 may be controlled via Station Management Entity (SME) and MAC Layer Management Entity (MLME) protocols. According to an embodiment, each of plurality of remote device 504-(1–K) may be configured to send a sensing transmission to sensing device 502.

According to some embodiments, sensing algorithm manager 506 may be configured to receive sensing measurements from sensing device 502 and process the sensing measurements to achieve a sensing goal of system 500. In an example, sensing algorithm manager 506 may process and analyze the sensing measurement to achieve the sensing goal of detecting a motion and/or a movement. According to some implementations, sensing algorithm manager 506 may include/execute a sensing algorithm. The sensing algorithm may be a computational algorithm that achieves a sensing goal. In an example, the sensing algorithm may utilize Channel Representation Information (CRI) to achieve the sensing goal of detecting movement and/or motion. In an embodiment, sensing algorithm manager 506 may be implemented in an STA. In some embodiments, sensing algorithm manager 506 may be implemented in an AP. According to an implementation, sensing algorithm manager 506 may be implemented by a device, such as wireless communication device 102 shown in FIG. 1. In some implementations, sensing algorithm manager 506 may be implemented by a device, such as wireless communication device 204 shown in FIG. 2A and FIG. 2B. Further, sensing algorithm manager 506 may be implemented by a device, such as wireless communication device 402 shown in FIG. 4A and FIG. 4B. In some implementations, sensing algorithm manager 506 may be any computing device, such as a desktop computer, a laptop, a tablet computer, a mobile device, a Personal Digital Assistant (PDA) or any other computing device. In embodiments, sensing algorithm manager 506 may take a role of sensing initiator where a sensing algorithm determines a measurement campaign and the sensing measurements required to fulfill the measurement campaign. Sensing algorithm manager 506 may communicate the sensing measurements required to fulfill the measurement campaign to sensing device 502 to coordinate and control communication among plurality of remote devices 504-(1–K). Although, it has been described that sensing algorithm manager 506 is a separate device, in some implementations, sensing algorithm manager 506 may be implemented within remote device 504-1.

Referring to FIG. 5, in more detail, sensing device 502 may include processor 508 and memory 510. For example, processor 508 and memory 510 of sensing device 502 may be processor 114 and memory 116, respectively, as shown in FIG. 1. In an embodiment, sensing device 502 may further include transmitting antenna(s) 512, receiving antenna(s) 514, and sensing agent 516. In some embodiments, an antenna may be used to both transmit and receive signals in a half-duplex format. When the antenna is transmitting, it may be referred to as transmitting antenna 512, and when the antenna is receiving, it may be referred to as receiving antenna 514. It is understood by a person of normal skill in the art that the same antenna may be transmitting antenna 512 in some instances and receiving antenna 514 in other instances. In the case of an antenna array, one or more antenna elements may be used to transmit or receive a signal, for example, in a beamforming environment. In some examples, a group of antenna elements used to transmit a composite signal may be referred to as transmitting antenna 512, and a group of antenna elements used to receive a composite signal may be referred to as receiving antenna 514. In some examples, each antenna is equipped with its own transmission and receive paths, which may be alternately switched to connect to the antenna depending on whether the antenna is operating as transmitting antenna 512 or receiving antenna 514.

In an implementation sensing agent 516 may be responsible for receiving sensing transmissions and associated transmission parameters and calculating sensing measurements for the purpose of Wi-Fi sensing. In some implementations, receiving sensing transmissions and associated transmission parameters, and calculating sensing measurements may be carried out by an algorithm running in the Medium Access Control (MAC) layer of sensing device 502. In an implementation, sensing agent 516 may be configured to cause at least one transmitting antenna of transmitting antenna(s) 512 to transmit messages to remote device 504-1. In an example, sensing agent 516 may be configured to receive, via at least one receiving antenna of receiving antennas(s) 514, messages from remote device 504-1. In an example, sensing agent 516 may be configured to make sensing measurements based on sensing transmissions received from remote device 504-1.

In some embodiments, sensing device 502 may include configuration storage 518 and channel representation information storage 520. Configuration storage 518 may store channel representation information configuration. In a non-limiting example, the channel representation information configuration may include one or more of a number of time domain pulses (N), a maximum time delay boundary of a time delay filter, and an amplitude mask. In an example, each time domain pulse may be represented by a complex number. The complex number may include an amplitude and a phase. The amplitude mask may include one or both of a minimum amplitude mask and a maximum amplitude mask. In an example, the maximum time delay boundary, the minimum amplitude mask, and/or the maximum amplitude mask may collectively be referred to as time domain mask. Channel representation information storage 520 may store information related to sensing measurements that represent state of the channel between sensing device 502 and remote device 504-1. In an example, channel representation information storage 520 may store one or more of Channel State Information (CSI), full TD-CRI, filtered TD-CRI, reconstructed filtered TD-CRI, and reconstructed CSI. Information related to the channel representation information configuration stored in configuration storage 518 and information related to the sensing measurements stored in channel representation information storage 520 may be periodically or dynamically updated as required. In an implementation, configuration storage 518 and channel representation information storage 520 may include any type or form of storage, such as a database or a file system or coupled to memory 510.

Referring again to FIG. 5, remote device 504-1 may include processor 528-1 and memory 530-1. For example, processor 528-1 and memory 530-1 of remote device 504-1 may be processor 114 and memory 116, respectively, as shown in FIG. 1. In an embodiment, remote device 504-1 may further include transmitting antenna(s) 532-1, receiving antenna(s) 534-1, and sensing agent 536-1. In an implementation, sensing agent 536-1 may be a block that passes physical and MAC layer parameters to or from the MAC of remote device 504-1 to application layer programs. Sensing agent 536-1 may be configured to cause at least one transmitting antenna of transmitting antenna(s) 532-1 and at least one receiving antenna of receiving antennas(s) 534-1 to exchange messages with sensing device 502. In some embodiments, an antenna may be used to both transmit and receive in a half-duplex format. When the antenna is transmitting, it may be referred to as transmitting antenna 532-1, and when the antenna is receiving, it may be referred to as receiving antenna 534-1. It is understood by a person of normal skill in the art that the same antenna may be transmitting antenna 532-1 in some instances and receiving antenna 534-1 in other instances. In the case of an antenna array, one or more antenna elements may be used to transmit or receive a signal, for example, in a beamforming environment. In some examples, a group of antenna elements used to transmit a composite signal may be referred to as transmitting antenna 532-1, and a group of antenna elements used to receive a composite signal may be referred to as receiving antenna 534-1. In some examples, each antenna is equipped with its own transmission and receive paths, which may be alternately switched to connect to the antenna depending on whether the antenna is operating as transmitting antenna 532-1 or receiving antenna 534-1.

According to one or more implementations, communications in network 560 may be governed by one or more of the 802.11 family of standards developed by IEEE. Some example IEEE standards may include IEEE P802.11-REVmd/D5.0, IEEE P802.11ax/D7.0, and IEEE P802.11be/D0.1. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network.

According to an embodiment, upon initial association of sensing device 502 with sensing algorithm manager 506, sensing algorithm manager 506 may communicate a channel representation information configuration to sensing device 502 for use in future Wi-Fi sensing session(s). In some embodiments, sensing algorithm manager 506 may communicate the channel representation information configuration to sensing device 502 upon initialization of a Wi-Fi sensing session. In an example, the channel representation information configuration may indicate that channel representation information should be provided in the time domain. The channel representation information configuration may interchangeably be referred to as Time Domain Channel Representation Information (TD-CRI) configuration.

In an implementation, sensing algorithm manager 506 may communicate the channel representation information configuration to sensing device 502 via a sensing configuration message. In an implementation, in response to receiving the sensing configuration message including the channel representation information configuration, sensing device 502 may send an acknowledgment via a sensing configuration response message. Also, sensing device 502 may store the channel representation information configuration in configuration storage 518 for future use.

According to an implementation, sensing algorithm manager 506 may dynamically determine N to represent the CSI accurately according to a ranging process. The N selected time domain pulses may interchangeably be referred to as filtered TD-CRI values. In an example, sensing algorithm manager 506 may perform the ranging process during an association process between sensing device 502 and sensing algorithm manager 506. In an example, sensing algorithm manager 506 may determine N based on one or more of following operational parameters including channel bandwidth, transmission frequency, channel complexity (number of reflective paths), and operational sensing mode (scanning mode versus detection mode). The channel complexity may indicate how many time domain pulses are needed as a baseline. In an example, a path through a channel with many reflections may need more time domain pulses than one with a few reflections. According to an implementation, sensing device 502 may operate in one of a scanning mode or a detection mode. In an example, the scanning mode may enable sensing measurements at a low resolution and the detection mode may enable sensing measurements at a high resolution. Thus, resolution of motion and/or movement detection is lower in scanning mode than in detection mode. Accordingly, fewer time domain pulses may be necessary when sensing device 502 is operating in the scanning mode in comparison to when sensing device 502 is operating in the detection mode. The manner in which N is calculated for 20 MHz channel bandwidth during the ranging process of an example implementation is described hereinafter.

According to an implementation, sensing device 502 may initiate a training measurement campaign. In the training measurement campaign, exchange of transmissions between sensing device 502 and remote device 504-1 may occur. According to an example implementation, sensing device 502 may initiate the training measurement campaign via one or more training sensing trigger messages. A training sensing trigger message may be an example of a sensing trigger message. In an implementation, sensing agent 516 may be configured to generate a training sensing trigger message. In an example, the training sensing trigger message may include a requested transmission configuration. Other examples of information/data included in the training sensing trigger message that are not discussed here are contemplated herein.

According to an implementation, remote device 504-1 may receive the training sensing trigger message from sensing device 502. In an implementation, sensing agent 536-1 may apply the requested transmission configuration included in the training sensing trigger message. Subsequently, sensing agent 536-1 may transmit a training sensing transmission to sensing device 502 in response to the training sensing trigger message and in accordance with the requested transmission configuration. A training sensing transmission may be an example of a sensing transmission.

Figure 6:
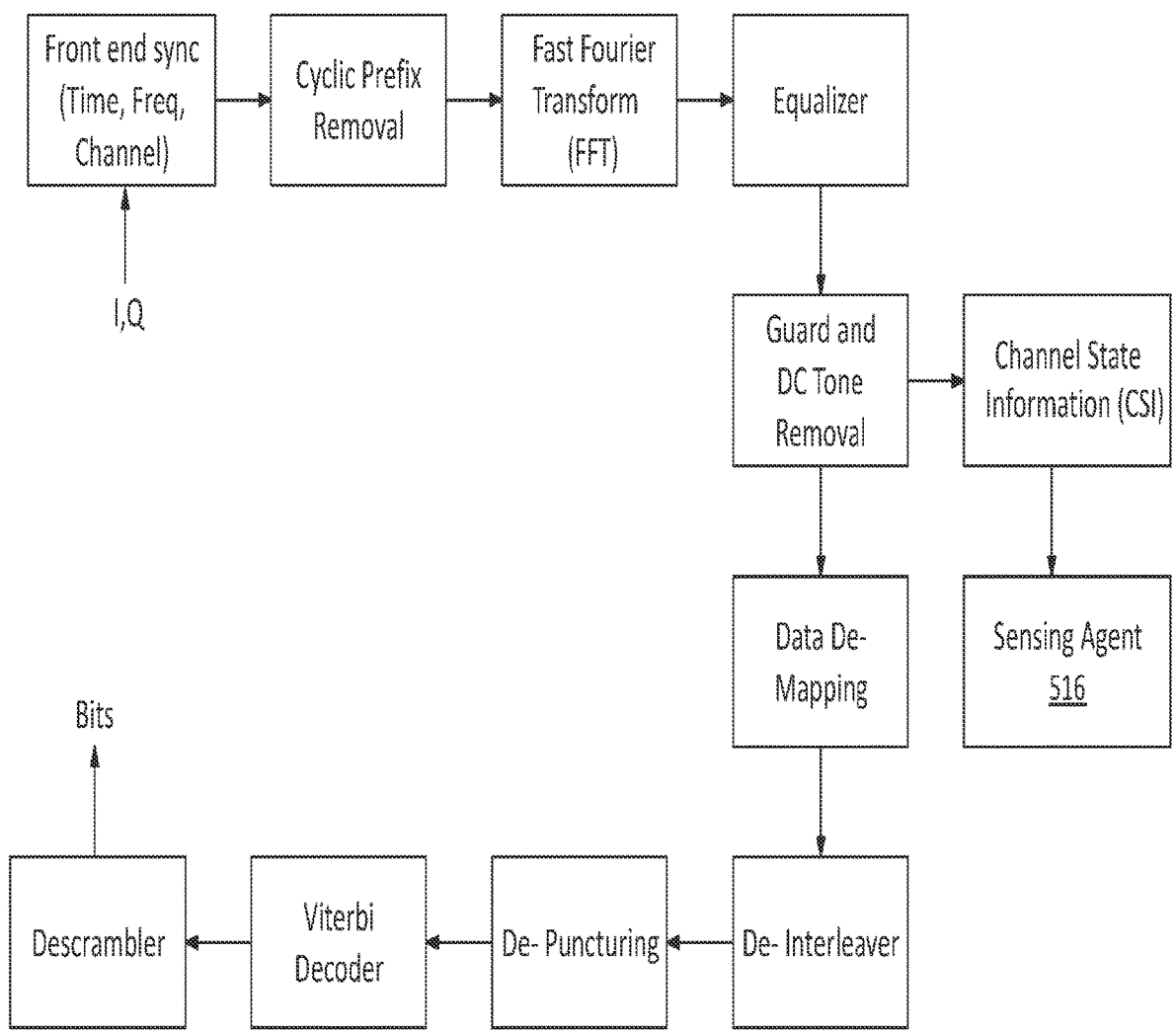
FIG. 6 illustrates a representation of a receiver chain of a sensing device, according to some embodiments.

In an implementation, sensing device 502 may receive the training sensing transmission from remote device 504-1 transmitted in response to the training sensing trigger message. Sensing agent 516 may be configured to generate a sensing measurement based on the training sensing transmission. In an example, generating the sensing measurement based on the training sensing transmission may include calculating CSI. According to an implementation, a baseband receiver of sensing device 502 may be configured to calculate the CSI based on the training sensing transmission. In some implementations, sensing device 502 may calculate a contribution to the CSI by a receiver chain. In an example, the receiver chain of sensing device 502 may include analog elements and digital elements. For example, the receiver chain may include the analog and digital components through which a received signal may travel from a reference point to a point at which the received signal may be read, i.e., by sensing agent 516 of sensing device 502. A representation 600 of the receiver chain of sensing device 502 is illustrated in FIG. 6. As described in FIG. 6, In-phase (I) and Quadra phase (Q) modulated symbols arrive at a frond end of the receiver where synchronization is performed including frequency and timing recovery. Further, time domain guard period (cyclic prefix) is removed, and the receiver performs a Fast Fourier Transform (FFT) on the received signal (for example, the I and Q modulated symbols). Guard tones and DC tones are then removed. CSI is then generated prior to data de-mapping, de-interleaving (using a de-interleaver), de-puncturing, decoding (using a Viterbi decoder) and finally descrambling (using a descrambler). As a result of descrambling, data bits are generated. The generated CSI is provided to sensing agent 516.

In some implementations, an automatic gain control (AGC) may precondition the I and Q samples prior to digitization. The AGC is a dynamic process, and its gain may change over time depending on conditions in the propagation channel. In some examples, a value of gain applied to the signal may be fed from the AGC processing to allow for a compensation operation.

According to an implementation, upon receiving the CSI, sensing agent 516 may send the CSI to sensing algorithm manager 506 for further processing. In an implementation, in response to receiving the CSI, sensing algorithm manager 506 may be configured to perform an Inverse FFT (IFFT) on the CSI, resulting in a time domain representation of the CSI. According to an implementation, sensing algorithm manager 506 may select a candidate number (N-candidate) of time domain pulses from the time domain representation of the CSI.

In an implementation, sensing algorithm manager 506 may arrange the candidate number of time domain pulses in a reconstructed filtered TD-CRI and perform an FFT on the reconstructed filtered TD-CRI. In an example, for 20 MHz channel bandwidth, sensing algorithm manager 506 may perform 64-point FFT on the reconstructed filtered TD-CRI. As a result, frequency domain representation of the number of candidate time domain pulses may be generated. The frequency domain representation of the number of candidate time domain pulses may be referred to as reconstructed CSI (R-CSI). In an example, sensing algorithm manager 506 may process the number of candidate time domain pulses values with the same configuration of FFT used for generation of the CSI.

According to an implementation, sensing algorithm manager 506 may calculate an error signal between the CSI and the R-CSI. In an example, sensing algorithm manager 506 may compare the R-CSI with the actual CSI to calculate the error signal. In an implementation, sensing algorithm manager 506 may adjust the candidate number of time domain pulses (N-candidate) based on the error signal. According to an implementation, sensing algorithm manager 506 may calculate a Signal-to-Noise Ratio (SNR) of the R-CSI, including the error signal, and compare the SNR to an SNR threshold. Thereafter, sensing algorithm manager 506 may adjust N-candidate based on the comparison result to determine the required number of time domain pulses (N). In an example, N-candidate may be equal to N.

Figure 7:
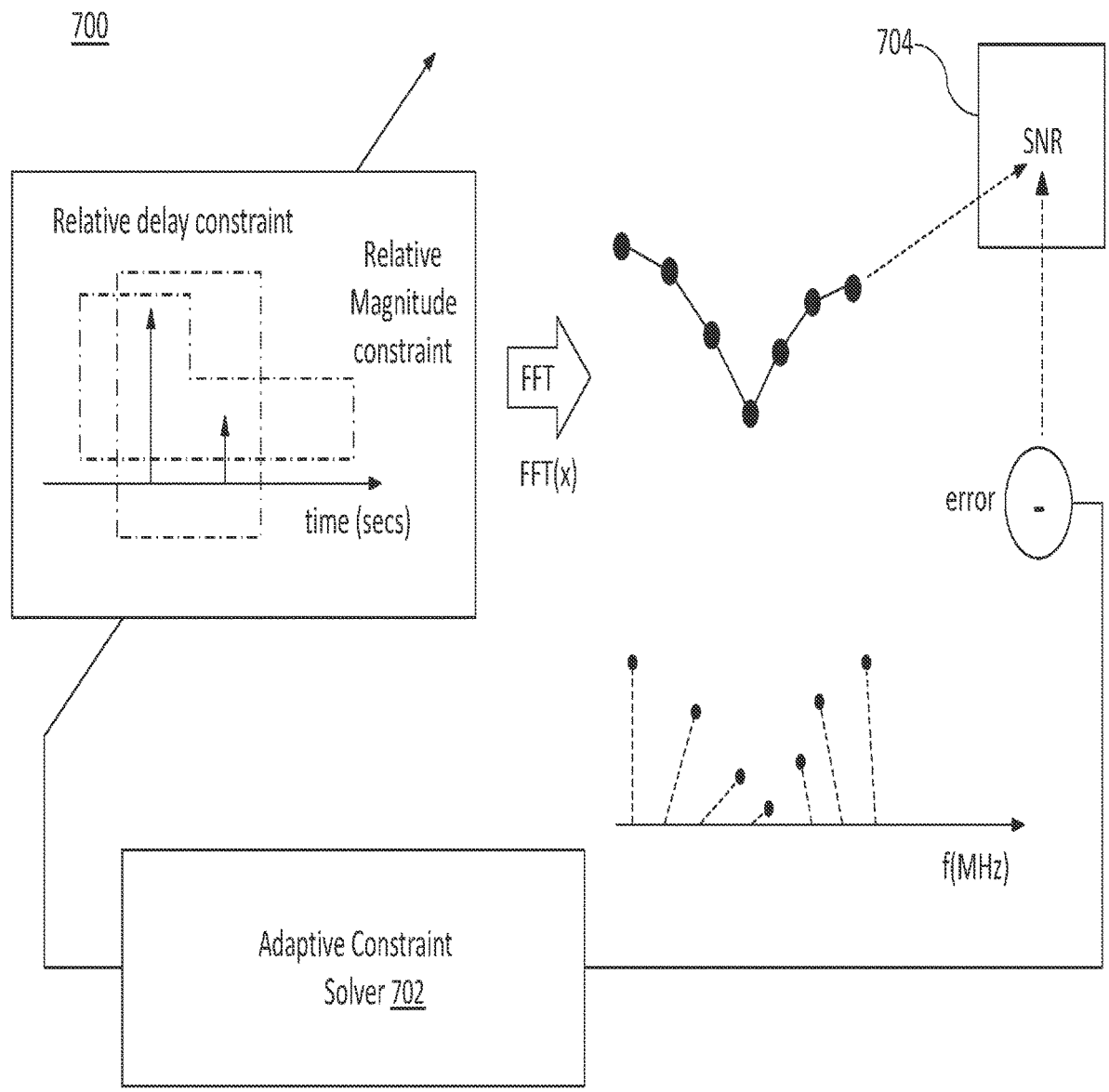
FIG. 7 illustrates an exemplary process of calculating an error signal to calculate a required number of time domain pulses according to some embodiments.

In an implementation, sensing algorithm manager 506 may include an adaptive constraint solver that may be configured to adjust N-candidate until a desired SNR is reached. FIG. 7 illustrates an exemplary process 700 of calculating the error signal to calculate N, according to some embodiments. In the example of FIG. 7, adaptive constraint solver 702 is configured to adjust N-candidate to calculate N. In an example, N-candidate is adjusted until a desired SNR is reached (shown by block 704). As gathered from above, the ranging process involves a comparison process where the R-CSI created with N-candidate time domain pulses is compared with the actual CSI and the error signal is created/calculated. When the error signal meets a certain error threshold, then N-candidate is determined to be a sufficient number of time domain pulses and N-candidate is transferred to N to be used by system 500 for future sensing sessions.

In an example implementation, for determining a suitable error signal threshold, a dynamic range of a signal at the input of Digital Signal Processor (DSP) may set the upper limit for the SNR. In an example, the SNR of an input to the DSP may be between 20 dB and 30 dB. Accordingly, if the error signal is at least 30 dB below the desired signal then it will be indistinguishable from other noise, the match between the R-CSI and the CSI is sufficient, and N has been established.

According to an implementation that determines N, the minimum error signal (i.e., maximum tolerated error between the R-CSI and the CSI) is limited because the SNR at the DSP in the baseband receiver (where the CSI calculations are made) is limited by receiver noise and losses earlier in the receiver chain. In an example, sources of noise include quantization noise of the Analog-to-Digital Converter (ADC), Gaussian noise from the environment, noise from the Low Noise Amplifier (LNA) in the receiver chain, phase noise due to imperfect timing and phase recovery and local oscillator errors, and switching noise incurred during signal transmission on a printed circuit board. Accordingly, in creating the R-CSI, a representation of the CSI is produced within an error margin that is approximately the same as the SNR available at the input to the DSP, at which point system 500 incurs minimal or no loss of resolution and precision by using the R-CSI in place of the CSI.

Figure 8:
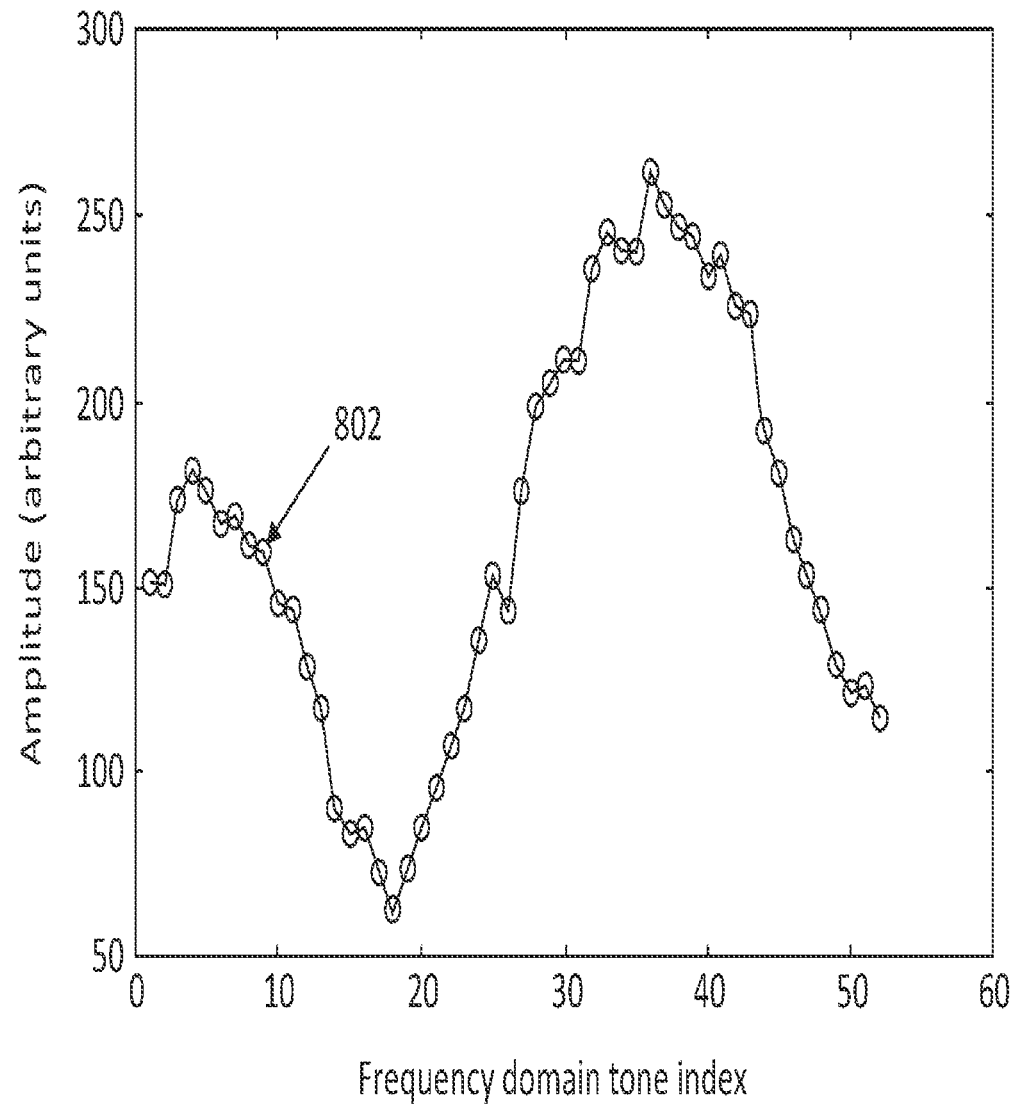
FIG. 8 illustrates an indoor channel representation in the frequency domain, according to some embodiments.

FIG. 8 illustrates indoor channel representation 800 in the frequency domain, according to some embodiments. Indoor channel representation 800 is measured over 52 subcarriers (i.e., tones) in a 20 MHz channel (48 data subcarriers and 4 pilot subcarriers). In FIG. 8, X axis is a frequency domain tone index and a representation of frequency domain and Y axis is a representation of amplitude of signal (in arbitrary units). Each small circle 802 represents a discrete CSI value.

Figure 9:
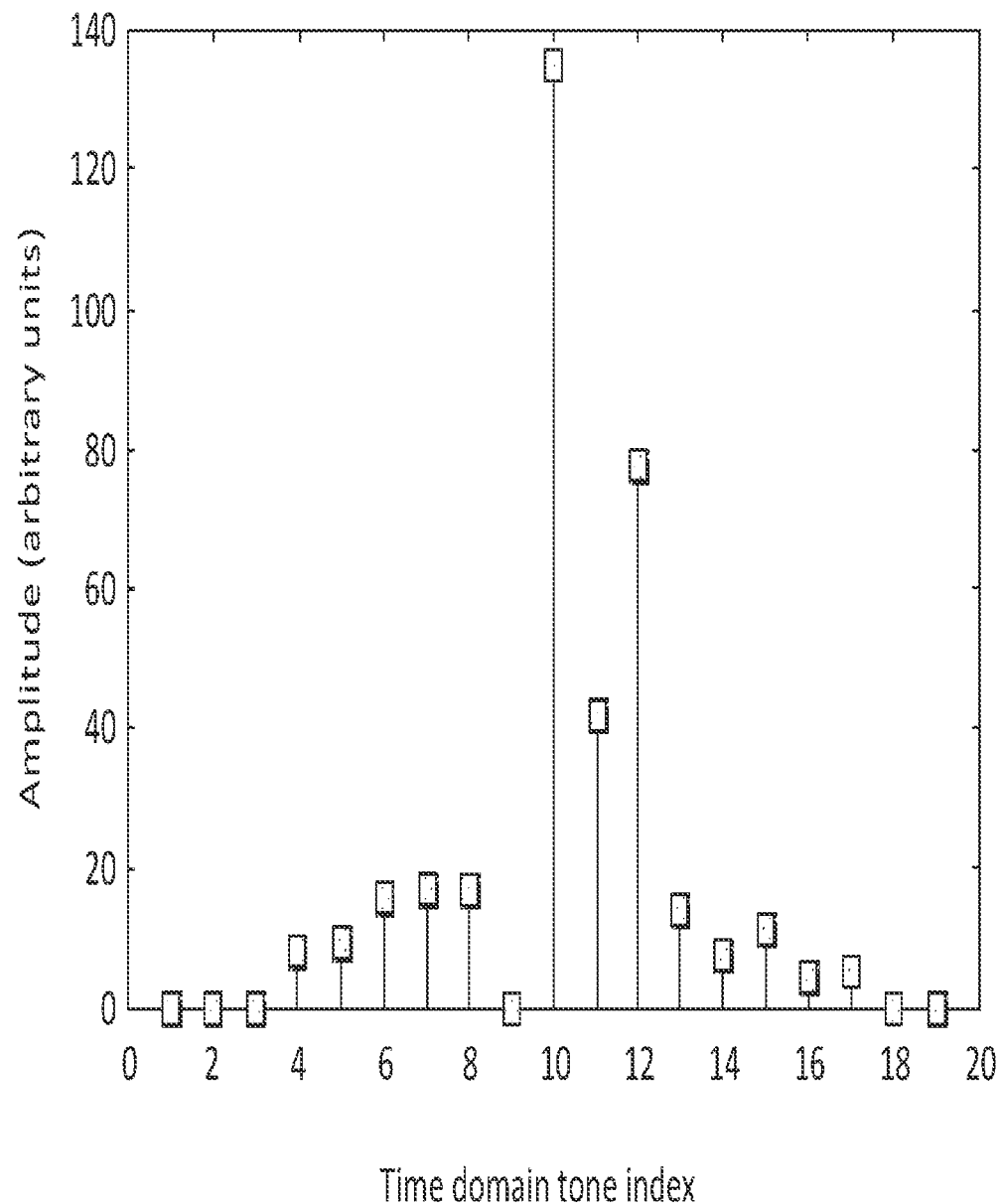
FIG. 9 illustrates an indoor channel representation in the time domain, according to some embodiments.

FIG. 9 illustrates indoor channel representation 900 in the time domain, according to some embodiments. In an example, indoor channel representation 900 is represented using time domain pulses. In FIG. 9, X axis is a time domain tone index and a representation of time delay in symbols and Y axis is a representation of amplitude of signal (in arbitrary units). In an example, "Time 0" point is an arbitrary reference point which is chosen based on the earliest that a received symbol could reach the baseband receiver, for example in a line-of-sight scenario. In an example, the "Time 0" point on the X axis may be chosen as the first point in time that the baseband receiver detects energy from the sensing transmission. The arrival of energy of symbols from that point onwards are displayed in FIG. 9. As illustrated in FIG. 9, the time domain pulse having the highest amplitude appears several symbols out from "Time 0" point.

Figure 10:
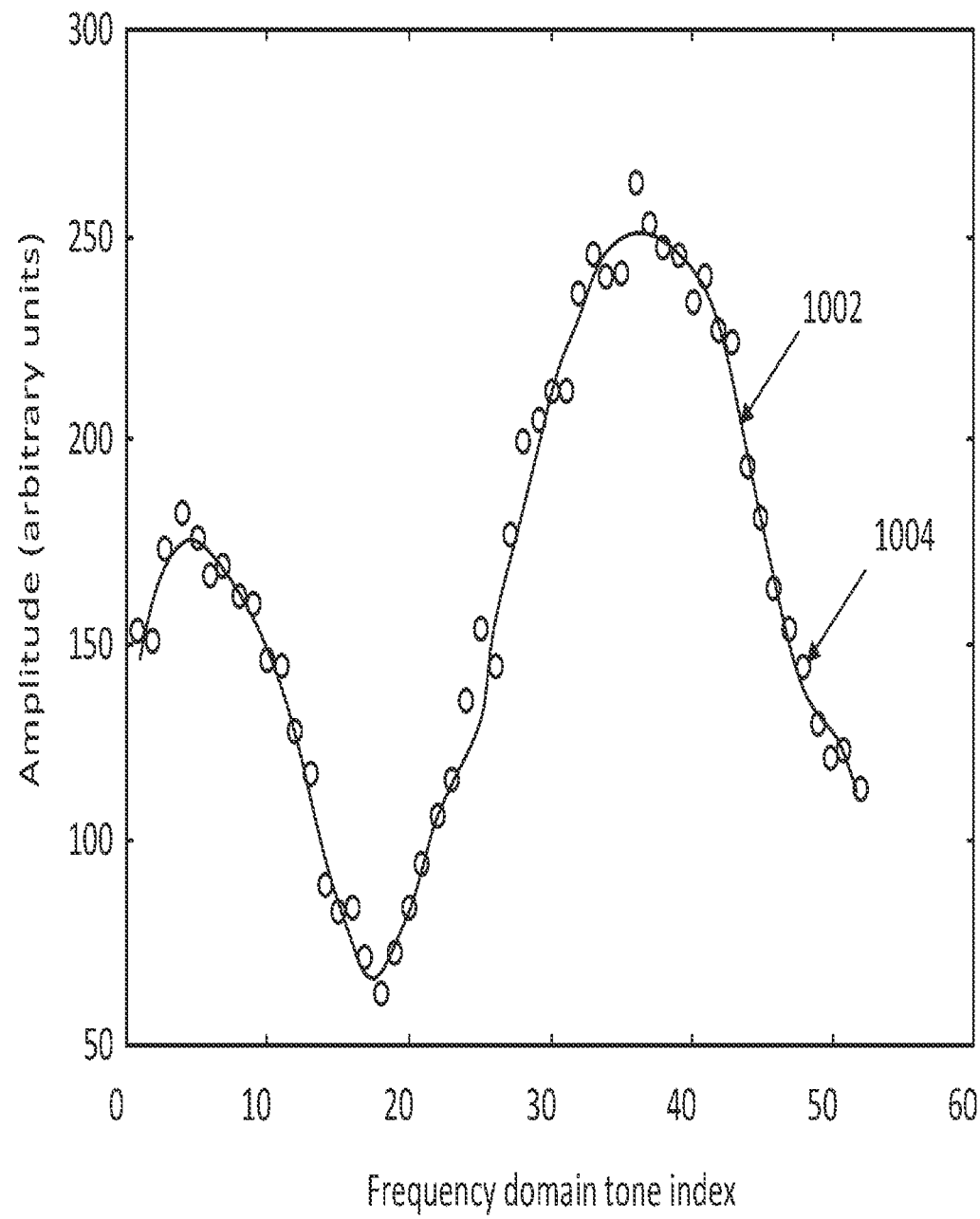
FIG. 10 illustrates a graphical representation of Channel State Information (CSI) versus Reconstructed CSI (R-CSI), according to some embodiments.

FIG. 10 illustrates graphical representation 1000 of the CSI versus R-CSI, according to some embodiments. In FIG. 10, X axis is a frequency domain tone index and a representation of frequency domain and Y axis is a representation of amplitude of signal (in arbitrary units). In an implementation, FIG. 10 illustrates a comparison between the R-CSI (represented by line "1002") and the CSI values (represented by circles "1004"). The R-CSI demonstrates greater than 20 dB SNR. In an example, since the SNR is close to the maximum SNR that the receiver chain usually processes (i.e., the SNR at the input to the DSP), there is minimal or no loss of resolution and precision by using the R-CSI in place of the CSI.

According to an implementation, sensing algorithm manager 506 may generate a lookup table of the number of time domain pulses required to achieve a minimum SNR. An exemplary lookup table for 20 MHz channel bandwidth is shown in Table 1, provided below.

TABLE 1

Example lookup table for the number of time domain pulses based on minimum SNR requirements
20 MHz Channel Bandwidth

| Number of time domain pulses | Minimum SNR (dB) |
|---|---|
| 1 | 0.00 |
| 2 | 7.53 |
| 3 | 11.93 |
| 4 | 15.05 |
| 5 | 17.47 |
| 6 | 19.45 |
| 7 | 21.13 |
| 8 | 22.58 |
| 9 | 23.86 |
| 10 | 25.00 |
| 11 | 26.03 |
| 12 | 26.98 |

Although it has been described that sensing algorithm manager 506 generates the lookup table for 20 MHz channel bandwidth, in some implementations, sensing algorithm manager 506 may generate multiple such lookup tables, for example, one for each of the operable channel bandwidths (for example, 40 MHz, 80 MHz, and 160 MHz), transmission frequency, channel complexity, and operational sensing mode. Accordingly, based on the operational parameters, sensing algorithm manager 506 may use an appropriate lookup table to determine N.

Figure 11:
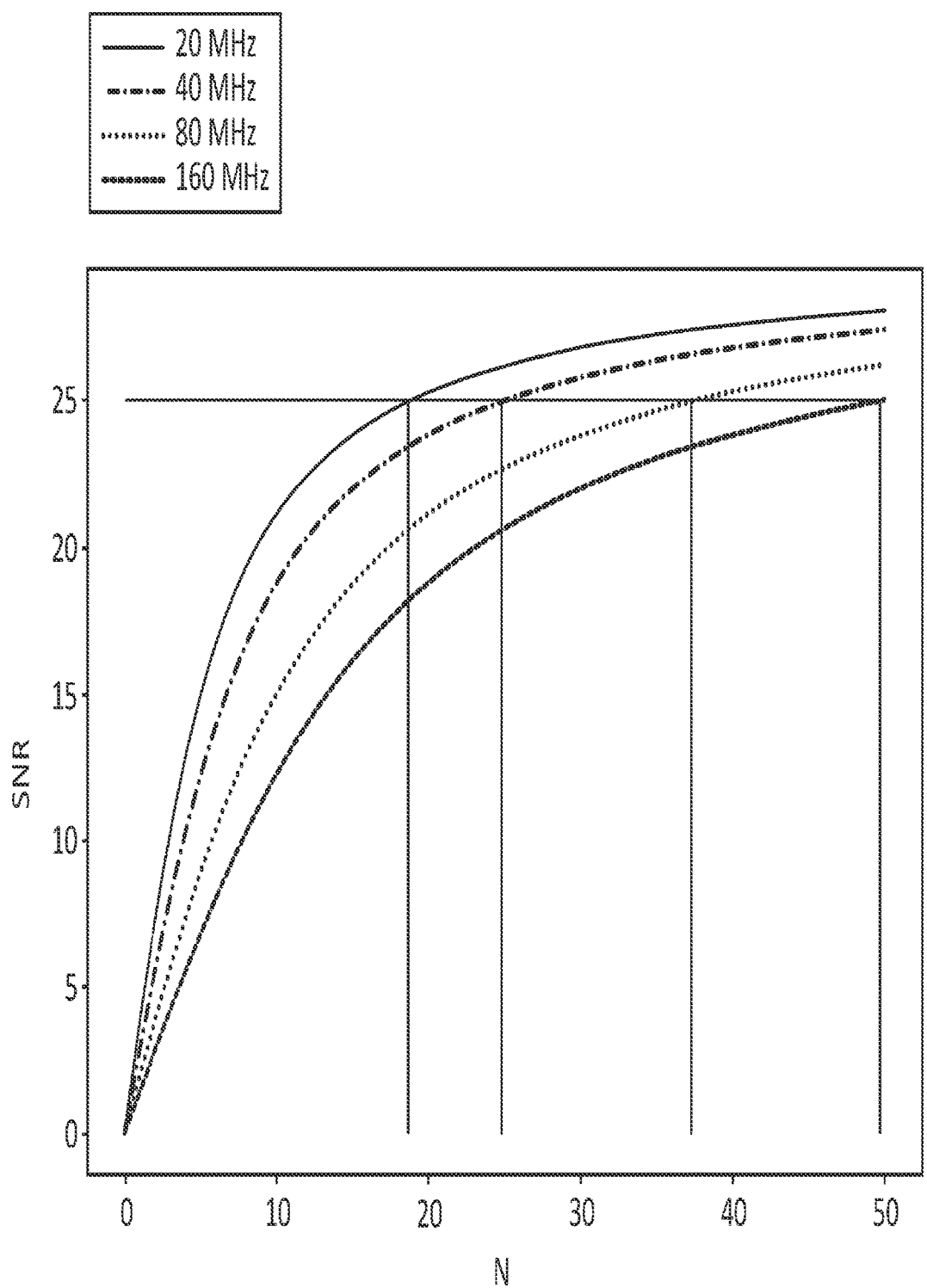
FIG. 11 illustrates a graphical representation of the number of time domain pulses versus minimum Signal-to-Noise Ratio (SNR) for different channel bandwidths, according to some embodiments.

In an implementation, the relationship between the number of time domain pulses required to achieve the necessary SNR and the channel bandwidth is not linear. FIG. 11 illustrates graphical representation 1100 of the number of time domain pulses (N) versus minimum SNR for different channel bandwidths (e.g., 20 MHz channel bandwidth, 40 MHz channel bandwidth, 80 MHz channel bandwidth, and 160 MHz channel bandwidth). As depicted in FIG. 11, N required to achieve a minimum SNR may be approximately logarithmic. Therefore, although the number of CSI values required for a larger channel bandwidth increases linearly, the number of time domain pulses does not.

According to an example implementation, sensing algorithm manager 506 may generate a lookup table for N based on sensing mode for different channel bandwidths. In some implementations, N associated with a scanning mode of operation for a given channel bandwidth may be different to N associated with a detection mode of operation for a given channel bandwidth. An exemplary lookup table for N based on sensing mode for different channel bandwidths is shown in Table 2.

TABLE 2

Example lookup table for the N based on sensing mode for different channel bandwidths

| Channel Bandwidth | Sensing Mode | |
|---|---|---|
| | Scanning Mode | Detection Mode |
| 20 MHZ | 7 | 15 |
| 40 MHZ | 10 | 20 |
| 80 MHZ | 12 | 24 |
| 160 MHz | 13 | 26 |

According to an implementation, if N is fixed for each sensing mode and for each channel bandwidth, then N may not be provided to sensing device 502 as sensing device 502 may be capable of deriving N to use based on the sensing mode that sensing device 502 is operating in and the channel bandwidth that sensing device 502 is using.

According to some implementations, sensing algorithm manager 506 may determine N according to a simulation process. In an implementation, sensing algorithm manager 506 may use simulations to determine a minimum number of time domain pulses for each channel bandwidth necessary to achieve a certain error rate. In an example, sensing algorithm manager 506 may generate a table for the number of time domain pulses. In an implementation, the table may be preconfigured into sensing device 502 or sent to sensing device 502 as a part of a configuration process. For example, the table may be hard coded into sensing device 502. According to an example implementation, sensing algorithm manager 506 may communicate an index into the table to sensing device 502.

According to an implementation, as a part of the ranging process or upon the association process between sensing algorithm device 506 and sensing device 502, sensing algorithm manager 506 may communicate the channel representation information configuration including N to sensing device 502 in the sensing configuration message. In an implementation, sensing algorithm manager 506 may send N to sensing device 502 in a form of one or more lookup tables (for example, Table 1 and Table 2).

In an implementation, the selection of N may be based on a maximum time delay boundary. The maximum time delay boundary may represent a maximum time delay of selectable time domain pulses of the time domain representation of the sensing measurement. In an example, the maximum time delay boundary may set an upper limit on time delay of the time domain pulses as well as optionally maximum and minimum amplitude masks of the time domain pulses. In an implementation, sensing algorithm manager 506 may communicate time domain mask characteristics (i.e., characteristics of the maximum time delay boundary, the minimum amplitude mask, and the maximum amplitude mask) to sensing device 502 as a part of an association process between sensing algorithm manager 506 and sensing device 502. In some implementations, time domain mask characteristics may be preconfigured into sensing device 502 or sent to sensing device 502 as a part of a configuration process. In an example, sensing algorithm manager 506 may generate a table for the time domain mask characteristics. In an implementation, the table may be preconfigured into sensing device 502 or sent to sensing device 502 as a part of a configuration process. For example, the table may be hard coded into sensing device 502. According to an example implementation, sensing algorithm manager 506 may communicate an index into the table to sensing device 502. In an implementation, sensing algorithm manager 506 may communicate the channel representation information configuration including the time domain mask to sensing device 502 in the sensing configuration message.

In some implementations, sensing algorithm manager 506 may determine a minimum number of time domain pulses and a maximum number of time domain pulses within the maximum time delay boundary. If there are sufficient number of time domain pulses in the maximum time delay boundary that are within the amplitude mask to select the maximum number of time domain pulses, then sensing algorithm manager 506 may select the maximum number of time domain pulses as a value for N. Further, if there are less than the maximum number of time domain pulses in the maximum time delay boundary that are within the amplitude mask but greater than the minimum number of time domain pulses, then the sensing algorithm manager 506 may select tones that meet the time domain mask criteria. In an example implementation, the manner in which sensing algorithm manager 506 communicates the time domain mask (i.e., the maximum time delay boundary, the minimum amplitude mask, and the maximum amplitude mask) to sensing device 502 is described hereinafter.

Figure 12:
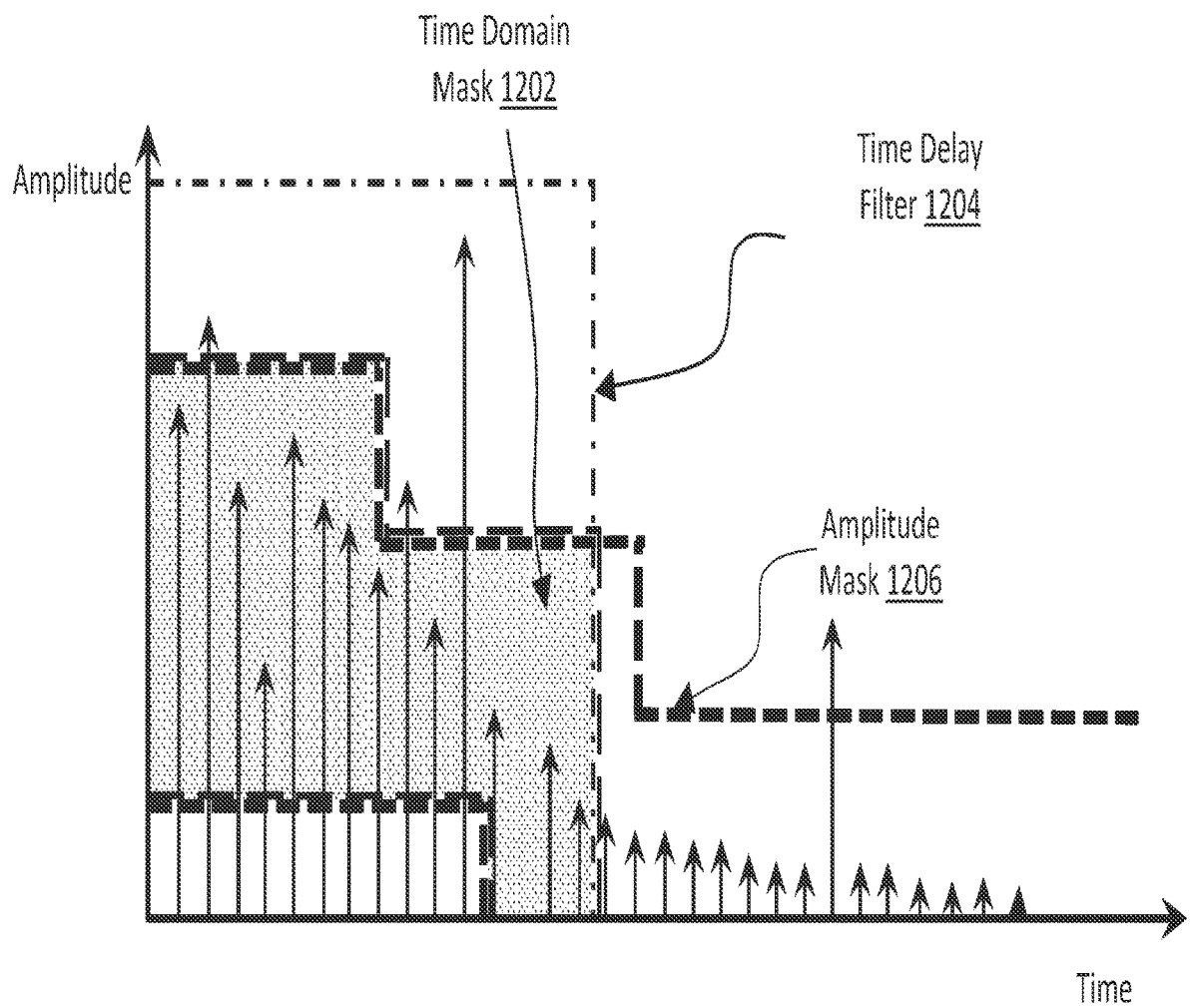
FIG. 12 depicts an illustration of a time domain mask, according to some embodiments.

FIG. 12 depicts illustration 1200 of time domain mask 1202, according to some embodiments. As described in FIG. 12, time domain mask 1202 is an aggregation of time delay filter 1204 (maximum time delay boundary) and amplitude mask 1206 (minimum amplitude mask and maximum amplitude mask).

Figure 13:
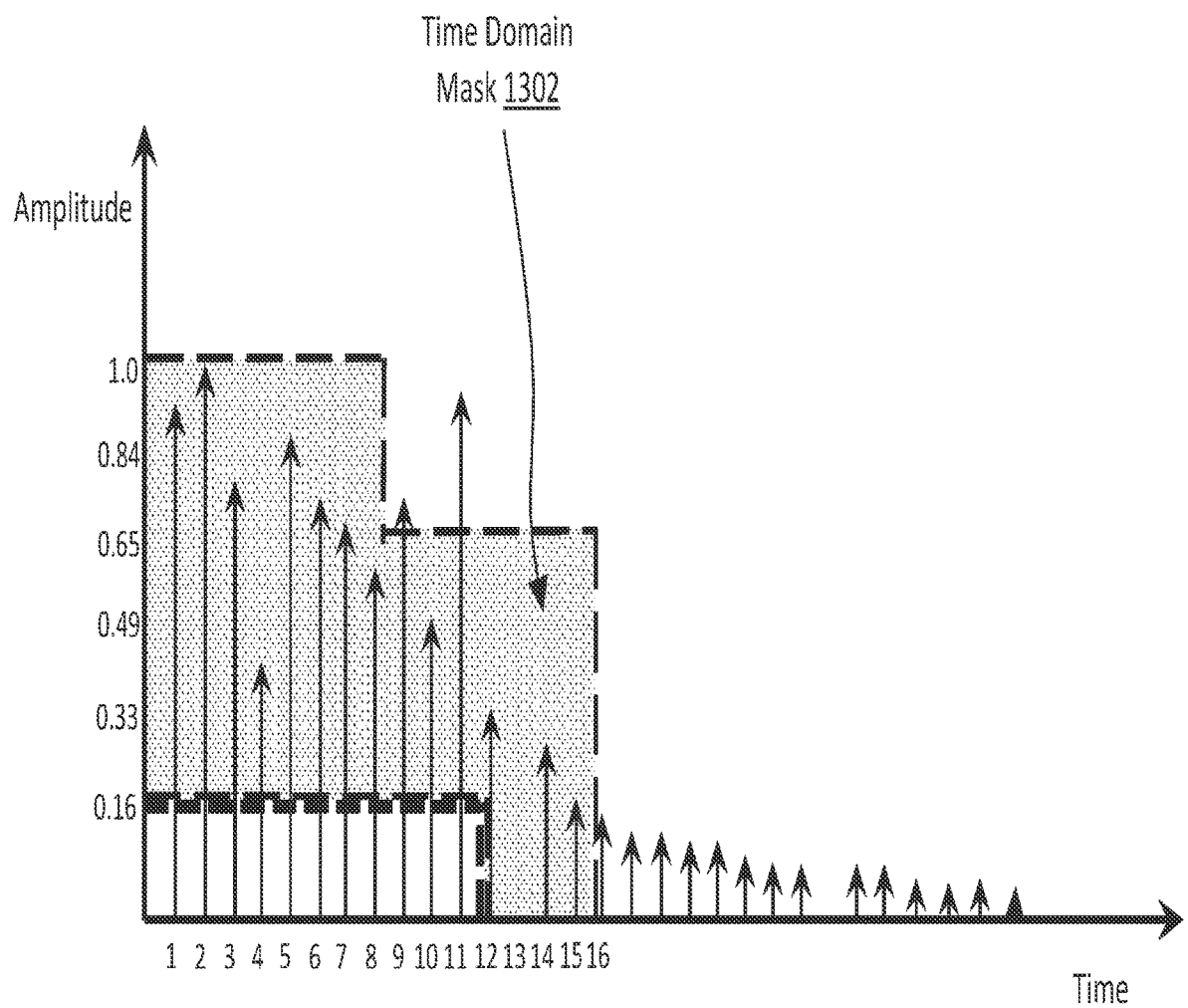
FIG. 13 depicts an illustration of another time domain mask, according to some embodiments.

In some implementations, sensing algorithm manager 506 may generate a table for time domain mask 1202 which associates a minimum amplitude mask 1206 and a maximum amplitude mask 1206 with a given symbol. In an implementation, sensing algorithm manager 506 may set the minimum amplitude mask 1206 and the maximum amplitude mask 1206 as zero. An example is illustrated in Table 3, where the amplitude boundary is a normalized value based on the amplitude of the highest time domain pulse (i.e., the normalized amplitude is a number between zero and 1.0, where the highest time domain pulse has a normalized amplitude of 1.0). FIG. 13 depicts illustration 1300 of time domain mask 1302 captured in Table 3.

TABLE 3

Time Domain Mask Illustration
Time Domain Mask Definition

| Symbol | Maximum Normalized Amplitude | Minimum Normalized Amplitude |
| --- | --- | --- |
| 1 | 1.00 | 0.16 |
| 2 | 1.00 | 0.16 |
| 3 | 1.00 | 0.16 |
| 4 | 1.00 | 0.16 |
| 5 | 1.00 | 0.16 |
| 6 | 1.00 | 0.16 |
| 7 | 1.00 | 0.16 |
| 8 | 1.00 | 0.16 |
| 9 | 0.65 | 0.16 |
| 10 | 0.65 | 0.16 |
| 11 | 0.65 | 0.16 |
| 12 | 0.65 | 0.00 |
| 13 | 0.65 | 0.00 |
| 14 | 0.65 | 0.00 |
| 15 | 0.65 | 0.00 |
| 16 | 0.00 | 0.00 |
| 17 | 0.00 | 0.00 |
| 18 | 0.00 | 0.00 |
| 19 | 0.00 | 0.00 |
| 20 | 0.00 | 0.00 |

In some implementations, sensing algorithm manager 506 may preconfigure multiple time domain masks into sensing device 502. In an example, one time domain mask from amongst the multiple time domain masks may be chosen by using an index into the multiple preconfigured time domain masks.

Referring again to FIG. 5, according to one or more implementations, for the purpose of Wi-Fi sensing, sensing device 502 may initiate a measurement campaign (also referred to as a Wi-Fi sensing session). In the measurement campaign, exchange of transmissions between sensing device 502 and remote device 504-1 may occur. In an example, control of these transmissions may be with the MAC layer of the IEEE 802.11 stack. According to an example implementation, sensing device 502 may initiate the measurement campaign via one or more sensing trigger messages. In an implementation, sensing agent 516 may be configured to generate a sensing trigger message. In an example, the sensing trigger message may include a requested transmission configuration. Other examples of information/data included in the sensing trigger message that are not discussed here are contemplated herein. In an implementation, sensing agent 516 may transmit the sensing trigger message to remote device 504-1 via transmitting antenna 512.

According to an implementation, remote device 504-1 may receive the sensing trigger message from sensing device 502 via receiving antenna 534-1. In an implementation, sensing agent 536-1 may apply the requested transmission configuration included in the sensing trigger message. Subsequently, sensing agent 536-1 may transmit a sensing transmission to sensing device 502 in response to the sensing trigger message and in accordance with the requested transmission configuration. In an implementation, sensing agent 536-1 may be configured to transmit the sensing transmission to sensing device 502 via transmitting antenna 532-1.

In an implementation, sensing device 502 may receive the sensing transmission from remote device 504-1 transmitted in response to the sensing trigger message. Sensing device 502 may be configured to receive the sensing transmission from remote device 504-1 via receiving antenna 514. According to an implementation, sensing agent 516 may be configured to generate a sensing measurement based on the sensing transmission. In an example, generating the sensing measurement based on the sensing transmission may include calculating CSI. Subsequent to generating the sensing measurement, sensing agent 516 may generate a time domain representation of the sensing measurement. In an implementation, sensing agent 516 may perform an IFFT on the sensing measurement to generate the time domain representation of the sensing measurement.

According to an implementation, sensing agent 516 may select one or more time domain pulses indicative of the time domain representation based on the channel representation information configuration. In an implementation, sensing agent 516 may retrieve the channel representation information configuration from configuration storage 518.

According to an example implementation, the channel representation information configuration may include only N. In an implementation, sensing agent 516 may select only that many number of time domain pulses. In an example, if N=8, then sensing agent 516 may select 8 time domain pulses and remaining time domain pulses (i.e., time domain pulses that are not selected) are zeroed or nulled.

Figure 14:
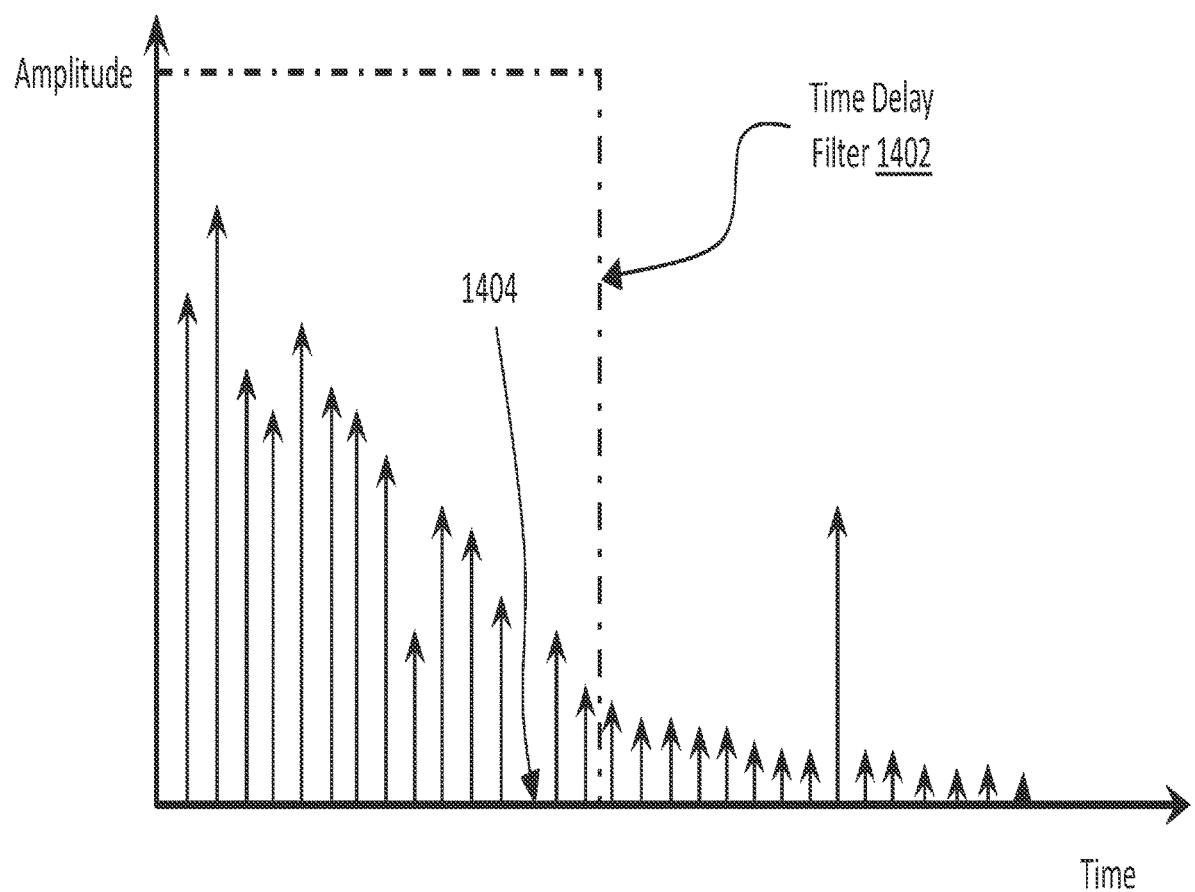
FIG. 14 depicts an illustration of a time domain representation of a sensing measurement with a boundary defined by a time delay filter, according to some embodiments.
Figure 15:
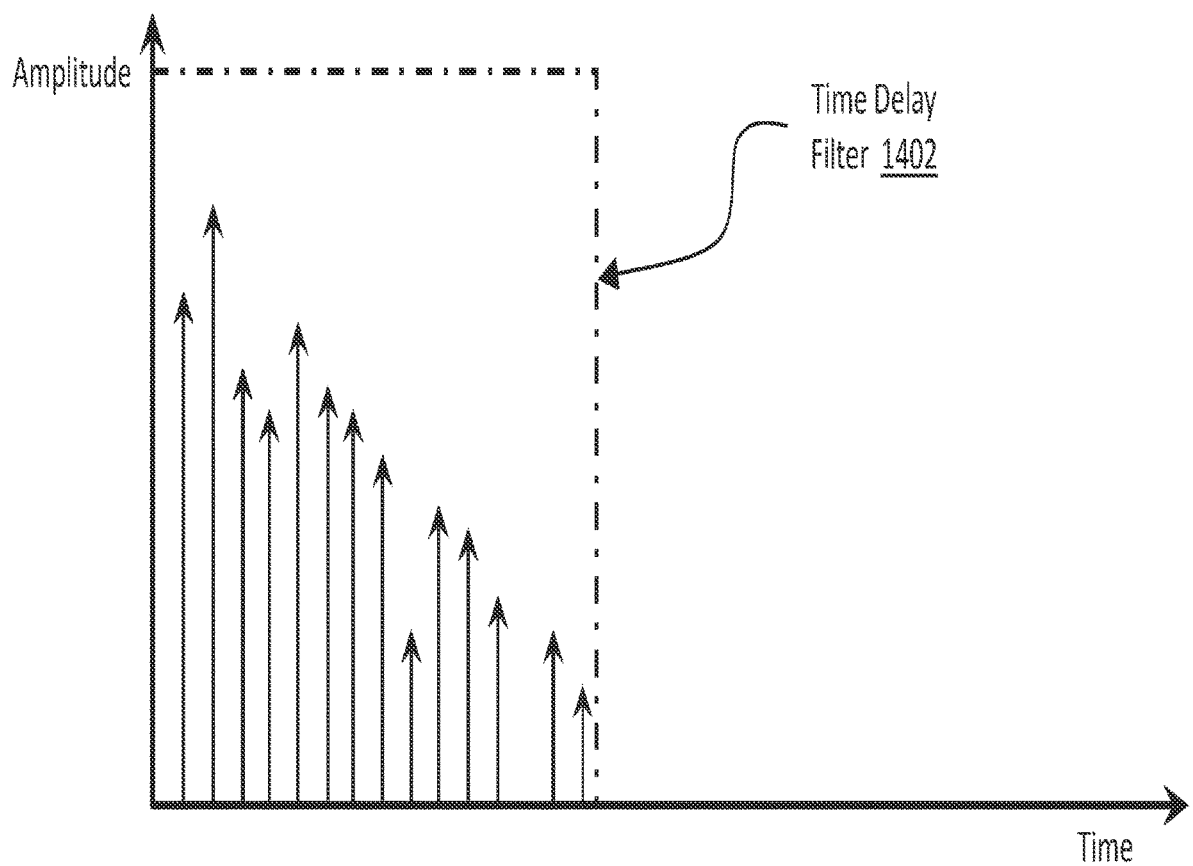
FIG. 15 depicts an illustration of selected time domain pulses up to the boundary defined by the time delay filter in FIG. 14, according to some embodiments.

According to another example implementation, the channel representation information configuration may include the maximum time delay boundary of the time delay filter. Accordingly, sensing agent 516 may apply the maximum time delay boundary of the time delay filter to select the one or more time domain pulses. In an implementation, sensing agent 516 may select all time domain pulses up to the maximum time delay boundary of the time delay filter and exclude the time domain pulses that are beyond the defined the maximum time delay boundary. In an example, sensing agent 516 may select all time domain pulses with a time delay less than the maximum time delay boundary. FIG. 14 depicts illustration 1400 of the time domain representation of the sensing measurement with a boundary defined by time delay filter 1402. In an example shown in FIG. 14, the boundary defined by time delay filter 1402 is first 15 time domain tones. As depicted in FIG. 14, there are only 14 time domain pulses in the first 15 time domain tones as 13th time domain tone (represented by reference numeral "1404") does not contain any energy. According to an implementation, sensing agent 516 may select all the time domain pulses in each time domain tone up to the 15th time domain tone. Further, the remaining time domain pulses (i.e., at time domain tone 16 and beyond) are nulled. FIG. 15 depicts illustration 1500 of selected time domain pulses up to the boundary defined by time delay filter 1402 in FIG. 14, according to some embodiments. As shown in illustration 1500 of FIG. 15, the time domain pulses that are inside the boundary defined by time domain filter 1402 (i.e., all the time domain pulses in each time domain tone up to the 15th time domain tone) are retained, and the other time domain pulses beyond the boundary defined by time delay filter 1402 (i.e., the time domain pulse at time domain tone 16 and beyond) are nulled.

Figure 16:
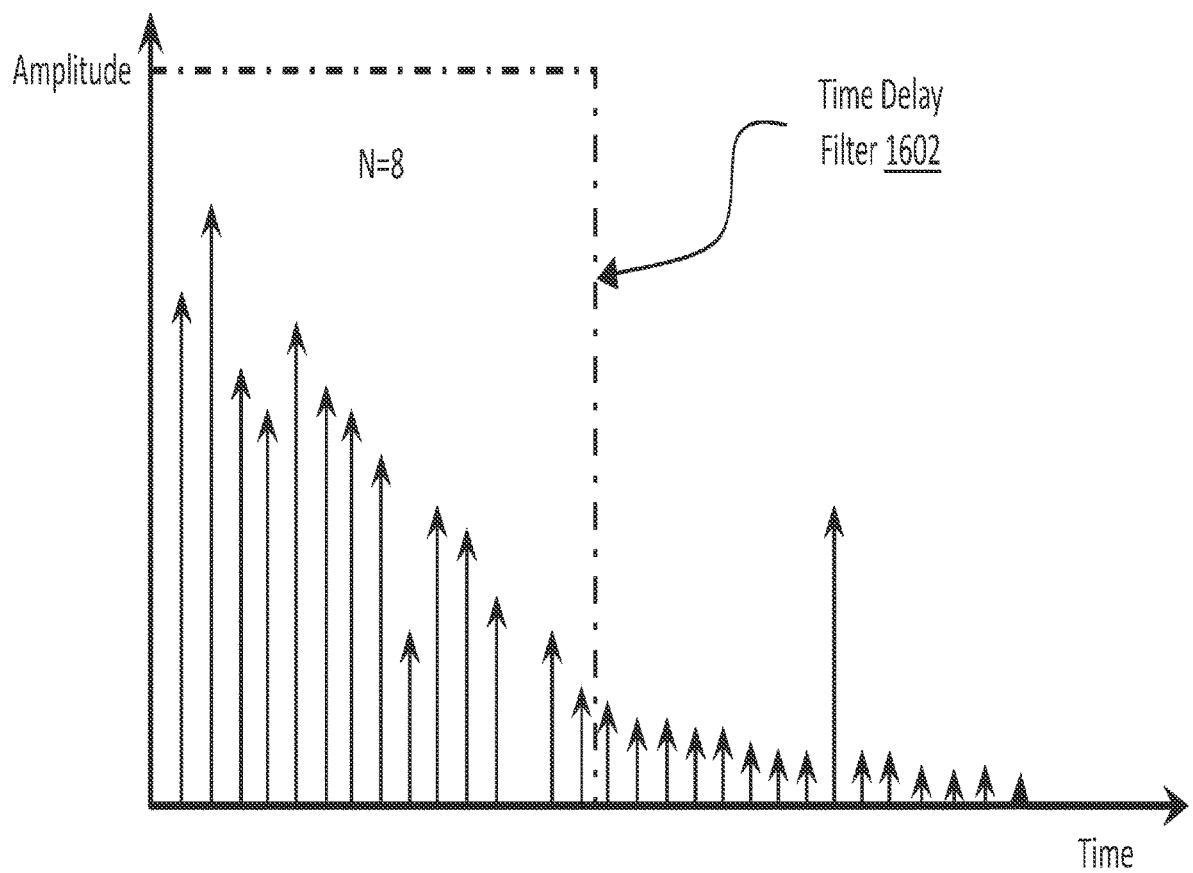
FIG. 16 depicts an illustration of a time domain representation of a sensing measurement with a boundary defined by the time delay filter and a number of time domain pulses according to some embodiments.
Figure 17:
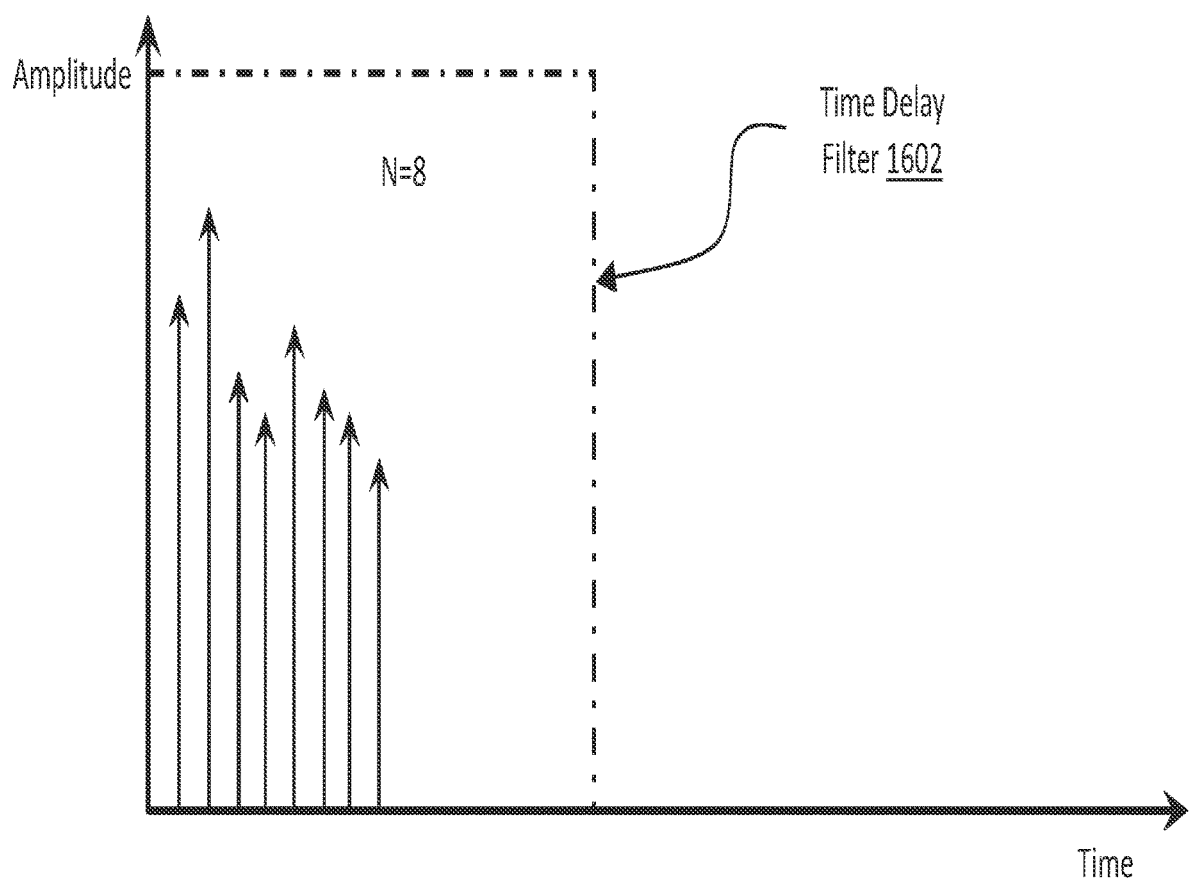
FIG. 17 depicts an illustration of selected time domain pulses according to the number of time domain pulses and up to the boundary defined by the time delay filter in FIG. 16, according to some embodiments.

According to yet another example implementation, the channel representation information configuration may include N and the maximum time delay boundary of the time delay filter. Accordingly, the time domain pulses available for selection are bound by the time delay filter, i.e., any time domain pulse with a greater time delay than the boundary defined by the time delay filter will be nulled by sensing agent 516. FIG. 16 depicts illustration 1600 of the time domain representation of a sensing measurement with a boundary defined by time delay filter 1602 and a number of time domain pulses, according to some embodiments. As shown in FIG. 16, N=8 and the boundary defined by time delay filter 1602 is first 15 time domain tones. Accordingly, sensing agent 516 may select 8 time domain pulses with highest amplitude of all the time domain pulses that are within boundary defined by time delay filter 1602. Further, energy of all other time domain tones is nulled. FIG. 17 depicts illustration 1700 of selected time domain pulses according to N and up to the boundary defined by time delay 1602 filter in FIG. 16, according to some embodiments. In the example of FIG. 17, 8 time domain pulses having highest amplitude and within the boundary of 15 time domain tones are selected by sensing agent 516.

Figure 18:
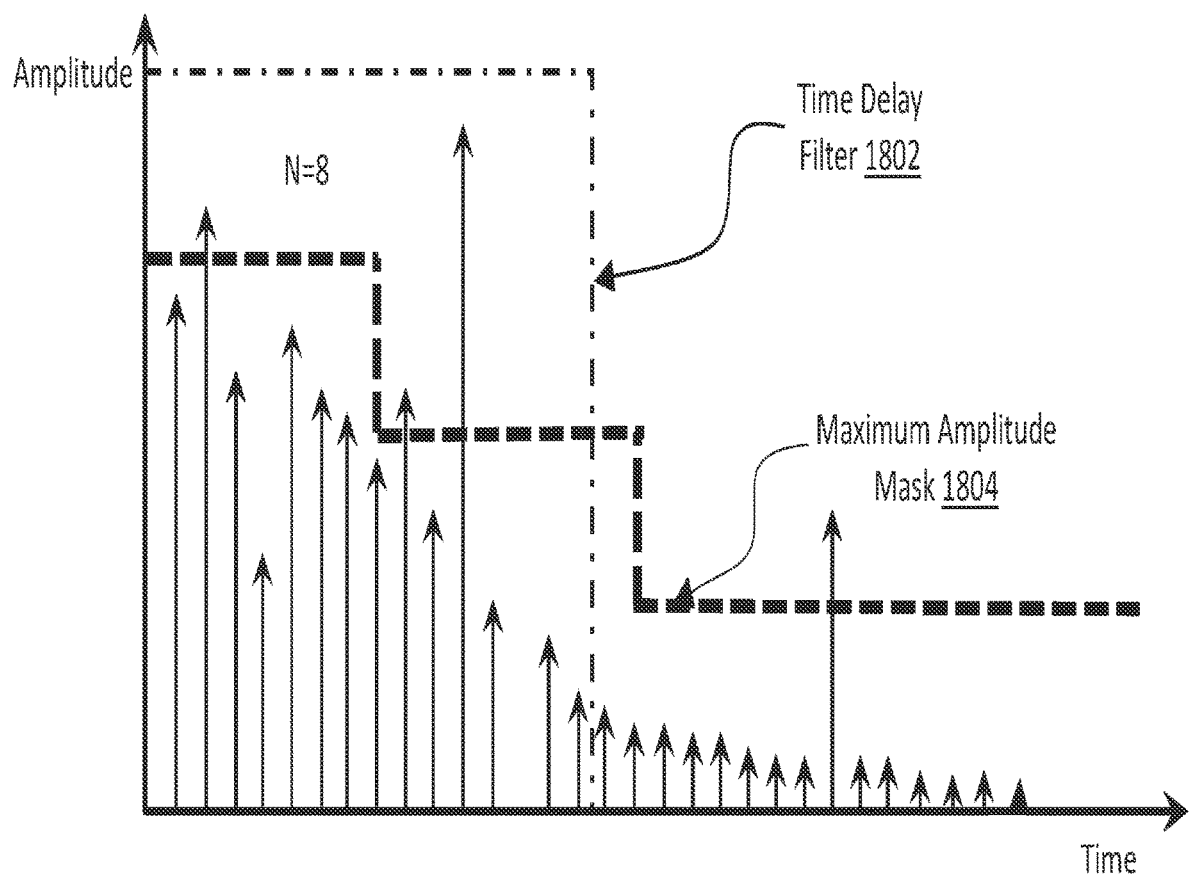
FIG. 18 depicts an illustration of a time domain representation of a sensing measurement with a boundary defined by the time delay filter, a number of time domain pulses and a maximum amplitude mask, according to some embodiments.
Figure 19:
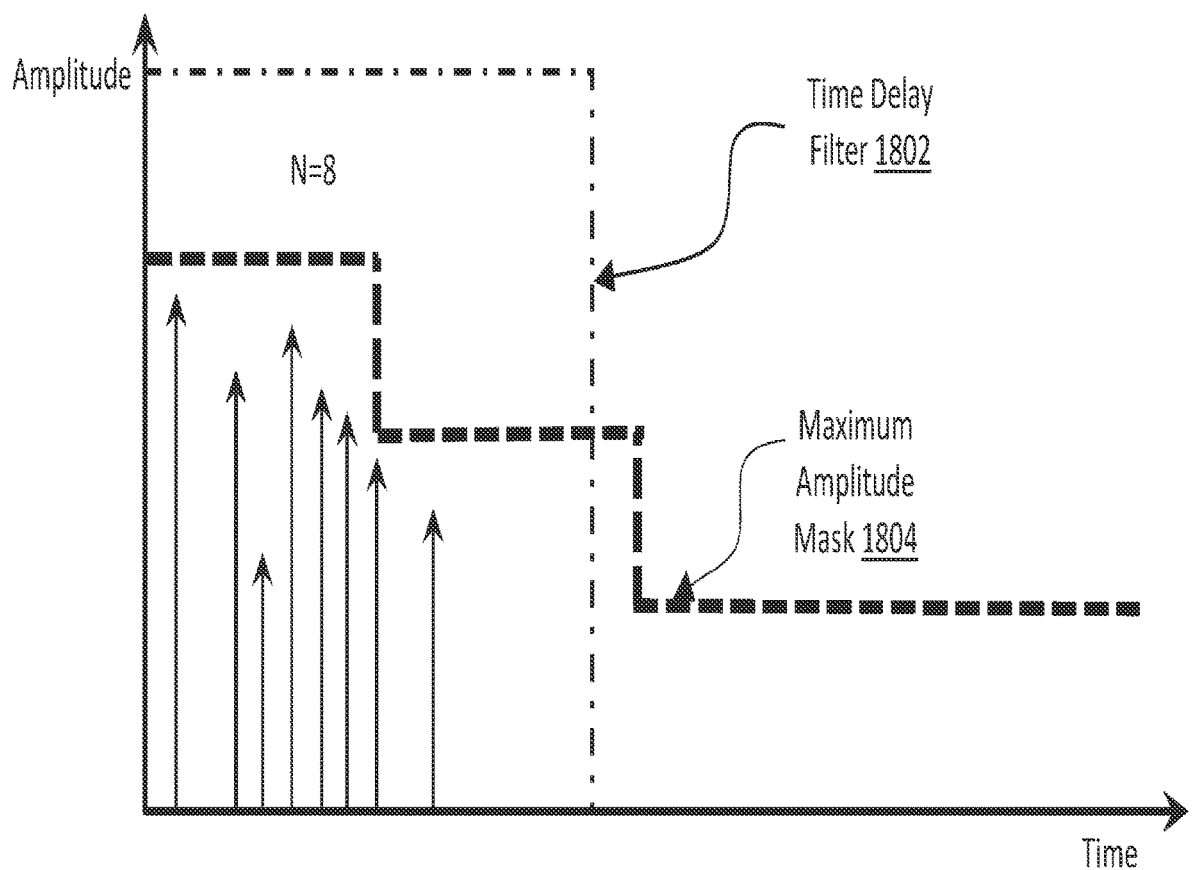
FIG. 19 depicts an illustration of selected time domain pulses according to the number of time domain pulses, the maximum amplitude mask, and up to the boundary defined by the time delay filter in FIG. 18, according to some embodiments.

According to yet another example implementation, the channel representation information configuration may include N, the maximum time delay boundary of the time delay filter, and the maximum amplitude mask. In an example, the maximum amplitude mask may be applied to the time domain representation of the sensing measurement. In an implementation, sensing agent 516 may select time domain pulses based on the amplitude mask, N, and the maximum time delay boundary of the time delay filter. According to an implementation, sensing agent 516 may select N time domain pulses that are within the maximum amplitude mask and within boundary defined by the time delay filter. Further, sensing agent 516 may exclude time domain pulses that are outside the maximum amplitude mask and beyond the boundary defined by the time delay filter. In an example, the maximum amplitude mask may decrease as the time delay increases. Thus, application of the maximum amplitude mask may serve to eliminate from selection time domain pulses which reflect energy which may be due to electrical noise, since a true reflection of the transmitted signal that undergoes significant time delay is unlikely to have a high amplitude due to free space loss. FIG. 18 depicts illustration 1800 of the time domain representation of a sensing measurement with a boundary defined by time delay filter 1802, maximum amplitude mask 1804, and N, according to some embodiments. FIG. 19 depicts illustration 1900 of selected time domain pulses according to N, maximum amplitude mask 1804, and up to the boundary defined by time delay filter 1802 in FIG. 18, according to some embodiments. In the example of FIG. 19, sensing agent 516 selects 8 time domain pulses of highest amplitude within time domain filter 1802 and maximum amplitude mask 1804. All other time domain pulses are nulled.

In an implementation, if the number of time domain pulses (N) that sensing device 502 is required to return to sensing algorithm manager 506 exceeds the number of time domain pulses that exist within the time domain mask, then sensing device 502 may optionally modify the time domain mask (either the boundary of the time delay filter or the limits of the amplitude mask) to be able to return N time domain pulses that have been requested by sensing algorithm manager 506. According to an implementation, the time domain mask characteristics specified by sensing algorithm manager 506 may be variably applied by sensing device 502 depending on where in the time domain, the time domain pulses that conform to the amplitude mask appear, and the number of time domain pulses (N) that sensing device 502 is requested to send to sensing algorithm manager 506. For example, sensing device 502 may be required to send 10 time domain pulses (N=10), and the maximum time delay boundary of the time domain mask may be first 20 tones. If there are more than 10 time domain pulses within the first 20 tones that meet the amplitude mask (i.e., have greater power than the minimum amplitude mask and less power than the maximum amplitude mask), then sensing device 502 may select these 10 time domain pulses. However, if there are less than 10 time domain pulses within the first 20 tones that meet the amplitude mask, then sensing device 502 may extend the maximum time delay boundary of the time domain mask to the extent required to include the 10 requested time domain pulses. In some implementations, sensing device 502 may retain the maximum time delay boundary limit of the time domain mask and may reduce the amplitude of the minimum amplitude mask (i.e., the minimum amplitude required for selecting a time domain pulse within the time domain mask). In another example, sensing device 502 may increase the amplitude of the maximum amplitude mask (i.e., the maximum amplitude required for selecting a time domain pulse within the time domain mask).

In some implementations, sensing device 502 may send fewer than N time domain pulses. In an example, sensing device 502 may send only those time domain pulses which meet the time domain mask characteristics. In some examples, sensing device 502 may send an indication for the time domain pulses which are requested but for which there is no eligible time domain pulse. In an example, if the limits of the time domain mask are incompatible with N (i.e., the number of time domain pulses that sensing device 502 is required to return to sensing algorithm manager 506 exceeds the number of time domain pulses that exist within the time domain mask), then sensing device 502 may send a zero value for the time domain pulses which are requested but for which there is no eligible time domain pulse.

Figure 20:
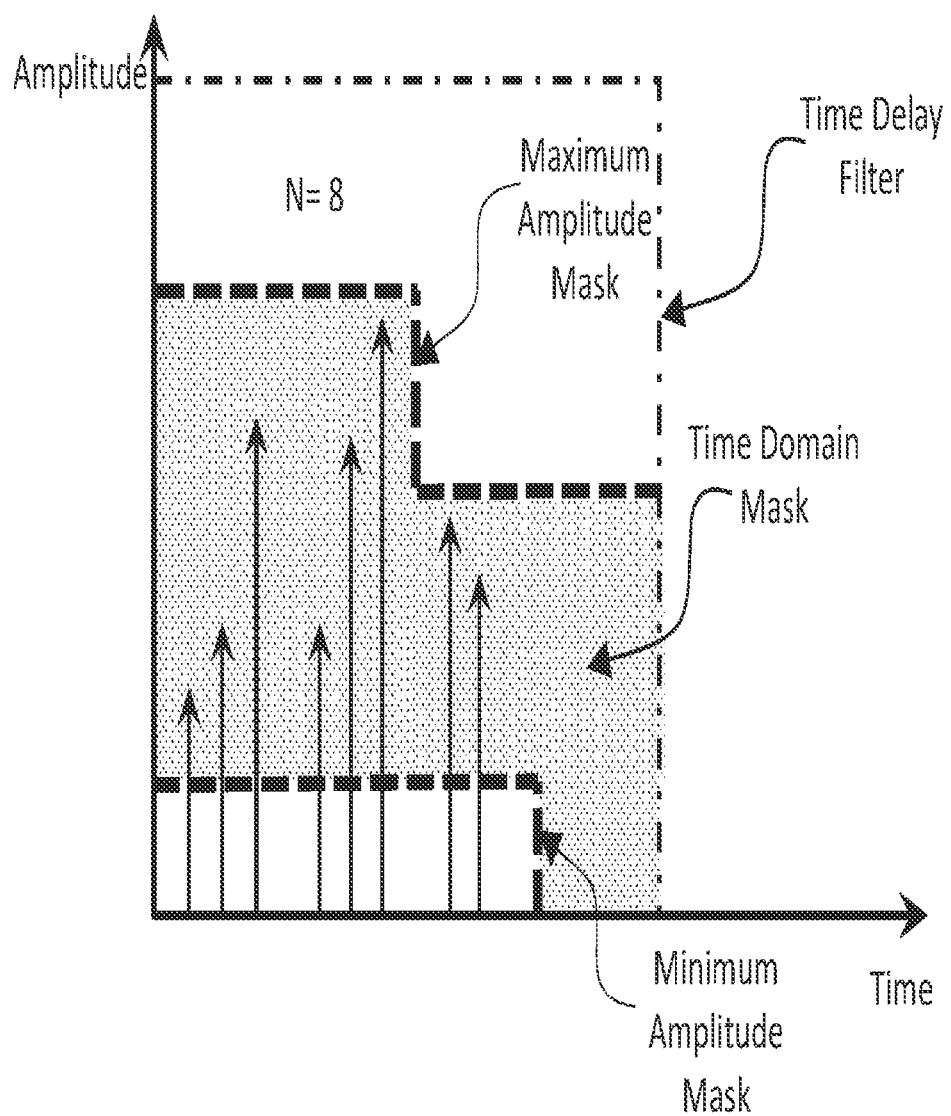
FIG. 20 depicts a time domain representation illustrating selected time domain pulses that are non-contiguous, according to some embodiments.

In an implementation, the selected one or more time domain pulses may not be contiguous (in consecutive symbols). In an example, the selected one or more time domain pulses may interchangeably be referred to as filtered TD-CRI. Also, filtered TD-CRI may be an example of Channel Representation Information (CRI). FIG. 20 depicts time domain representation 2000 illustrating selected time domain pulses that are non-contiguous, according to some embodiments. In an example, to avoid using a longer than necessary data field to send the selected one or more time domain pulses from sensing device 502 to sensing algorithm manager 506, the selected one or more time domain pulses may be arranged contiguously in a data message field with no gaps or nulls between them. For example, sensing device 502 may send only real and imaginary values for the selected one or more time domain pulses without place holders for nulled or missing time domain pulses. However, there may be gaps between the time domain pulses (for example, as shown in FIG. 20), and therefore information about the location of the selected one or more time domain pulses may be known by sensing device 502. As the information about the location of the time domain pulses may vary from channel measurement to channel measurement, sensing device 502 may be required to communicate the location information of the selected one or more time domain pulses to sensing algorithm manager 506. In an example, sensing algorithm manager 506 may be required to reconstruct the time domain representation of the selected one or more time domain pulses (reconstructed filtered TD-CRI) prior to performing an FFT to create R-CSI. In an implementation, for sensing algorithm manager 506 to correctly create the R-CSI from the filtered TD-CRI, the sensing algorithm manager 506 may identify where to place each of the filtered TD-CRI complex values that it receives from sensing device 502, in terms of tones in the reconstructed filtered TD-CRI prior to performing an FFT.

According to an implementation, sensing agent 516 may generate a representation of the location of selected one or more time domain pulses in a reconstructed filtered TD-CRI. In an implementation, sensing agent 516 may create a bitmap of a length required to represent all full TD-CRI values which carry data or pilot information. In an example, the length of the bitmap corresponds to the number of sensing measurement points in the sensing measurement. In an example, the length of the bitmap corresponds to the number of points in the full TD-CRI. In another example, the length of the bitmap corresponds to the number of points in the full TD-CRI less the number of guard tones and DC tones in the frequency domain representation of the received signal. The bitmap having the length corresponding to the number of points in the full TD-CRI may be referred to as a full bitmap and the bitmap having the length corresponding to the number of points in the full TD-CRI less the number of guard tones and DC tones in the frequency domain representation of the received signal may be referred to as an active tone bitmap. In an example, for a 20 MHz channel bandwidth, the active tone bitmap may be 52 bits long. In another examples, for a 40 MHz channel bandwidth, the active tone bitmap may be 104 bits long. According to an implementation, the representation of the location of the selected time domain pulses in the full TD-CRI may be a Z-bit integer, where $2^Z$ describes the number of points in the IFFT.

In an implementation, the representation of the location of the one or more time domain pulses in the full TD-CRI may include a bitmap where a "1" indicates a location of a time domain pulse and a "0" indicates a location of a null (i.e., a time domain pulse that has not been selected). In an example, sensing agent 516 may populate the bitmap with a "1" where there is a time domain pulse and a "0" where there is no time domain pulse. In an example, the Most Significant Bit (MSB) of the bitmap refers to the first full TD-CRI tone (after guard tones) and the Least Significant Bit (LSB) of the bitmap refers to the last full TD-CRI tone (before the DC tones and the guard tones).

According to one or more embodiments, sensing agent 516 may communicate the selected one or more time domain pulses to sensing algorithm manager 506 for use in determining motion or movement. In an implementation, sensing agent 516 may communicate the selected one or more time domain pulses to sensing algorithm manager 506 via a CRI transmission message. In an example implementation, sensing agent 516 may communicate the CRI transmission message including the selected one or more time domain pulses to sensing algorithm manager 506 via transmitting antenna 512. According to an implementation, sensing agent 516 may communicate the representation of the location of the selected one or more time domain pulses in the reconstructed filtered TD-CRI to sensing algorithm manager 506. In an example, sensing agent 516 may communicate the representation of the location of the selected one or more time domain pulses to sensing algorithm manager 506 using the active tone bitmap. In some examples, sensing agent 516 may communicate the representation of the location of the selected one or more time domain pulses to sensing algorithm manager 506 using the full bitmap.

Figure 21:
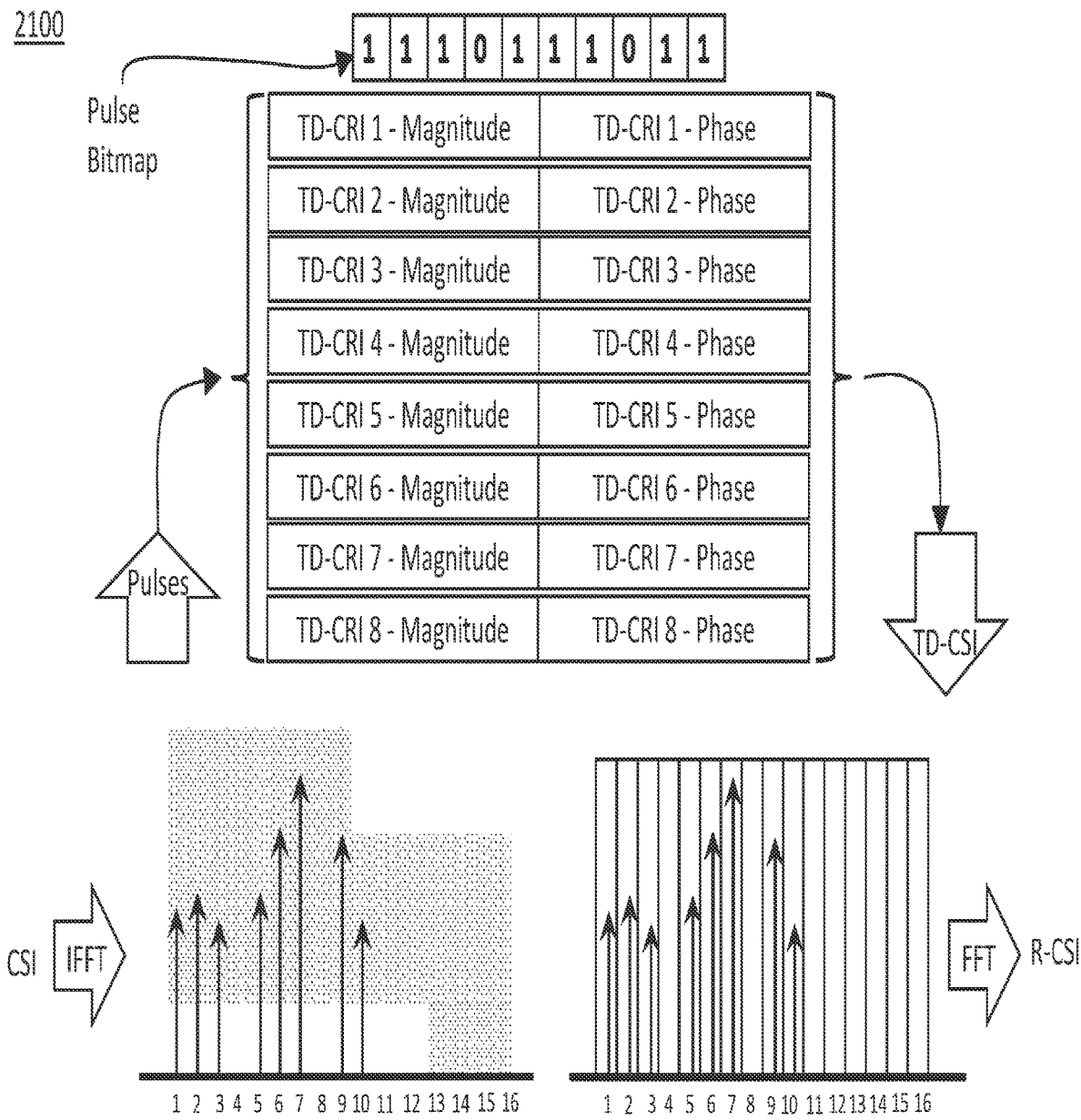
FIG. 21 illustrates a representation of communication of location of selected one or more time domain pulses from a sensing device to a sensing algorithm manager using an active tone bitmap, according to some embodiments.

FIG. 21 illustrates representation 2100 of communication of location of the selected one or more time domain pulses from sensing device 502 to sensing algorithm manager 506 using the active tone bitmap. In an example of representation 2100, the active tone bitmap sent from sensing device 502 to sensing algorithm manager 506 is 10 bits long, corresponding to 10 pilot and data tones of a 16-point FFT. The value of the active tone bitmap, "1110111011" indicates that 8 filtered TD-CRI values will follow (as there are 8 "1"'s in the active tone bitmap) and sensing algorithm manager 506 should arrange the received filtered TD-CRI in the 10 tones by applying in order each filtered TD-CRI to a reconstructed filtered TD-CRI tone according to the active tone bitmap, i.e., TD-CRI 1 in tone 1, TD-CRI 2 in tone 2, TD-CRI 3 in tone 3, null in tone 4, TD-CRI 4 in tone 5, TD-CRI 5 in tone 6, TD-CRI 6 in tone 7, null in tone 8, TD-CRI 7 in tone 9, and TD-CRI 8 in tone 10.

Figure 22:
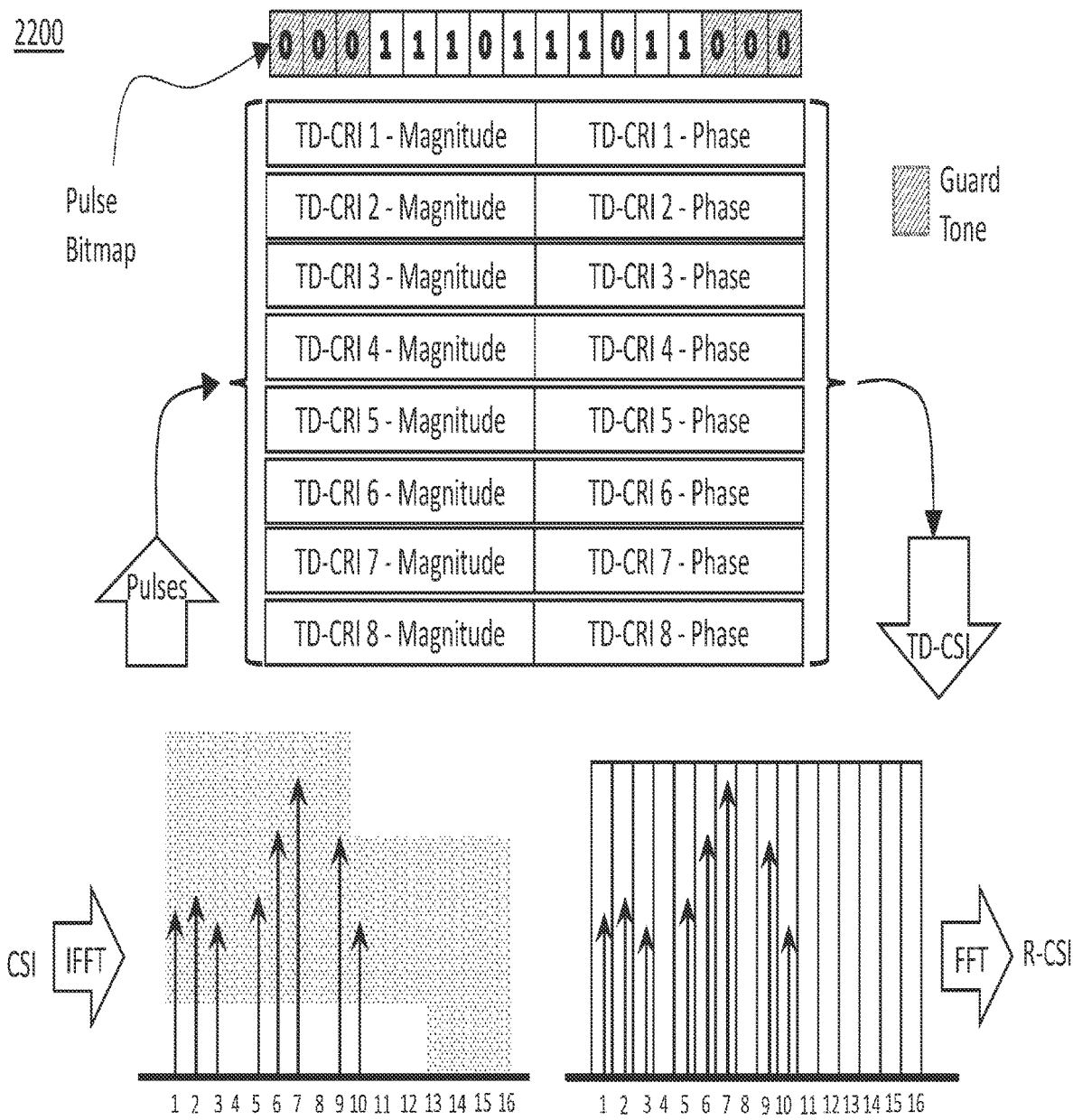
FIG. 22 illustrates a representation of communication of location of selected one or more time domain pulses from a sensing device to a sensing algorithm manager using a full bitmap, according to some embodiments.

FIG. 22 illustrates representation 2200 of communication of location of the selected one or more time domain pulses from sensing device 502 to sensing algorithm manager 506 using the full bitmap. In an example, the full bitmap may be equal to the total number of tones in the full TD-CRI including the guard tones and DC tones, e.g., 64 bits for 20 MHz channel bandwidth and 128 bits for 40 MHz channel bandwidth. In the example, some bits would be "0" to account for the guard tones and some bits would also be "0" to account for the DC tones. In the 16-point FFT example shown in FIG. 22, zeros are placed in the first three locations of the full bitmap followed by the location of the 8 TD-CRI, followed by three more zeros.

Figure 23:
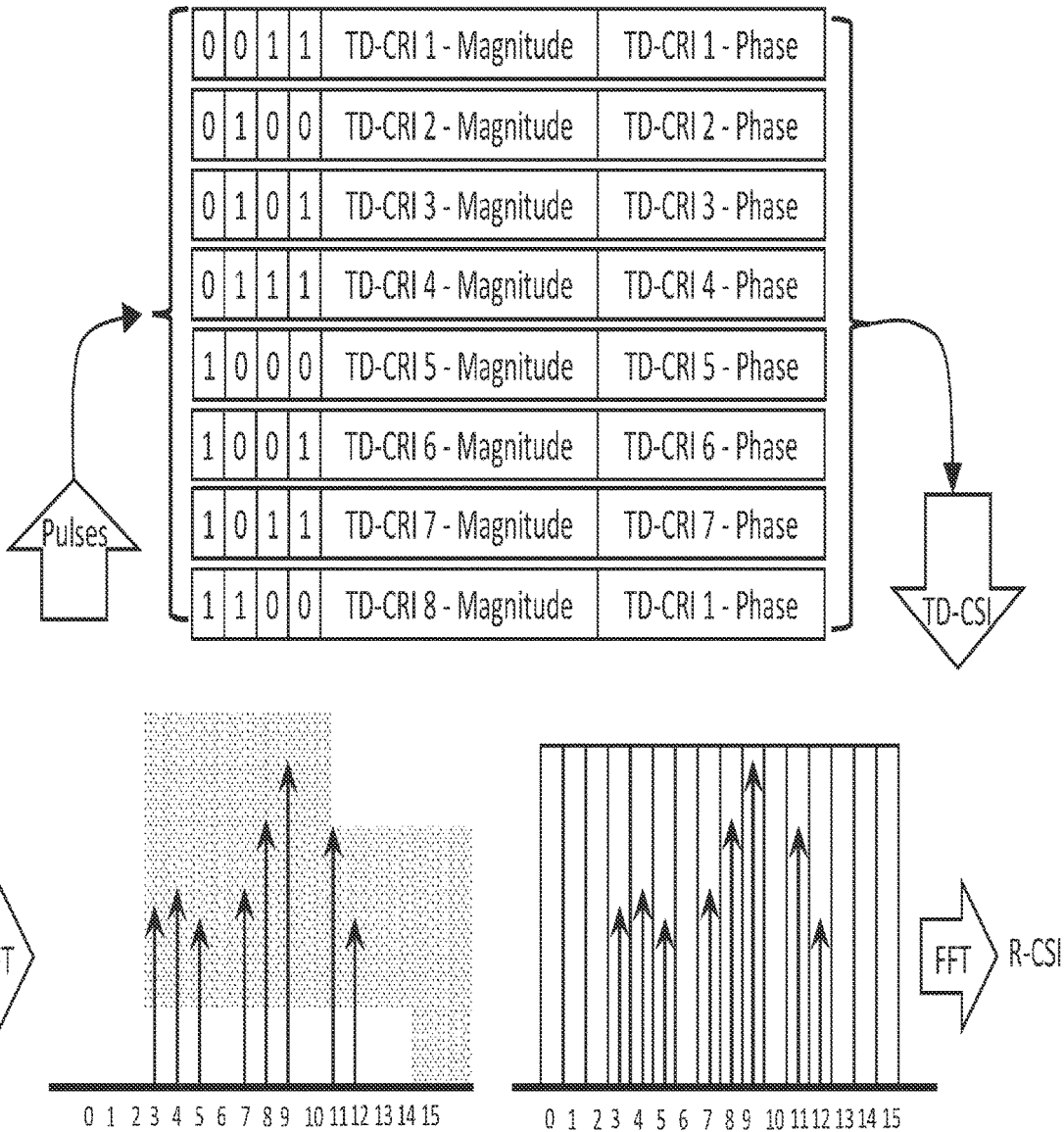
FIG. 23 illustrates a representation of communication of location of selected one or more time domain pulses from a sensing device to a sensing algorithm manager using position of the selected one or more time domain pulses in full time-domain channel representation information (full TD-CRI), according to some embodiments.

According to some implementations, for each filtered TD-CRI, sensing agent 516 may send three values instead of two values (first value being amplitude of the complex number and second value being phase of the complex number). In an example, the third value may represent the position of the filtered TD-CRI value in the reconstructed filtered TD-CRI In an example, the number of bits used to represent the third value may vary depending on the channel bandwidth and therefore the number of points in the full TD-CRI. For example, if the channel bandwidth is 20 MHz, and a 64-point FFT is required then the additional value may be 6 bits long. If the channel bandwidth is 40 MHz, and a 128-point FFT is required then the additional value may be 7 bits long. In an example, the additional value may precede the values of filtered TD-CRI. In some examples, the additional value may follow the values of filtered TD-CRI. In an example, the number of bits used for the filtered TD-CRI may be determined based on the resolution of the actual CSI output by the baseband receiver. FIG. 23 illustrates representation 2300 of communication of location of filtered TD-CRI from sensing device 502 to sensing algorithm manager 506 using position of the selected one or more time domain pulses in the filtered TD-CRI, according to some embodiments. In the example of FIG. 23, the numbering of the symbols has been shifted to start at "0" and end at "15" to facilitate mapping of the symbols to the third value. Although FIG. 21 to FIG. 23 illustrate examples of communication of the selected one or more time domain pulses signaling utilizing 16-point FFT with 3 guard tones on either side (leaving 10 tones for pilot and data symbols), the description is equally applicable to 32-point FFT, 64-point FFT, 128-point FFT, 256-point FFT, 512-point FFT, 1024-point FFT, and any other number of points in an FFT, and a variable number of DC tones and guard tones.

According to an implementation, in response to receiving the representation of the location of the selected one or more time domain pulses in the full TD-CRI, sensing algorithm manager 506 may be configured to construct the reconstructed filtered TD-CRI prior to performing the FFT to create a R-CSI. In an example, the correctly positioned reconstructed filtered TD-CRI, when translated back to the frequency domain via the FFT, creates the R-CSI. In an implementation, since there are significantly fewer filtered TD-CRI than CSI values then there is a significant reduction in the amount of information that needs to be transmitted over the air as CRI to sensing algorithm manager 506 without losing the fidelity of the information which would compromise the performance of sensing algorithm manager 506. For example, for 52 CSI values (representing a 20 MHz channel bandwidth), between 10 and 15 time domain pulse in the filtered TD-CRI may be used to accurately represent transmission channel with minimal loss of fidelity. Accordingly, minimizing the amount of information that needs to be sent minimizes the overhead that system 500 puts on network 560.

Figure 24:
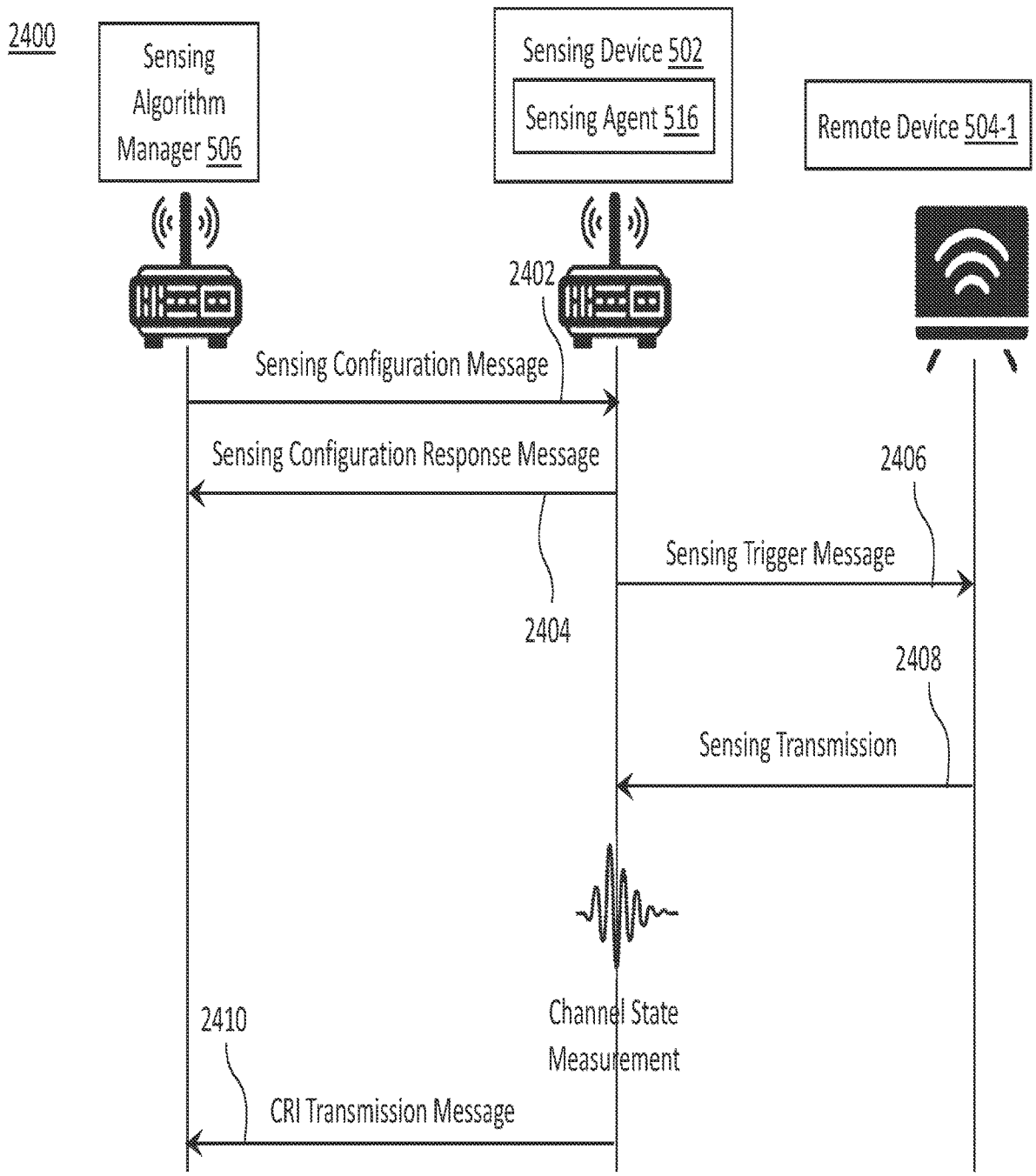
FIG. 24 depicts a sequence diagram for communication between a sensing device, a remote device, and a sensing algorithm manager, where the sensing device is a sensing initiator, according to some embodiments.

FIG. 24 depicts sequence diagram 2400 for communication between sensing device 502, remote device 504-1, and sensing algorithm manager 506, where sensing device 502 is a sensing initiator, according to some embodiments. FIG. 24 shows an example of a network (for example, 802.11 network) where sensing algorithm manager 506 is a separate device.

As shown in FIG. 24, at step 2402, sensing algorithm manager 506 may send a sensing configuration message to sensing device 502. In an example, the sensing configuration message may include a channel representation information configuration. At step 2404, in response to the sensing configuration message, sensing device 502 may send an acknowledgment using a sensing configuration response message and configure sensing agent 516 with the channel representation information configuration for use in generating filtered TD-CRI and reconstructed filtered TD-CRI. At step 2406, sensing device 502 may initiate a sensing session and send a sensing trigger message to remote device 504-1 requesting a sensing transmission. At step 2408, remote device 504-1 may send a sensing transmission to sensing device 502 in response to the sensing trigger message. Upon receiving the sensing transmission, sensing device 502 may perform a channel state measurement on the received sensing transmission and generate channel representation information using the channel representation information configuration. In an example, the sensing device 502 may generate filtered TD-CRI. At step 2410, sensing device 502 may send a CRI transmission message including the channel state measurement (i.e., the filtered TD-CRI) to sensing algorithm manager 506 over the air for further processing.

Figure 25:
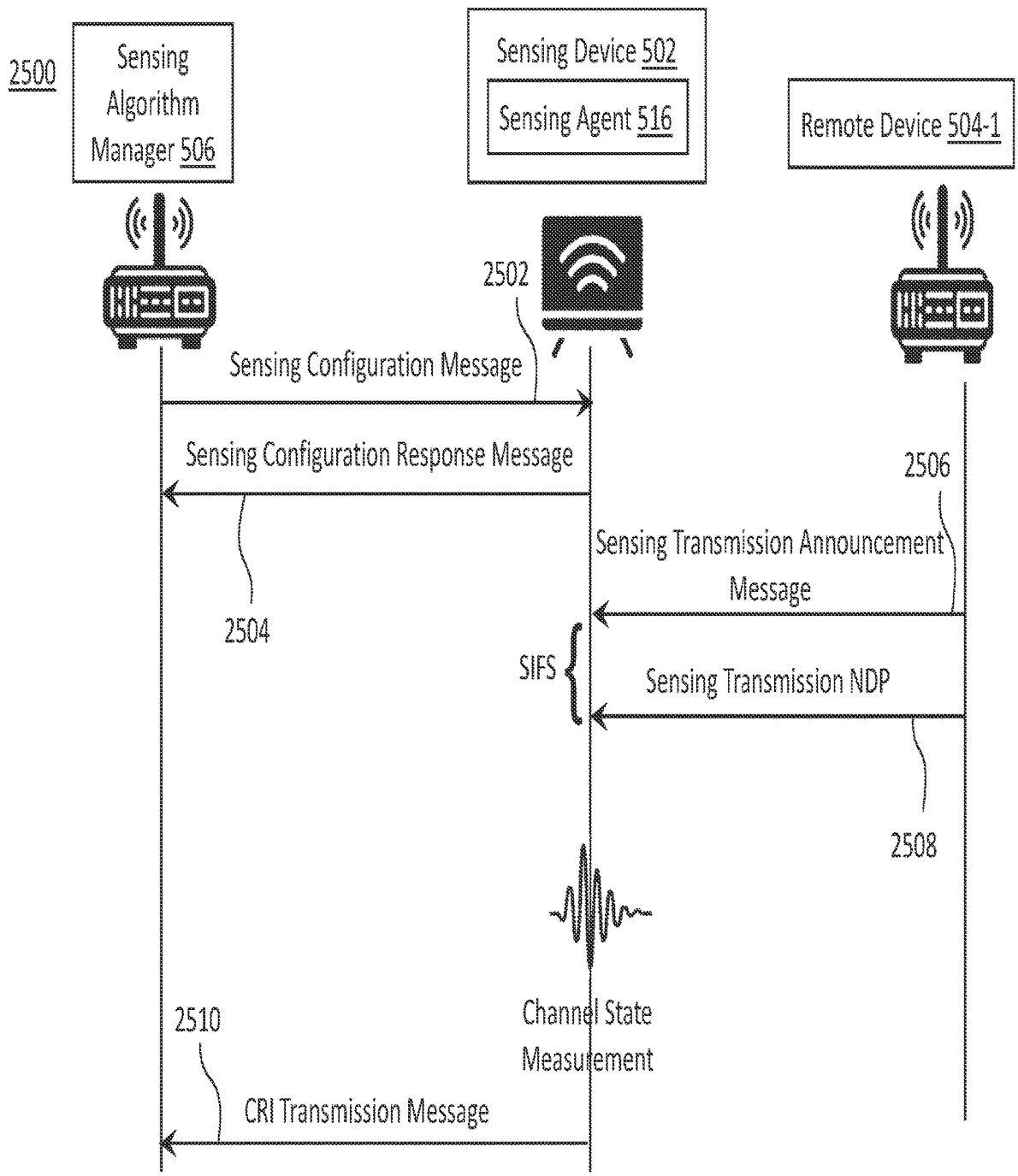
FIG. 25 depicts a sequence diagram for communication between a sensing device, a remote device, and a sensing algorithm manager, where the remote device is a sensing initiator, according to some embodiments.

FIG. 25 depicts sequence diagram 2500 for communication between sensing device 502, remote device 504-1, and sensing algorithm manager 506, where remote device 504-1 is a sensing initiator, according to some embodiments. FIG. 25 shows an example of a network (for example, 802.11 network) where sensing algorithm manager 506 is a separate device.

As shown in FIG. 25, at step 2502, sensing algorithm manager 506 may send a sensing configuration message to sensing device 502. In an example, the sensing configuration message may include a channel representation information configuration. At step 2504, in response to the sensing configuration message, sensing device 502 may send an acknowledgment using a sensing configuration response message and configure sensing agent 516 with the channel representation information configuration for use in generating filtered TD-CRI and reconstructed filtered TD-CRI. At step 2506, remote device 504-1 may initiate a sensing session and send a sensing transmission announcement message followed by a sensing transmission NDP to sensing device 502. As described in step 2508, the sensing transmission NDP follows the sensing transmission announcement message after one SIFS. In an example, the duration of SIFS is 10 µs. Sensing device 502 may perform a channel state measurement on the sensing transmission NDP and generate channel representation information based on the channel representation information configuration. In an example, the sensing device 502 may generate filtered TD-CRI. At step 2510, sensing device 502 may send a CRI transmission message including the channel state measurement (i.e., the filtered TD-CRI) to sensing algorithm manager 506 over the air for further processing.

Figure 26:
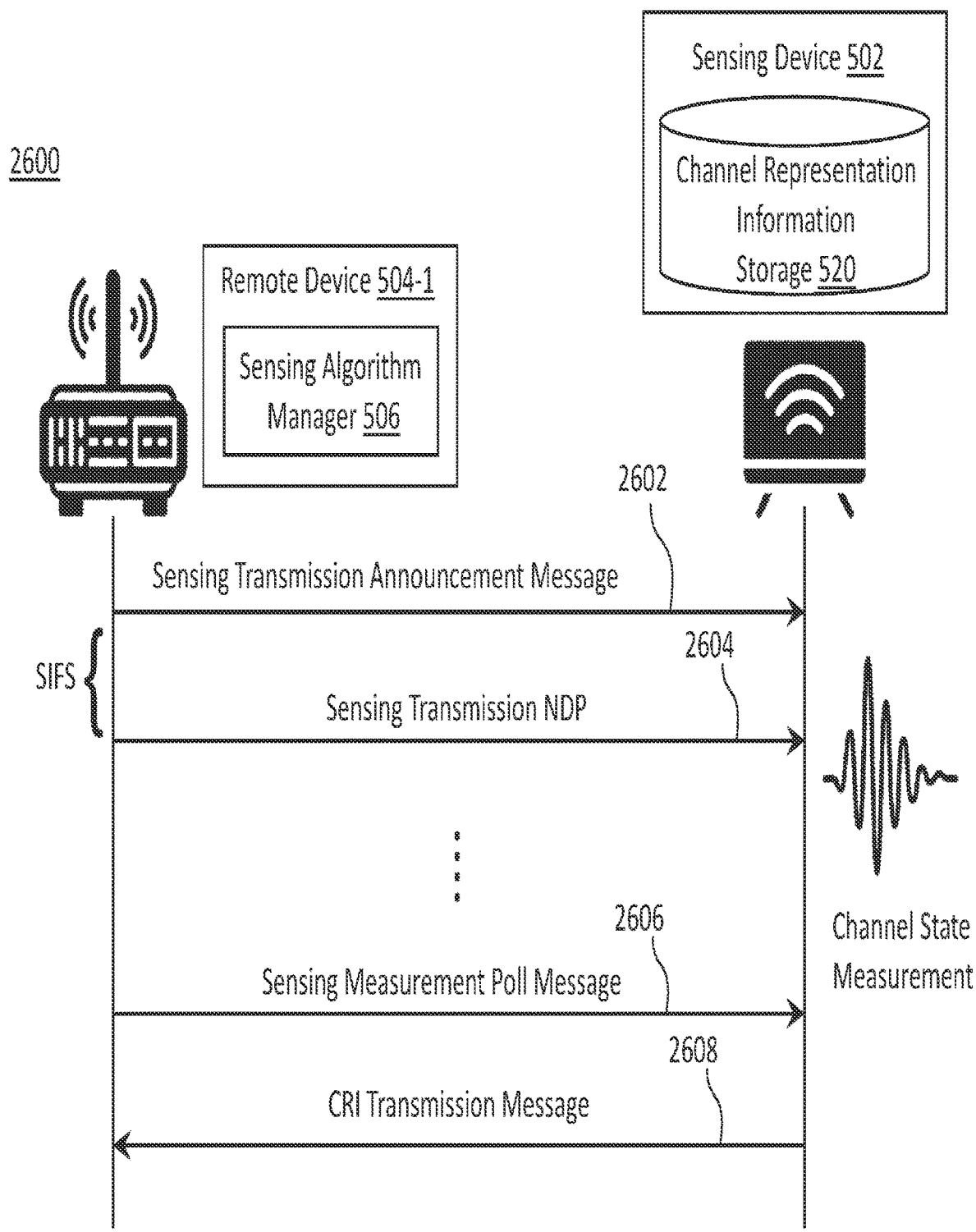
FIG. 26 depicts a sequence diagram for communication between a sensing device and a remote device including a sensing algorithm manager, where the remote device is a sensing initiator, according to some embodiments.

FIG. 26 depicts sequence diagram 2600 for communication between sensing device 502 and remote device 504-1 including sensing algorithm manager 506, where remote device 504-1 is a sensing initiator, according to some embodiments. FIG. 26 shows an example of a network (for example, 802.11 network) where remote device 504-1 includes sensing algorithm manager 506.

As shown in FIG. 26, at step 2602, remote device 504-1 may initiate a sensing session and send a sensing transmission announcement message followed by a sensing transmission NDP to sensing device 502. In an example, the sensing transmission announcement message may include a channel representation information configuration. As described in step 2604, the sensing transmission NDP follows the sensing transmission announcement message after one SIFS. In an example, the duration of SIFS is 10 µs. In an implementation, sensing device 502 may perform a channel state measurement on the sensing transmission NDP and generate channel representation information based on the channel representation information configuration. In an example, the sensing device 502 may generate filtered TD-CRI. In another example, the sensing device 502 may generate full TD-CRI. In an implementation, sensing device 502 may store the channel state measurement in a temporary storage, such as channel representation information storage 520. In an example, sensing device 502 may hold the channel state measurement until it receives a sensing measurement poll message. At step 2606, remote device may send a sensing measurement poll message to sensing device 502 which triggers sensing device 502 to send an already formatted channel state measurement (i.e., filtered TD-CRI) and transfer the channel state measurement to remote device 504-1. In another example, at step 2606, remote device 504-1 may send a sensing measurement poll message to sensing device 502 which triggers sensing device 502 to format the channel state measurement (i.e., create filtered TD-CRI from full TD-CRI) and transfer the channel state measurement to remote device 504-1. At step 2608, sensing device 502 may send a CRI transmission message including the channel state measurement (i.e., the filtered TD-CRI) to remote device 504-1 over the air. In an implementation, sensing algorithm manager 506 may further process the channel state measurement. In some implementations, remote device 504-1 may include the channel representation information configuration in the sensing measurement poll message. According to some implementations, remote device 504-1 may request the channel representation information in multiple formats using multiple sensing measurement poll messages.

As described above, some embodiments of the present disclosure define two sensing message types for Wi-Fi sensing, namely, sensing configuration message and sensing configuration response message. In an example, the sensing configuration message and the sensing configuration response message are carried in a new extension to a management frame of a type described in IEEE 802.11. FIG. 27 illustrates an example of a component of a management frame 2700 carrying a sensing transmission. In an example, system 500 may require acknowledgement frames and the management frame carrying sensing messages may be implemented as an Action frame and in another example, system 500 may not require acknowledgement frames and the management frame carrying sensing messages may be implemented as an Action No Ack frame. In some examples, all message types are carried in a new extension to an IEEE 802.11 control frame. In some examples, a combination of management and control frames may be used to realize these sensing message types.

In an implementation, the information content of all sensing message types may be carried in a format as shown in FIG. 27. In some examples, Transmission Configuration, Timing Configuration, Steering Matrix Configuration, and TD-CRI configuration as described in FIG. 27 are implemented as IEEE 802.11 elements. In some examples, the TD-CRI Configuration element is a part of the Transmission Configuration element. In another example, component of a management frame 2700 may be referred in its totality as a sensing measurement parameter element.

In one or more embodiments, the sensing message types may be identified by the message type field, and each sensing message type may carry the other identified elements, according to some embodiments. Examples of sensing message types and TD-CRI configuration elements are shown in Table 4. Further, the TD-CRI configuration element details are shown in Table 5.

TABLE 4

Sensing message types and TD-CRI configuration elements

| Value | Message Type | Message Direction | TD-CRI Configuration |
|---|---|---|---|
| 0 | Sensing configuration message | Sensing algorithm manager to sensing device | Optional<br>Specifies the TD-CRI configuration parameters that the sensing device may use for generating filtered TD-CRI values to send to the sensing algorithm manager.<br>The sensing configuration message may be used when TD-CRI configuration parameters are to be sent to the sensing device for use in a future sensing session (i.e., the values are held in memory or stored at the sensing device).<br>The sensing configuration message may be sent upon association of the sensing algorithm manager with the sensing device. The sensing configuration message may be sent from the sensing algorithm manager which may be present on a separate device (such as the remote device) on the 802.11 network. |

TABLE 4-continued

Sensing message types and TD-CRI configuration elements

| Value | Message Type | Message Direction | TD-CRI Configuration |
|---|---|---|---|
| 1 | Sensing configuration response message | Sensing device to sensing algorithm manager | If this element is absent, then the sensing device may provide CSI values when channel representation information is requested.<br>Optional<br>In response to this element in sensing configuration message, the sensing device receiving the message sends an acknowledgement in the TD-CRI configuration field and configures sensing agent with the provided values for use in generating filtered TD-CRI (possibly when triggered to do so, or always when sending channel representation information). |
| 2 to 5 and 7 to 255 | Reserved | N/A | N/A |

TABLE 5

TD-CRI Configuration Element Details

| Name | Type | Valid Range | Description |
|---|---|---|---|
| N | Integer | $0 \ldots N_{FFT}$ | Specifies the number of time domain pulses that the sensing device should return as a filtered TD-CRI. May also be provided in the form of one or more tables. |
| Time Delay Filter | Integer | $0 \ldots N_{FFT}$ | Specifies the highest symbol (tone) which may be considered for inclusion in the filtered TD-CRI values as part of a time domain mask. |
| Maximum Amplitude Mask | Ordered Pairs (Integer, Fraction) | $(1 \ldots N_{FFT}, 0 \ldots 1)$ | Specifies the maximum amplitude mask for a given symbol (tone) as part of a time domain mask. |
| Minimum Amplitude Mask | Ordered Pairs (Integer, Fraction) | $(1 \ldots N_{FFT}, 0 \ldots 1)$ | Specifies the minimum amplitude mask for a given symbol (tone) as part of a time domain mask.<br>Second value of pair must be less than the second value of the Maximum Amplitude Mask for all symbols (tones). |
| Time Delay Flexibility | Bit Flag | 0 or 1 | Indicates whether the highest symbol (tone) of the Time Delay Filter may be increased to achieve N filtered TD-CRI values that are within the Amplitude Mask (which is defined as the area between the Maximum Amplitude Mask and the Minimum Amplitude Mask). |
| Maximum Amplitude Flexibility | Bit Flag | 0 or 1 | Indicates whether the Maximum Amplitude Mask may be increased to achieve N filtered TD-CRI values that are within the Time Delay Filter. |

TABLE 5-continued

TD-CRI Configuration Element Details

| Name | Type | Valid Range | Description |
|---|---|---|---|
| Minimum Amplitude Flexibility | Bit Flag | 0 or 1 | Indicates whether the Minimum Amplitude Mask may be decreased to achieve N filtered TD-CRI values that are within the Time Delay Filter. |

In an example, the data provided in Table 5 may be encoded into an element for inclusion in sensing messages between sensing device 502 and sensing algorithm manager 506.

Figure 28A:
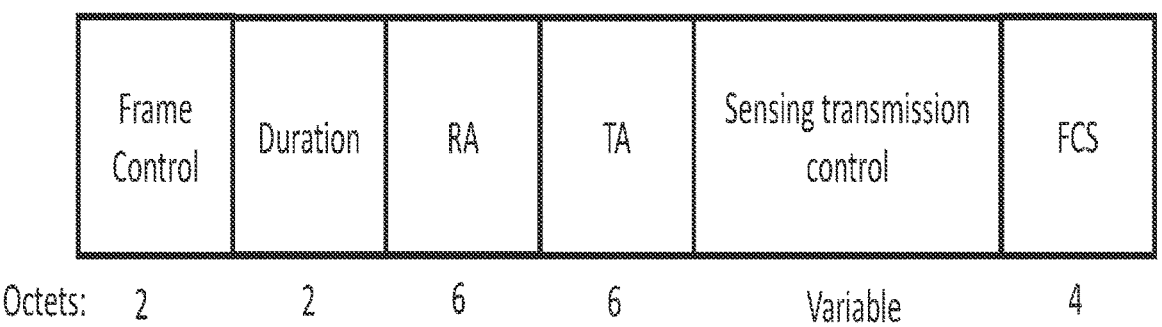
FIG. 28A illustrates an example of a format of a control frame and FIG. 28B illustrates a format of a sensing transmission announcement control field of the control frame, according to some embodiments.
Figure 28B:
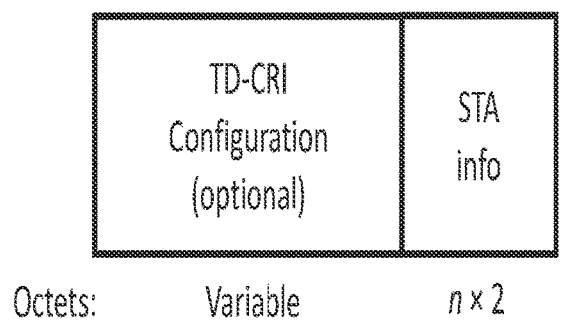

According to some implementations, a sensing transmission announcement may be carried in a new extension to a control frame of a type described in IEEE 802.11. In some implementations, the sensing transmission announcement may be carried in a new extension to a control frame extension described in IEEE 802.11. FIG. 28A illustrates an example of a format of control frame 2800 and FIG. 28B illustrates a format of a sensing transmission control field of control frame 2800. In an example, the STA info field of the sensing transmission control field may address up to n sensing devices via their Association ID. In an example implementation, the sensing transmission announcement may address n sensing devices which are required to make a sensing measurement and to relay channel representation information back to the sensing initiator. Examples of sensing transmission control and TD-CRI configuration elements are shown in Table 6, provided below.

TABLE 6

Sensing transmission control and TD-CRI configuration elements

| Message Type | Message Direction | TD-CRI Configuration |
|---|---|---|
| Sensing transmission announcement | Remote device to sensing device | Optional<br>This element is included in a sensing transmission announcement (preceding a sensing transmission NDP) to inform the sensing device that on the transmission of a channel representation information made on the sensing transmission NDP, the sensing device should apply the TD-CRI configuration.<br>If the TD-CRI configuration was already provided in a sensing configuration message, then this TD-CRI configuration element may consist of a bit flag which indicates whether the sensing device should use pre-configured TD-CRI configuration information (if only one TD-CRI configuration was provided in the sensing configuration message).<br>If more than one TD-CRI configuration was provided in a sensing configuration message, the TD-CRI configuration in the sensing trigger message may provide an index into the pre-configured TD-CRI configurations to indicate to the sensing device which TD-CRI configuration to apply. In some examples, there may be several indices provided, for example one index that indicates N, one index which selects a time delay filter, one index that selects a maximum amplitude mask, and one index that selects a minimum amplitude mask.<br>The sensing device may combine the TD-CRI Configuration information provided with other information in the sensing transmission announcement to determine which TD-CRI Configuration parameters to apply. For example, the sensing device may combine the TD-CRI configuration with the channel bandwidth in determining which TD-CRI Configuration parameters to use. In another example, the sensing device may combine the TD-CRI Configuration with the sensing mode (e.g., scanning mode or detection mode) to determine which TD-CRI configuration parameters to use.<br>In some examples, the TD-CRI configuration provided in the sensing transmission announcement is only used for the measurement made on the next sensing transmission. In other examples, the TD-CRI configuration provided in the sensing transmission announcement is used until the TD-CRI configuration is updated or explicitly canceled.<br>If this element is absent, then the sensing device provides CSI values when channel representation |

TABLE 6-continued

Sensing transmission control and TD-CRI configuration elements

| Message Type | Message Direction | TD-CRI Configuration |
|---|---|---|
| | | information is sent. In another example, if this element is absent then the sensing device calculates a sensing measurement but provides no feedback to the remote device. In this example, a sensing measurement poll may be used to signal to the sensing device that it should provide the channel representation information. |

Figure 29A:
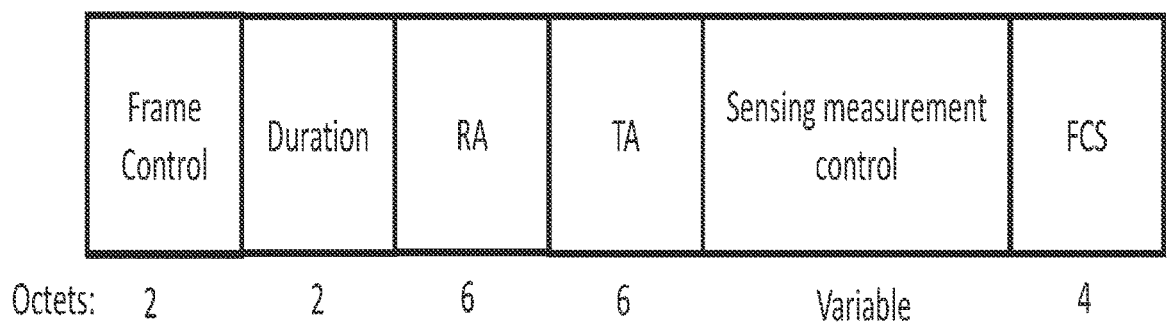
FIG. 29A illustrates another example of a format of a control frame and FIG. 29B illustrates a format of a sensing measurement control field of the control frame, according to some embodiments.
Figure 29B:
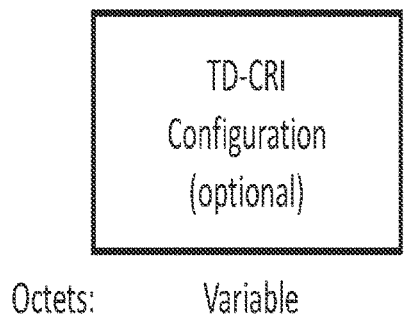

According to some implementations, the sensing measurement poll may be carried in a new extension to a control frame of a type described in IEEE 802.11. In some implementations, the sensing measurement poll may be carried in a new extension to a control frame extension described in IEEE 802.11. FIG. 29A illustrates an example of a format of control frame 2900 and FIG. 29B illustrates a format of a sensing measurement control field of control frame 2900. Examples of sensing measurement control and TD-CRI configuration elements are shown in Table 7, provided below.

According to some implementations, when sensing device 502 has calculated a sensing measurement and created channel representation information (for example, in form of filtered TD-CRI), the sensing device 502 may be required to communicate the channel representation information to sensing algorithm manager 506 or remote device 504-1 including sensing algorithm manager 506. In an example, filtered TD-CRI may be generated in response to a sensing transmission announcement and sensing transmission NDP. In some examples, filtered TD-CRI may be generated in response to a sensing measurement poll. In examples, the

TABLE 7

Sensing measurement control and TD-CRI configuration elements

Figure 30:
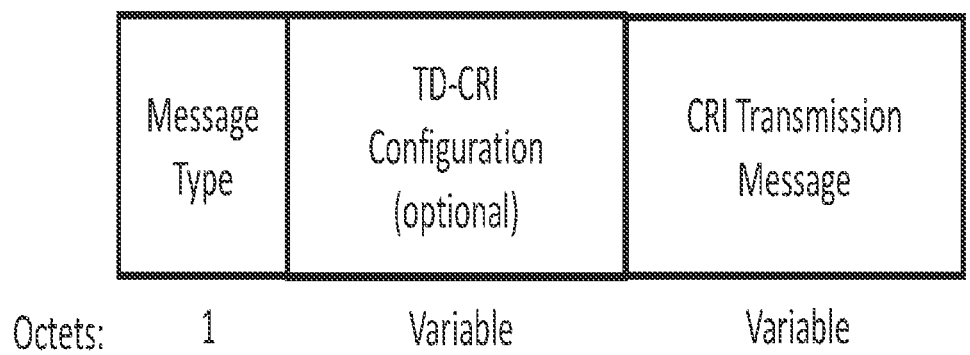
FIG. 30 illustrates a management frame carrying a Channel Representation Information (CRI) transmission message, according to some embodiments.

| Message Type | Message Direction | TD-CRI Configuration |
|---|---|---|
| Sensing transmission poll | Remote device to sensing device | Optional<br>This element is included in a sensing transmission poll to inform the sensing device that on the transmission of a CRI transmission message made on a previous sensing measurement, the sensing device should apply the TD-CRI configuration.<br>If the TD-CRI configuration was already provided in a sensing configuration message, then this TD-CRI configuration element may consist of a bit flag which indicates whether the sensing device should use pre-configured TD-CRI configuration information (if only one TD-CRI configuration was provided in the sensing configuration message).<br>If more than one TD-CRI configuration was provided in a sensing configuration message, the TD-CRI configuration in the sensing trigger message may provide an index into the pre-configured TD-CRI configurations to indicate to the sensing device which TD-CRI configuration to apply. In some examples, there may be several indices provided, for example one index that indicates N, one index which selects a time delay filter, one index that selects a maximum amplitude mask, and one index that selects a minimum amplitude mask.<br>The sensing device may combine the TD-CRI Configuration information provided with other information in the sensing transmission poll to determine which TD-CRI Configuration parameters to apply. For example, the sensing device may combine the TD-CRI configuration with the channel bandwidth in determining which TD-CRI Configuration parameters to use. In another example, the sensing device may combine the TD-CRI Configuration with the sensing mode (e.g., scanning mode or detection mode) to determine which TD-CRI configuration parameters to use.<br>In some examples, the TD-CRI configuration provided in the sensing transmission poll is only used for the measurement made on the last sensing transmission. In other examples, the TD-CRI configuration provided in the sensing transmission poll is used until the TD-CRI configuration is updated or explicitly canceled.<br>If this element is absent, then the sensing device provides CSI values when channel representation information is sent. | filtered TD-CRI may be transferred by a management frame. In an example, a message type may be defined which represents a CRI Transmission Message. FIG. 30 illustrates an example of a component of a management frame 3000 carrying a CRI transmission message, according to some embodiments. In an example, system 500 may require acknowledgement frames and the management frame carrying the CRI transmission message may be implemented as an Action frame and in another example, system 500 may not require acknowledgement frames and the management frame carrying the CRI transmission message may be implemented as an Action No Ack frame. Examples of CRI transmission message and TD-CRI configuration elements are shown in Table 8. Further, the CRI transmission message element details are shown in Table 9.

TABLE 8

| | | | | |
|---|---|---|---|---|
| | | CRI Transmission Message and TD-CRI Configuration Elements | | |
| Value | Message Type | Message Direction | TD-CRI Configuration | CRI Transmission Message |
| 6 | CRI Transmission Message | Sensing device to remote device including the sensing algorithm manager | Optional In the CRI transmission sent by the sensing device, this element is present if filtered TD-CRI are being sent and absent if CSI are being sent. If this element is present, the TD-CRI configuration that was used to create the filtered TD-CRI may be sent along with the filtered TD-CRI values. In another example, if this element is present, the element may contain a bit flag to indicate that the sensing device applied the TD-CRI configuration that was in the sensing transmission announcement or sensing measurement poll message which triggered the response. Alternatively, the element may contain multiple bit flags, one for each aspect of the TD-CRI configuration, to indicate which of the aspects of the TD-CRI configuration were applied. | CRI Transmission Message as defined in Table 9 |

TABLE 9

CRI Transmission Message Element Details

| Name | Type | Valid Range | Description |
|---|---|---|---|
| IFFT Length | Integer | NFFT | Specifies the length of the IFFT used to calculate the full TD-CRI from the CSI. This value describes the maximum number of active time-domain pulses which may be returned in the filtered TD-CRI and therefore the length of the bit field that represents the active time domain pulses. |
| Active Time Domain Pulses | Bit field | Length of NFFT with 1 representing an active time-domain pulse | Specifies the position in the full TD-CRI of an active time domain pulse. A value of O means that a tone is vacant and a value of 1 means that a tone is occupied. There follows in this element exactly one magnitude value and one phase value for each value of 1 in the bit field. |
| CRI Maximum Magnitude 1 | Unsigned Float | [0. 0, 1. 0] | Maximum magnitude value or measured magnitude value for the first active time domain pulse. |
| CRI Minimum Magnitude 1 | Unsigned Float | [0. 0, 1. 0] | Minimum magnitude value for the first active time domain pulse. |
| CRI Phase 1 | Signed Float | $[-\pi/2, \pi/2]$ | Phase value for the first active time domain pulse. |
| CRI Maximum Magnitude m | Unsigned Float | [0. 0, 1. 0] | Maximum magnitude value or measured magnitude value for the mth active time domain pulse. |
| CRI Minimum Magnitude m | Unsigned Float | [0. 0, 1. 0] | Minimum magnitude value for the mth active time domain pulse. |
| CRI Phase m | Signed Float | $[-\pi/2, \pi/2]$ | Phase value for the mth active time domain pulse. |

Table 9 shows an example of a CRI transmission message element which transfers the TD-CRI using a bit field to represent the active (included/selected) time domain pulses.

In an implementation, when sensing algorithm manager 506 is implemented on a separate device (i.e., is not implemented within remote device 504-1), a management frame may not be necessary, and the filtered TD CRI may be encapsulated in a standard IEEE 802.11 data frame and transferred to sensing algorithm manager 506. In an example, the data structure described in Table 9 may be used to format the filtered TD CRI data. In an example, a proprietary header or descriptor may be added to the data structure to allow sensing algorithm manager 506 to detect that the data structure is of the form of a CRI transmission message element. In an example, data may be transferred in the format shown in FIG. 30 and sensing algorithm manager 506 may be configured to interpret the Message Type value that represents a CRI Transmission Message.

According to aspects of the present disclosure, the amount of information that is passed from sensing device 502 to sensing algorithm manager 506 may be significantly reduced by sending filtered time domain values (filtered TD-CRI, one complex value for each time domain pulse) instead of the frequency domain CSI values provided by the baseband receiver. Also, the number of time domain pulses that need to be sent may be about 25% or less of the CSI values for the smallest channel bandwidth (for example, 20 MHz channel bandwidth). Further, this percentage may significantly reduce as the total channel bandwidth increases.

Figure 31:
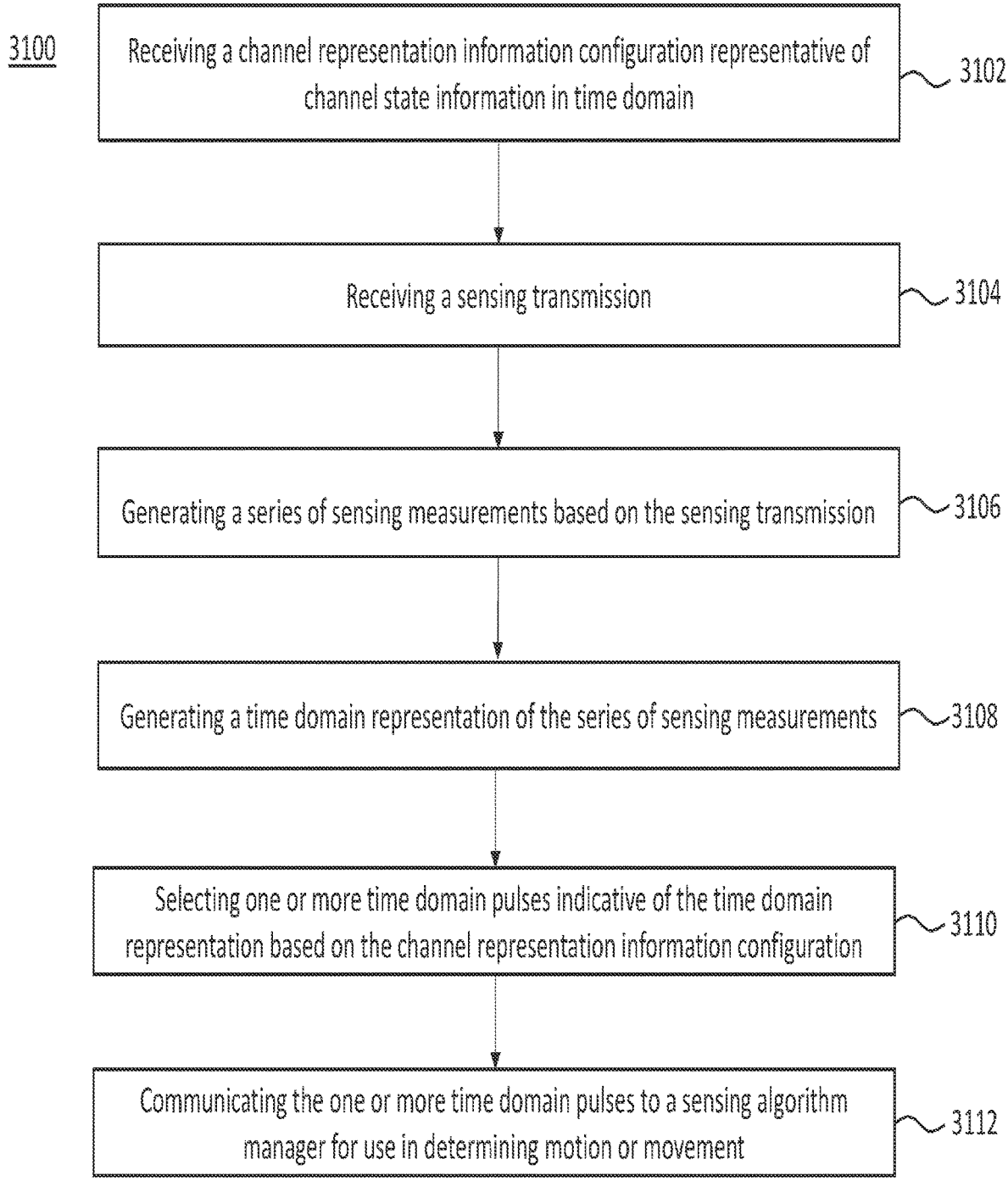
FIG. 31 depicts a flowchart for communicating one or more time domain pulses to a sensing algorithm manager for use in determining motion or movement, according to some embodiments.

FIG. 31 depicts flowchart 3100 for communicating one or more time domain pulses to sensing algorithm manager 506 for use in determining motion or movement, according to some embodiments.

In a brief overview of an implementation of flowchart 3100, at step 3102, a channel representation information configuration representative of channel state information in time domain is received. At step 3104, a sensing transmission is received. At step 3106, a sensing measurement is generated based on the sensing transmission. At step 3108, a time domain representation of the sensing measurement is generated. At step 3110, one or more time domain pulses indicative of the time domain representation are selected based on the channel representation information configuration. At step 3112, the one or more time domain pulses are communicated to sensing algorithm manager 506 for use in determining motion or movement.

Step 3102 includes receiving a channel representation information configuration representative of channel state information in time domain. In an example, the channel representation information configuration may include one or more of a number of time domain pulses (N), a maximum time delay boundary, and an amplitude mask. The maximum time delay boundary may represent a maximum time delay of selectable time domain pulses of the time domain representation of the sensing measurement. In an example, the amplitude mask includes one of a minimum amplitude mask and a maximum amplitude mask. In an implementation, the one or more of N, the maximum time delay boundary, and the amplitude mask may be received in a sensing transmission announcement message. In some implementations, the one or more of N, the maximum time delay boundary, and the amplitude mask may be received in a sensing configuration message. In some implementations, the one or more of N, the maximum time delay boundary, and the amplitude mask may be received in a sensing measurement poll message. According to an implementation, sensing device 502 may receive the channel representation information configuration from sensing algorithm manager 506. In an implementation, N may be determined according to a ranging process. In some implementations, N may be determined according to a simulation process.

Step 3104 includes receiving a sensing transmission. In an implementation, sensing device 502 may receive the sensing transmission from remote device 504-1.

Step 3106 includes generating a sensing measurement based on the sensing transmission. In an implementation, sensing device 502 may generate the sensing measurement based on the sensing transmission. In an example, generating the sensing measurement based on the sensing transmission may include calculating channel state information (CSI).

Step 3108 includes generating a time domain representation of the sensing measurement. In an implementation, sensing device 502 may generate the time domain representation of the sensing measurement. In an example implementation, sensing device 502 may perform an IFFT on the sensing measurement to generate the time domain representation of the sensing measurement.

Step 3110 includes selecting one or more time domain pulses indicative of the time domain representation based on the channel representation information configuration. In an implementation, sensing device 502 may select one or more time domain pulses indicative of the time domain representation based on the channel representation information configuration. In an example, sensing device 502 may select the one or more time domain pulses based on the amplitude mask. For example, sensing device 502 may include time domain pulses that are within the amplitude mask and exclude time domain pulses that are outside the amplitude mask. The amplitude mask is the time domain representation of the sensing measurement. Further, in an example, each of the one or more time domain pulses may be represented by a complex number. The complex number may include an amplitude and a phase.

Step 3112 includes communicating the one or more time domain pulses to sensing algorithm manager 506 for use in determining motion or movement. In an implementation, sensing device 502 may communicate the one or more time domain pulses to sensing algorithm manager 506 for use in determining motion or movement. In an example implementation, sensing device 502 may communicate the one or more time domain pulses to sensing algorithm manager 506 via a CRI transmission message.

Figure 32A:
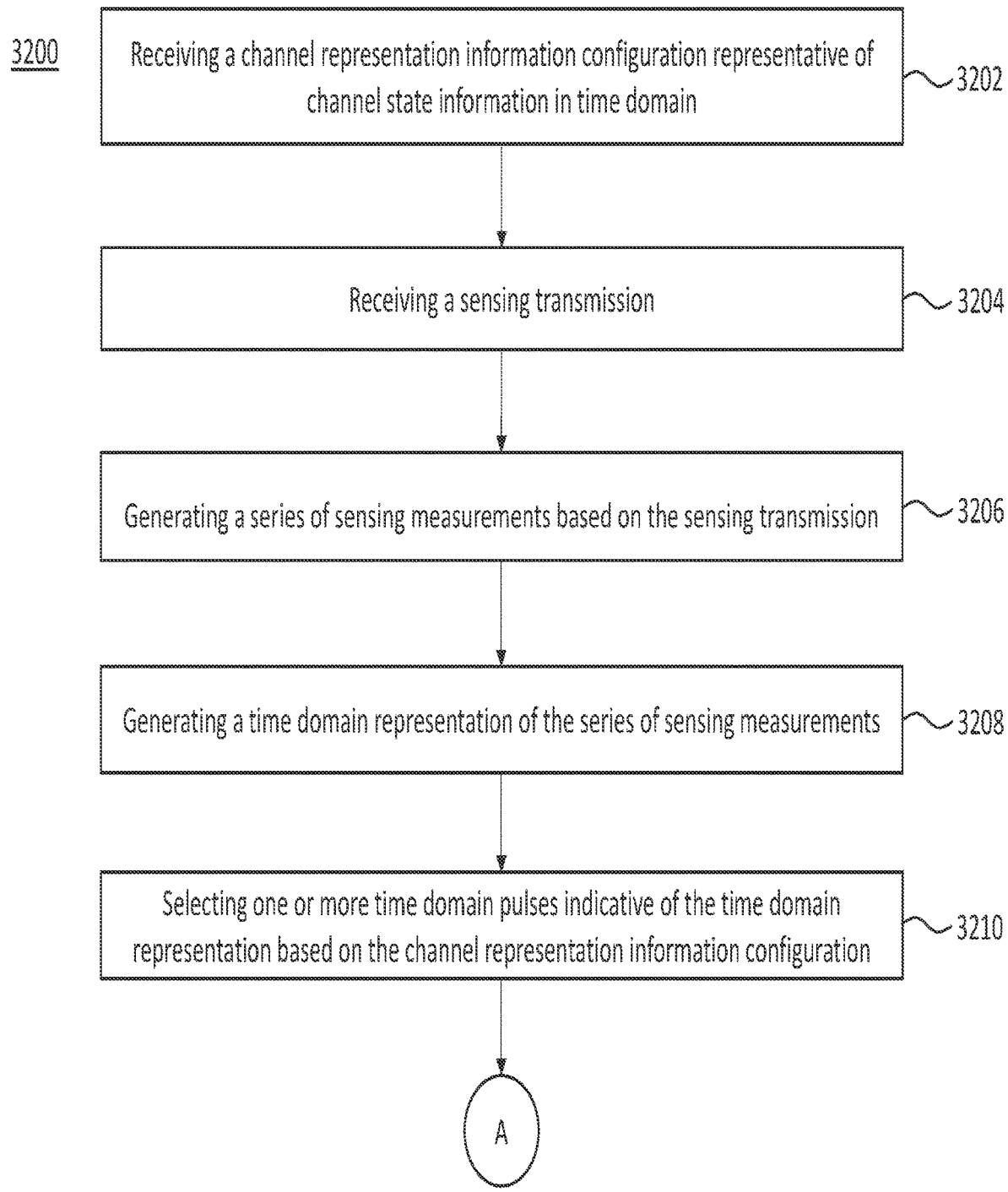
FIG. 32A and FIG. 32B depict a flowchart for communicating one or more time domain pulses to a sensing algorithm manager for use in determining motion or movement, according to some embodiments.
Figure 32B:
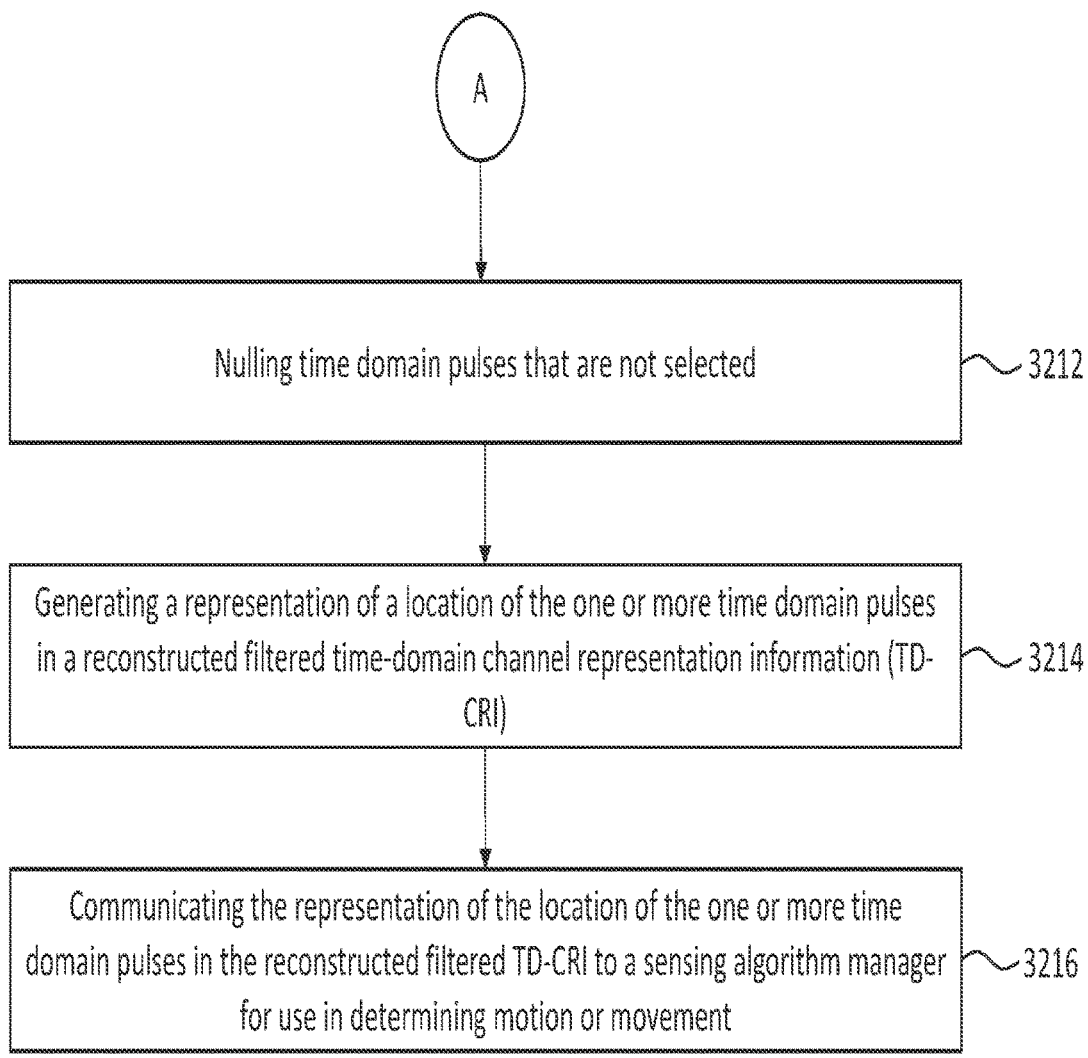

FIG. 32A and FIG. 32B depict flowchart 3200 for communicating one or more time domain pulses to sensing algorithm manager 506 for use in determining motion or movement, according to some embodiments.

In a brief overview of an implementation of flowchart 3200, at step 3202, a channel representation information configuration representative of channel state information in time domain is received. At step 3204, a sensing transmission is received. At step 3206, a sensing measurement is generated based on the sensing transmission. At step 3208, a time domain representation of the sensing measurement is generated. At step 3210, one or more time domain pulses indicative of the time domain representation are selected based on the channel representation information configuration. At step 3212, time domain pulses that are not selected are nulled. At step 3214, a representation of a location of the one or more time domain pulses in a reconstructed filtered TD-CRI is generated. At step 3216, the representation of the location of the one or more time domain pulses in the reconstructed filtered TD-CRI is communicated to sensing algorithm manager 506 for use in determining motion or movement Step 3202 includes receiving a channel representation information configuration representative of channel state information in time domain. In an example, the channel representation information configuration may include one or more of a N, a maximum time delay boundary, and an amplitude mask. The maximum time delay boundary may represent a maximum time delay of selectable time domain pulses of the time domain representation of the sensing measurement. In an example, the amplitude mask includes one of a minimum amplitude mask and a maximum amplitude mask. In an implementation, the one or more of N, the maximum time delay boundary, and the amplitude mask may be received in a sensing transmission announcement message. In some implementations, the one or more of N, the maximum time delay boundary, and the amplitude mask may be received in a sensing configuration message. In some implementations, the one or more of N, the maximum time delay boundary, and the amplitude mask may be received in a sensing measurement poll message. According to an implementation, sensing device 502 may receive the channel representation information configuration from sensing algorithm manager 506. In an implementation, N may be determined according to a ranging process. In some implementations, N may be determined according to a simulation process.

Step 3204 includes receiving a sensing transmission. In an implementation, sensing device 502 may receive the sensing transmission from remote device 504-1.

Step 3206 includes generating a sensing measurement based on the sensing transmission. In an implementation, sensing device 502 may generate the sensing measurement based on the sensing transmission. In an example, generating the sensing measurement based on the sensing transmission may include calculating channel state information (CSI).

Step 3208 includes generating a time domain representation of the sensing measurement. In an implementation, sensing device 502 may generate the time domain representation of the sensing measurement. In an example implementation, sensing device 502 may perform an IFFT on the sensing measurement to generate the time domain representation of the sensing measurement.

Step 3210 includes selecting one or more time domain pulses indicative of the time domain representation based on the channel representation information configuration. In an implementation, sensing device 502 may select one or more time domain pulses indicative of the time domain representation based on the channel representation information configuration. In an example, sensing device 502 may select the one or more time domain pulses based on the amplitude mask. For example, sensing device 502 may include time domain pulses that are within the amplitude mask and exclude time domain pulses that are outside the amplitude mask. The amplitude mask is the time domain representation of the sensing measurement. Further, in an example, each of the one or more time domain pulses may be represented by a complex number. The complex number may include an amplitude and a phase.

Step 3212 includes nulling time domain pulses that are not selected. In an implementation, sensing device 502 may null the time domain pulses that are not selected. In an example, energy of the time domain pulses that are not selected becomes zero.

Step 3214 includes generating a representation of a location of the one or more time domain pulses in a reconstructed filtered TD-CRI. In an implementation, sensing device 502 may generate the representation of a representation of the location of the one or more time domain pulses in the reconstructed filtered TD-CRI. In an example, the representation of the location of the one or more time domain pulses in the reconstructed filtered TD-CRI may include a bitmap wherein a "1" indicates a location of a time domain pulse and a "0" indicates a location of a null. Further, in an example, a length of the bitmap corresponds to a number of sensing measurement points in the sensing measurement. In some examples, a length of the bitmap corresponds to a number of points in the reconstructed filtered TD-CRI. In some examples, the length of the bitmap corresponds to a number of points in the reconstructed filtered TD-CRI less a number of guard tones and DC tones in a frequency domain received signal representation. In an implementation, the representation of the location of the selected time domain pulses in the reconstructed filtered TD-CRI is a Z-bit integer, where:

$$2^Z = \text{Number of points in the IFFT}$$

Step 3216 includes communicating the representation of the location of the one or more time domain pulses in the reconstructed filtered TD-CRI to sensing algorithm manager 506 for use in determining motion or movement. According to an implementation, sensing device 502 may communicate the representation of the location of the one or more time domain pulses in the reconstructed filtered TD-CRI to sensing algorithm manager 506 for use in determining motion or movement. In an implementation, sensing device 502 may communicate the representation of the location of the one or more time domain pulses in the reconstructed filtered TD-CRI to sensing algorithm manager 506 using a CRI transmission message.

Specific embodiments include:

Embodiment 1 is a system for Wi-Fi sensing comprising a sensing receiver including a transmitting antenna, a receiving antenna, and at least one processor configured to execute instructions for receiving, by the receiving antenna, a channel representation information configuration identifying a representation of channel state information in the time domain, receiving, via the receiving antenna, a sensing transmission, generating a sensing measurement based on the sensing transmission, generating a time domain representation of the sensing measurement, selecting one or more time domain pulses indicative of the time domain representation based on the channel representation information configuration, and communicating, by the transmitting antenna, the one or more time domain pulses to a sensing algorithm manager for use in determining motion or movement.

Embodiment 2 is the system of embodiment 1, wherein the channel representation information configuration includes one or more of a number of time domain pulses (N), a maximum time delay boundary, and an amplitude mask.

Embodiment 3 is the system of embodiment 2, wherein the maximum time delay boundary represents a maximum time delay of selectable time domain pulses of the time domain representation of the sensing measurement.

Embodiment 4 is the system of embodiment 2 or embodiment 3, wherein the amplitude mask includes one of a minimum amplitude mask and a maximum amplitude mask.

Embodiment 5 is the system of any of embodiment 1 to embodiment 4, wherein the processor is further configured to execute instructions for generating a representation of a location of the one or more time domain pulses in a reconstructed filtered TD-CRI.

Embodiment 6 is the system of embodiment 5, wherein the processor is further configured to execute instructions for communicating the representation of the location of the one or more time domain pulses in the reconstructed filtered TD-CRI to the sensing algorithm manager.

Embodiment 7 is the system of embodiment 5 or embodiment 6, wherein the representation of the location of the one or more time domain pulses in the reconstructed filtered TD-CRI includes a bitmap wherein a "1" indicates a location of a time domain pulse and a "0" indicates a location of a null.

Embodiment 8 is the system of embodiment 7, wherein a length of the bitmap corresponds to a number of sensing measurement points in the sensing measurement.

Embodiment 9 is the system of embodiment 7, wherein a length of the bitmap corresponds to a number of points in the reconstructed filtered TD-CRI less a number of guard tones and DC tones in a frequency domain received signal representation.

Embodiment 10 is the system of embodiment 7, wherein a length of the bitmap corresponds to a number of points in the reconstructed filtered TD-CRI.

Embodiment 11 is the system of any of embodiment 1 to embodiment 10, wherein each of the one or more time domain pulses is represented by a complex number.

Embodiment 12 is the system of embodiment 11, wherein the complex number includes an amplitude and a phase.

Embodiment 13 is the system of any of embodiment 5 to embodiment 10, wherein the representation of the location of the selected time domain pulses in the reconstructed filtered TD-CRI is a Z-bit integer, where $2^Z$=Number of points in the IFFT.

Embodiment 14 is the system of any of embodiment 2 to embodiment 13, wherein the one or more of the number of time domain pulses (N), the maximum time delay boundary, and the amplitude mask are received in a sensing NDP announcement frame.

Embodiment 15 is the system of any of embodiment 2 to embodiment 14, wherein the one or more of the number of time domain pulses (N), the maximum time delay boundary, and the amplitude mask are received in a sensing measurement setup request.

Embodiment 16 is the system of any of embodiment 1 to embodiment 15, wherein the processor is further configured to execute instructions to generate the sensing measurement by calculating channel state information (CSI).

Embodiment 17 is the system of any of embodiment 2 to embodiment 16, wherein the one or more of the number of time domain pulses (N), the maximum time delay boundary, and the amplitude mask are received in a sensing trigger report frame.

Embodiment 18 is the system of any of embodiment 2 to embodiment 17, wherein selecting the one or more time domain pulses is based on the amplitude mask, the amplitude mask is to the time domain representation of the sensing measurement, and selecting comprises including time domain pulses that are within the amplitude mask and excluding time domain pulses that are outside the amplitude mask.

Embodiment 19 is the system of any of embodiment 1 to embodiment 18, wherein the processor is further configured to execute instructions for nulling time domain pulses not selected during selecting.

Embodiment 20 is the system of any of embodiment 2 to embodiment 19, wherein the processor is further configured to execute instructions for determining the number of time domain pulses (N) according to a ranging process performed by the processor.

Embodiment 21 is the system of any of embodiment 2 to embodiment 19, wherein the processor is further configured to execute instructions for determining the number of time domain pulses (N) according to a simulation process.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for motion sensing carried out by a sensing responder including a transmitting antenna, a receiving antenna, and at least one processor configured to execute instructions, the method comprising:
receiving, by the at least one processor from a sensing initiator, a sensing configuration comprising a time 0 reference point and a maximum time delay;
obtaining time domain channel representation information;
selecting, according to the time 0 reference point and the maximum time delay, one or more time domain pulses of the time domain channel representation information as selected time domain pulses;
generating a bitmap according to the selected time domain pulses; and
generating a sensing measurement report including at least the bitmap and the selected time domain pulses.

2. The method of claim 1, further comprising transmitting the sensing measurement report via the transmitting antenna to the sensing initiator.

3. The method of claim 1, wherein the selected time domain pulses are determined further according to an amplitude mask.

4. The method of claim 3, wherein the amplitude mask includes at least one of a minimum amplitude mask and a maximum amplitude mask.

5. The method of claim 1, wherein the selected time domain pulses are determined based on having time delays within a period of time defined by the time 0 reference point and the maximum time delay.

6. The method of claim 1, wherein the selected time domain pulses have a time delay less than the maximum time delay.

7. The method of claim 1, further comprising determining the time 0 reference point.

8. The method of claim 7, wherein the time 0 reference point is determined according to a first point in time that a sensing transmission is detected or a first point in time that a sensing transmission is expected.

9. The method of claim 1, wherein the time domain channel representation information is determined based on at least one sensing transmission between the sensing initiator and the sensing responder.

10. The method of claim 1, wherein the bitmap represents locations of the selected time domain pulses in the time domain channel representation information that are included in the sensing measurement report.

11. A system for motion sensing comprising:
a sensing responder including a transmitting antenna, a receiving antenna, and at least one processor configured to execute instructions for:
receiving, by the at least one processor from a sensing initiator, a sensing configuration comprising a time 0 reference point and a maximum time delay,
obtaining time domain channel representation information;
selecting, according to the time 0 reference point and the maximum time delay, one or more time domain pulses of the time domain channel representation information as selected time domain pulses;
generating a bitmap according to the selected time domain pulses; and
generating a sensing measurement report including at least the bitmap and the selected time domain pulses.

12. The system of claim 11, wherein the at least one processor is further configured for transmitting the sensing measurement report via the transmitting antenna to the sensing initiator.

13. The system of claim 11, wherein the selected time domain pulses are determined further according to an amplitude mask.

14. The system of claim 13, wherein the amplitude mask includes at least one of a minimum amplitude mask and a maximum amplitude mask.

15. The system of claim 11, wherein the selected time domain pulses are determined based on having time delays within a period of time defined by the time 0 reference point and the maximum time delay.

16. The system of claim 11, wherein the selected time domain pulses have a time delay less than the maximum time delay.

17. The system of claim 11, wherein the at least one processor is further configured for determining the time 0 reference point.

18. The system of claim 17, wherein the time 0 reference point is determined according to a first point in time that a sensing transmission is detected or a first point in time that a sensing transmission is expected.

19. The system of claim 11, wherein the time domain channel representation information is determined based on at least one sensing transmission between the sensing initiator and the sensing responder.

20. The system of claim 11, wherein the bitmap represents locations of the selected time domain pulses in the time domain channel representation information that are included in the sensing measurement report.

* * * * *